United States Patent
Bramlet et al.

(10) Patent No.: US 11,917,065 B2
(45) Date of Patent: Feb. 27, 2024

(54) ACCESSING A VIRTUAL REALITY ENVIRONMENT

(71) Applicant: Enduvo, Inc., Peoria, IL (US)

(72) Inventors: Matthew Bramlet, Peoria, IL (US); Justin Douglas Drawz, Chicago, IL (US); Steven J. Garrou, Wilmette, IL (US); Christine Mancini Varani, Newtown, PA (US); Gary W. Grube, Barrington Hills, IL (US)

(73) Assignee: Enduvo, Inc., Peoria, IL (US)

( * ) Notice: Subject to any disclaimer, the term of this patent is extended or adjusted under 35 U.S.C. 154(b) by 27 days.

(21) Appl. No.: 17/726,739

(22) Filed: Apr. 22, 2022

(65) Prior Publication Data

US 2023/0196656 A1     Jun. 22, 2023

Related U.S. Application Data

(60) Provisional application No. 63/290,306, filed on Dec. 16, 2021.

(51) Int. Cl.
    *H04L 9/32*        (2006.01)
    *H04L 9/08*        (2006.01)
          (Continued)

(52) U.S. Cl.
    CPC ....... *H04L 9/3213* (2013.01); *G06Q 20/1235* (2013.01); *G06Q 20/389* (2013.01);
          (Continued)

(58) Field of Classification Search
CPC ... H04L 9/3213; H04L 9/0825; H04L 9/3236; H04L 9/3247; H04L 9/50; H04L 2209/603; H04L 2209/56; H04L 9/3239; H04L 9/3297; G06Q 20/1235; G06Q 20/3825; G06Q 20/389; G06Q 30/0601; G06Q 50/205; G06Q 20/123; G06Q 50/184; G06Q 50/20; G06T 15/08; G06T 19/006; G06T 2219/20; G09B 5/06; G09B 5/12; G09B 7/00; G09B 5/00
See application file for complete search history.

(56) References Cited

U.S. PATENT DOCUMENTS 6,288,753 B1    9/2001   Denicola
7,733,366 B2    6/2010   Beavers
              (Continued)

*Primary Examiner* — William A Beutel
(74) *Attorney, Agent, or Firm* — Gary W. Grube

(57) ABSTRACT

A method includes a computing device interpreting a request for a requesting entity to access a set of learning objects pertaining to a common topic represented in a virtual reality environment to produce a set of requested learning object identifiers. The method further includes determining whether a license smart contract for the set of learning objects associated with a non-fungible token of the object distributed ledger affirms access by the requesting entity to the set of learning objects. When access is affirmed, the method further includes generating the virtual reality environment utilizing a group of object representations in accordance with interaction information for at least some of the object representations of the group of object representations. The method further includes outputting the virtual reality environment to the requesting entity for interactive consumption.

12 Claims, 35 Drawing Sheets

(51) Int. Cl.
*G06Q 20/12* (2012.01)
*G06Q 20/38* (2012.01)
*G06T 19/00* (2011.01)
*G06T 15/08* (2011.01)
*G06Q 30/0601* (2023.01)
*G06Q 50/20* (2012.01)
*G09B 5/06* (2006.01)
*G09B 5/12* (2006.01)
*H04L 9/00* (2022.01)
*G09B 7/00* (2006.01)

(52) U.S. Cl.
CPC ..... *G06Q 20/3825* (2013.01); *G06Q 30/0601* (2013.01); *G06Q 50/205* (2013.01); *G06T 15/08* (2013.01); *G06T 19/006* (2013.01); *G09B 5/06* (2013.01); *G09B 5/12* (2013.01); *H04L 9/0825* (2013.01); *H04L 9/3236* (2013.01); *H04L 9/3247* (2013.01); *G06T 2219/20* (2013.01); *G09B 7/00* (2013.01); *H04L 9/50* (2022.05); *H04L 2209/603* (2013.01)

(56) References Cited

U.S. PATENT DOCUMENTS

| | | | |
|---|---|---|---|
| 8,682,241 | B2 | 3/2014 | Huerta |
| 9,179,100 | B2 | 11/2015 | Guo |
| 2011/0123972 | A1 | 5/2011 | Friedman |
| 2012/0251992 | A1 | 10/2012 | Huerta |
| 2013/0314421 | A1 | 11/2013 | Kim |
| 2015/0206448 | A1 | 7/2015 | Loudermilk |
| 2018/0232567 | A1 | 8/2018 | Dolsma |
| 2020/0134139 | A1* | 4/2020 | Vaish ............... G06F 16/1805 |
| 2021/0342836 | A1* | 11/2021 | Cella ................. H04L 9/3239 |

\* cited by examiner

ACCESSING A VIRTUAL REALITY ENVIRONMENT

CROSS-REFERENCE TO RELATED APPLICATIONS

The present U.S. Utility Patent application claims priority pursuant to 35 U.S.C. § 119(e) to U.S. Provisional Application No. 63/290,306, entitled "TOKENIZING A LESSON PACKAGE FOR A VIRTUAL ENVIRONMENT," filed Dec. 16, 2021, which is hereby incorporated herein by reference in its entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer systems and more particularly to computer systems providing educational, training, and entertainment content.

Description of Related Art

Computer systems communicate data, process data, and/or store data. Such computer systems include computing devices that range from wireless smart phones, laptops, tablets, personal computers (PC), work stations, personal three-dimensional (3-D) content viewers, and video game devices, to data centers where data servers store and provide access to digital content. Some digital content is utilized to facilitate education, training, and entertainment. Examples of visual content includes electronic books, reference materials, training manuals, classroom coursework, lecture notes, research papers, images, video clips, sensor data, reports, etc.

A variety of educational systems utilize educational tools and techniques. For example, an educator delivers educational content to students via an education tool of a recorded lecture that has built-in feedback prompts (e.g., questions, verification of viewing, etc.). The educator assess a degree of understanding of the educational content and/or overall competence level of a student from responses to the feedback prompts.

BRIEF DESCRIPTION OF THE SEVERAL VIEWS OF THE DRAWING(S)

Figure 9A:
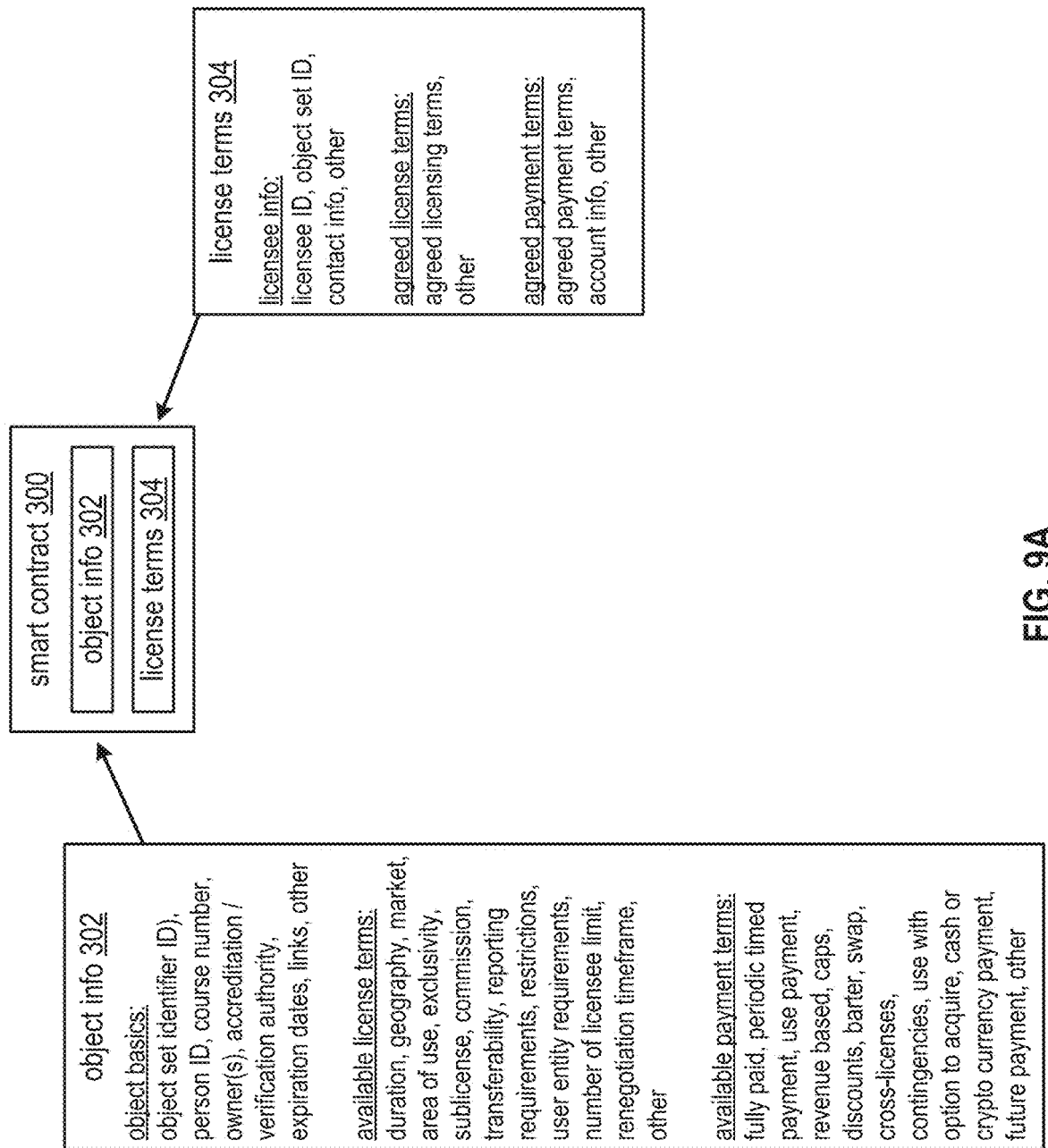
Figures 9B, 9C:
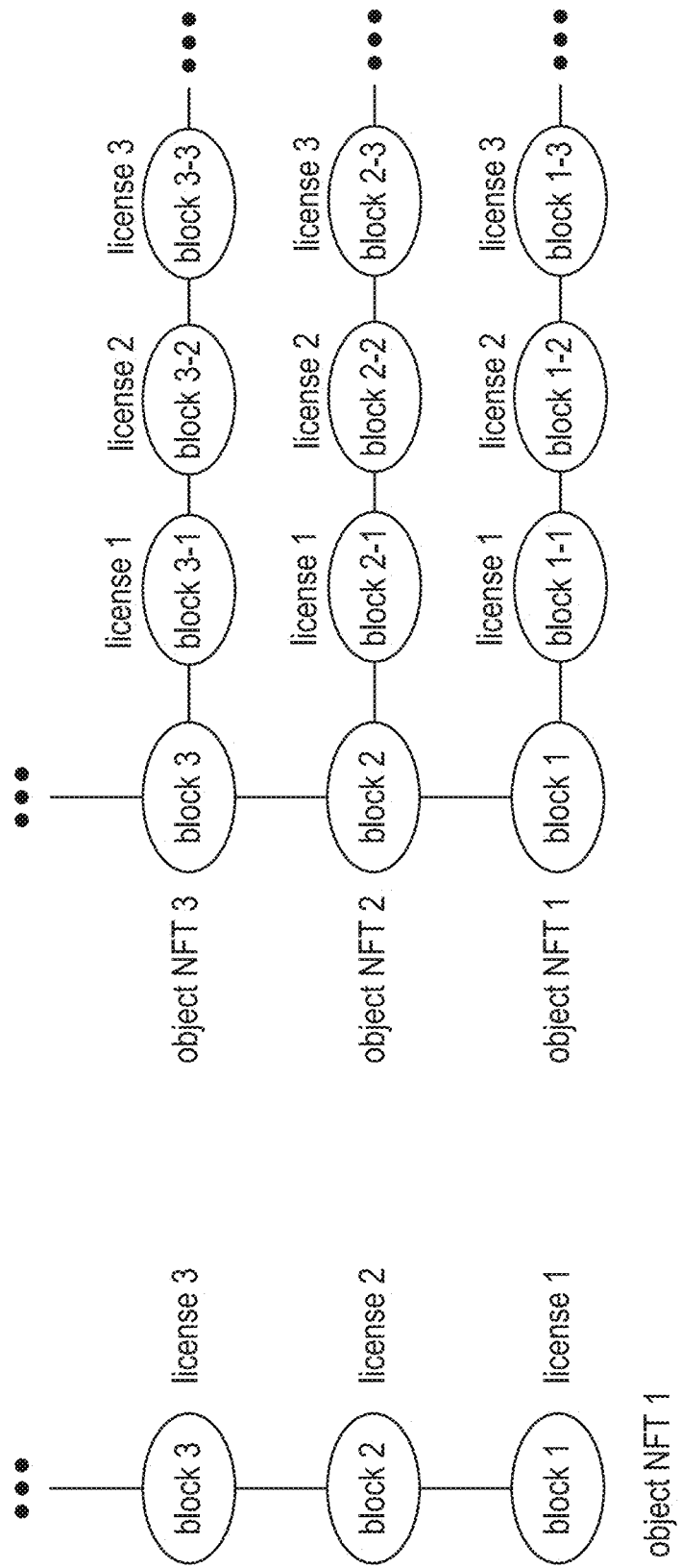
Figure 9D:
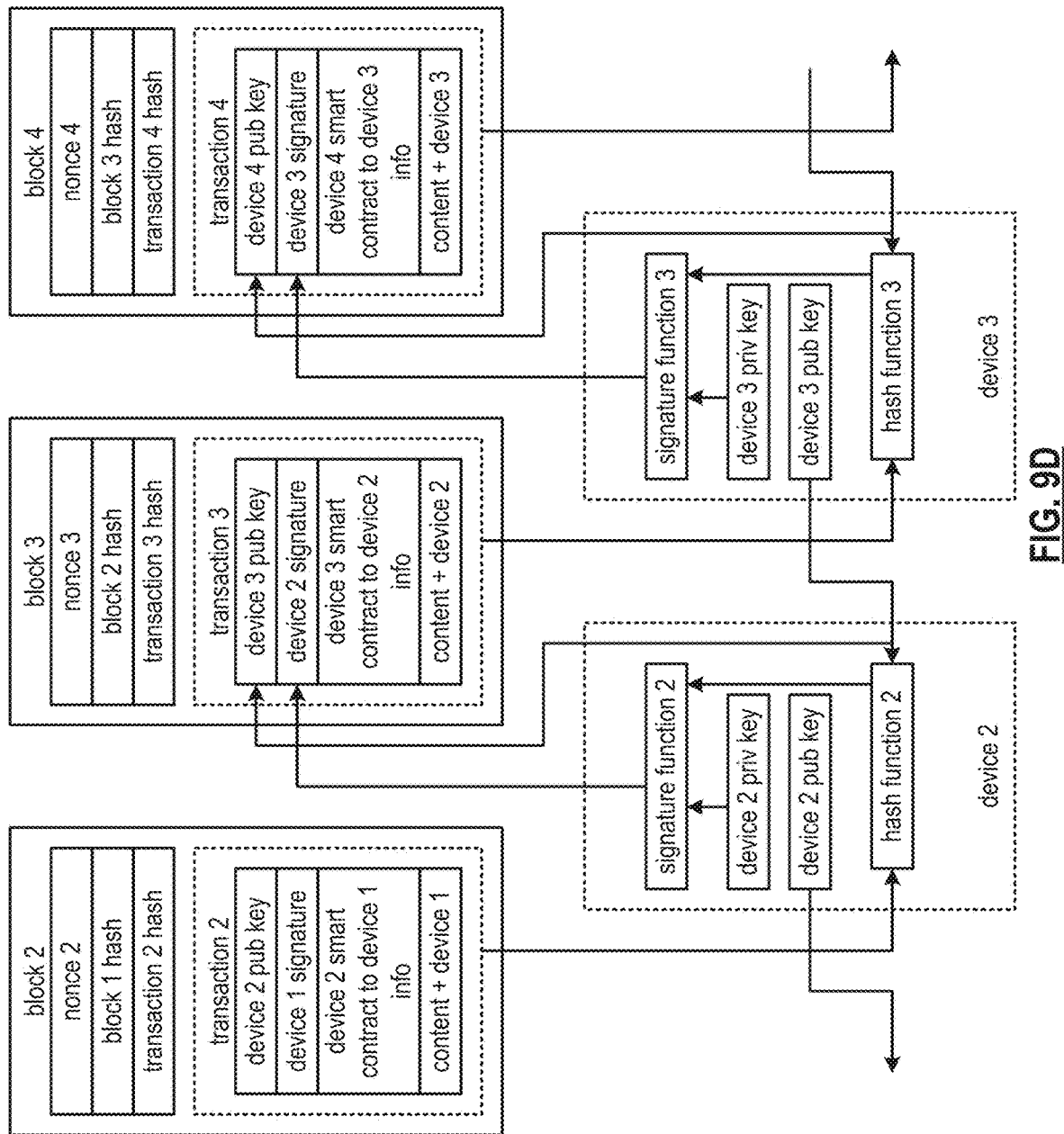
Figure 10A:
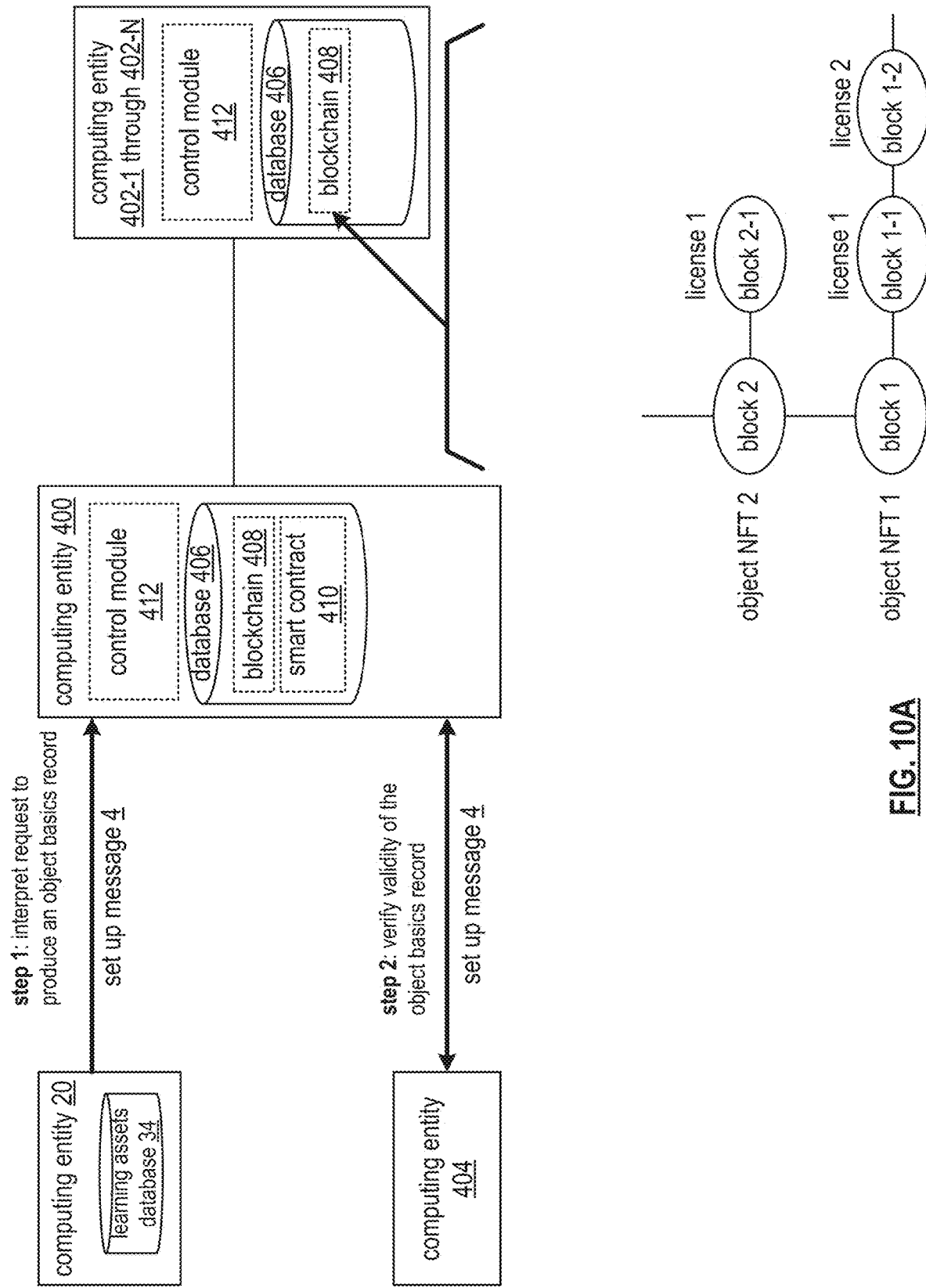
Figure 10B:
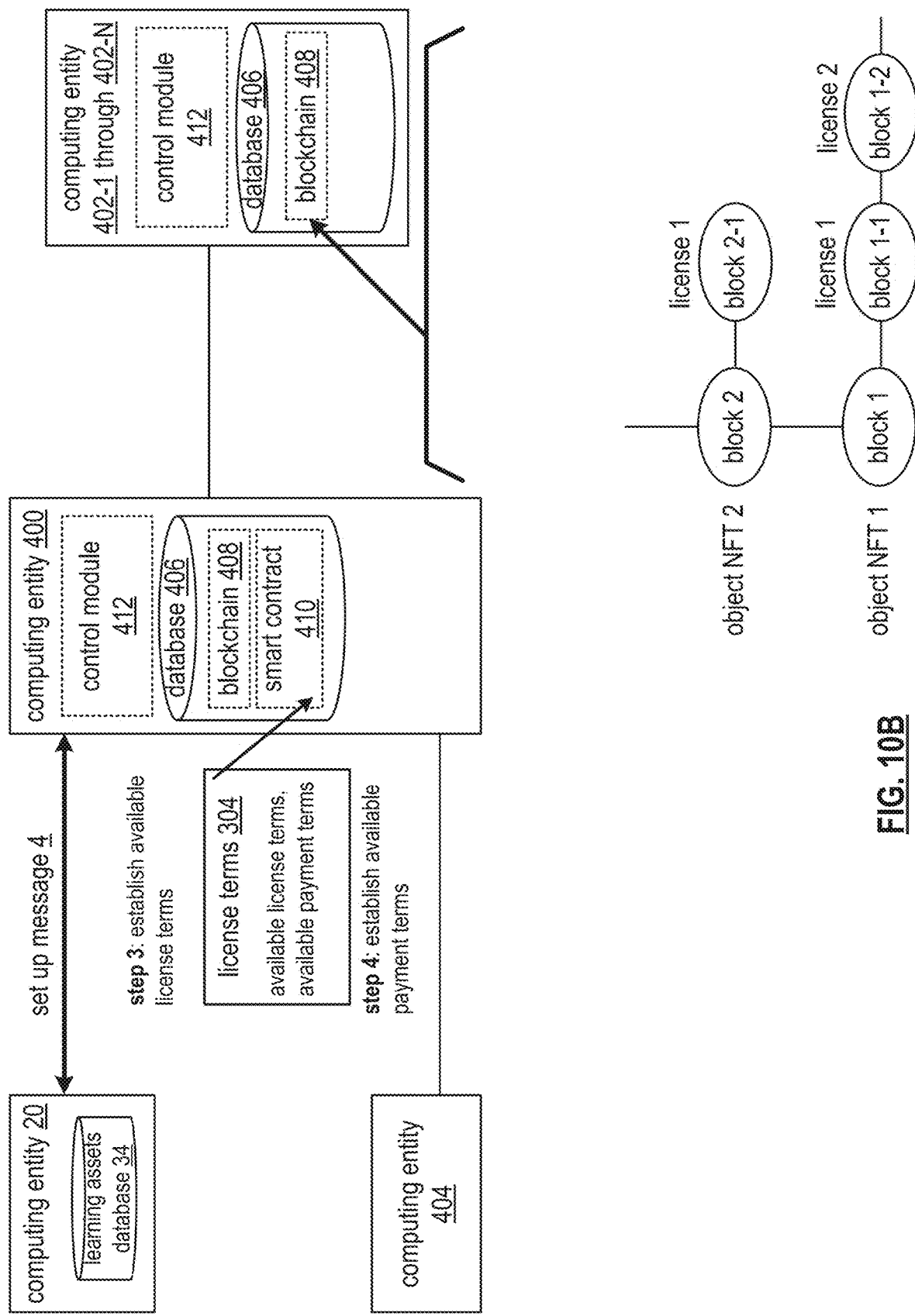
Figure 10C:
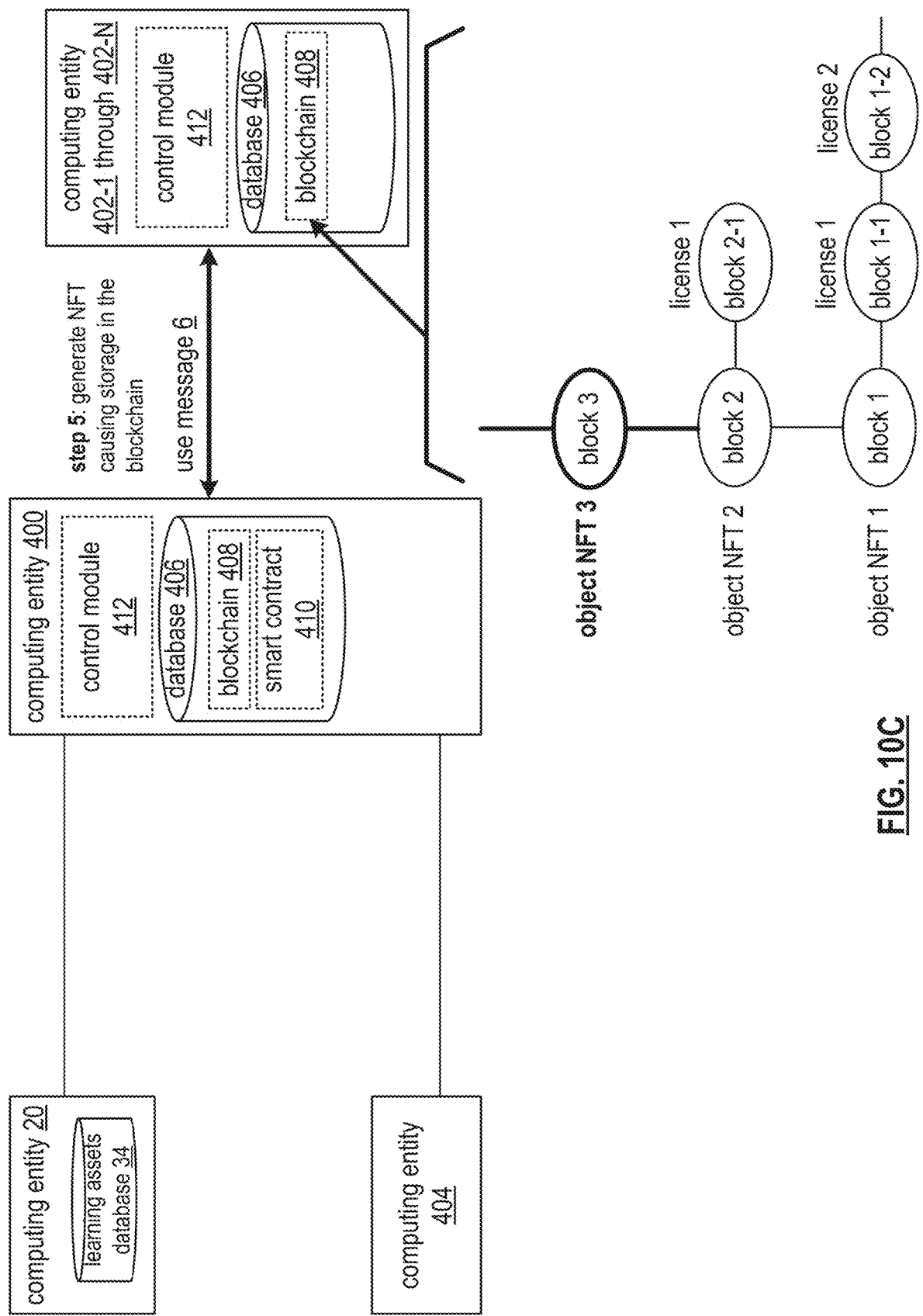
Figure 11A:
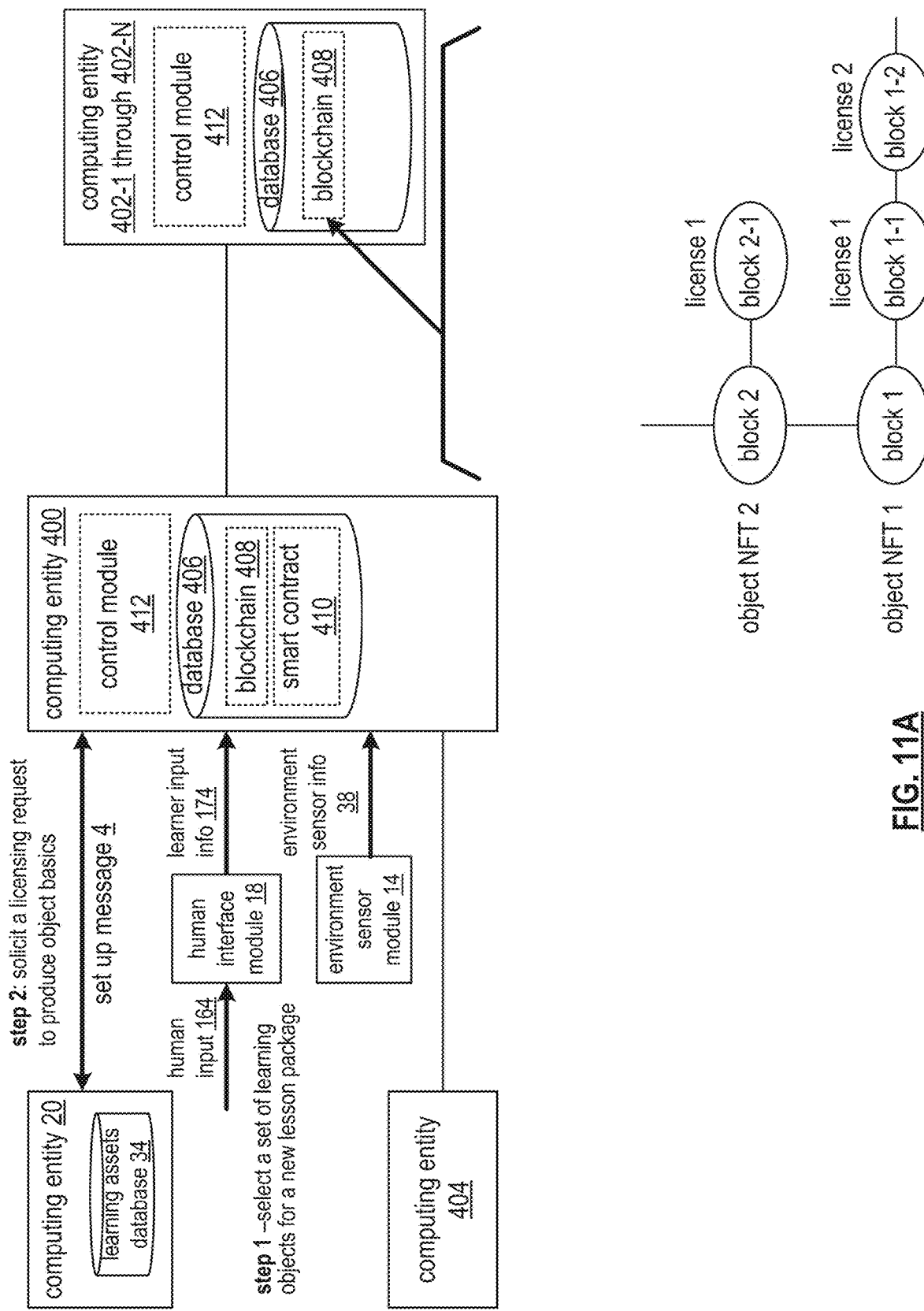
Figure 11B:
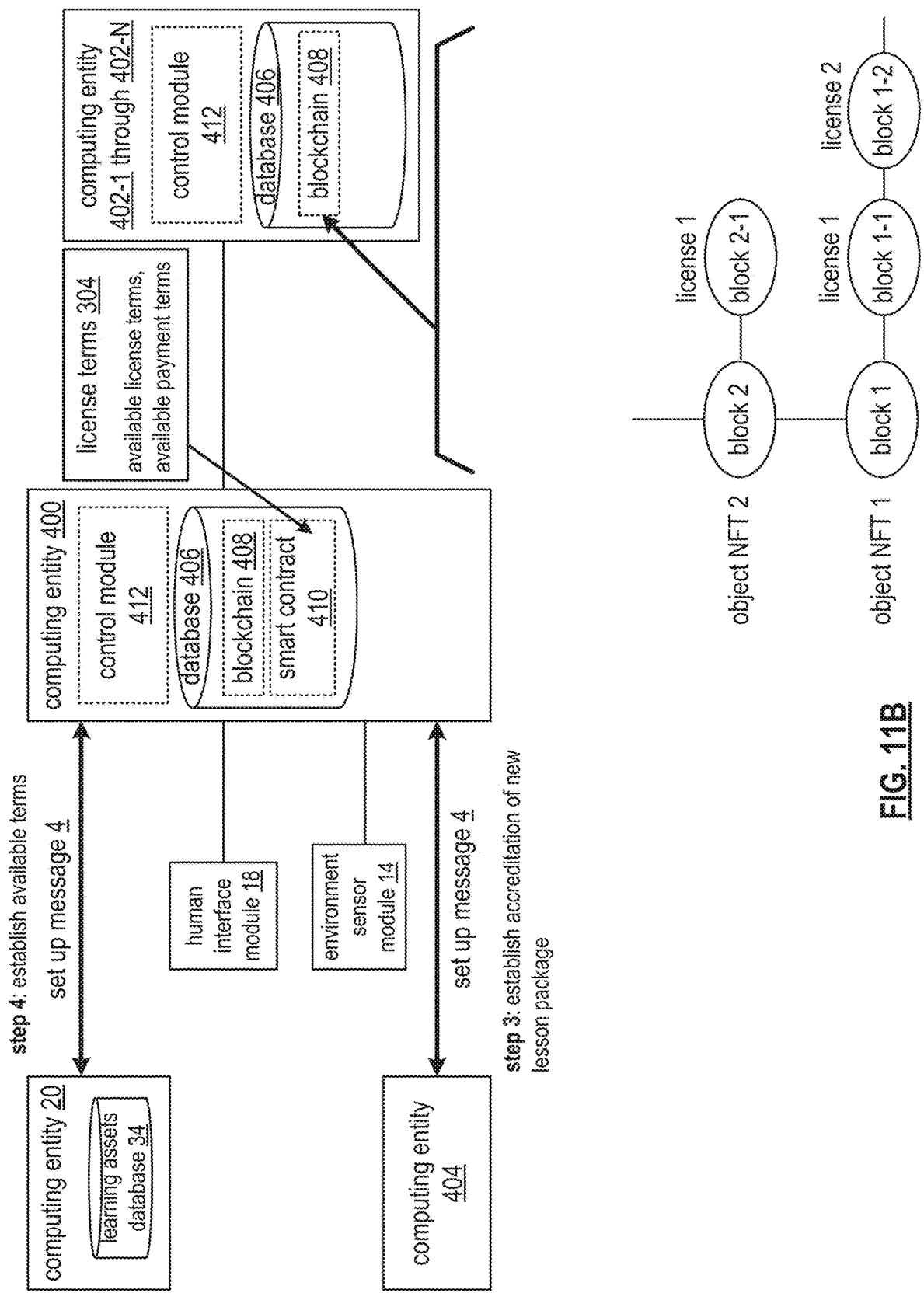
Figure 11C:
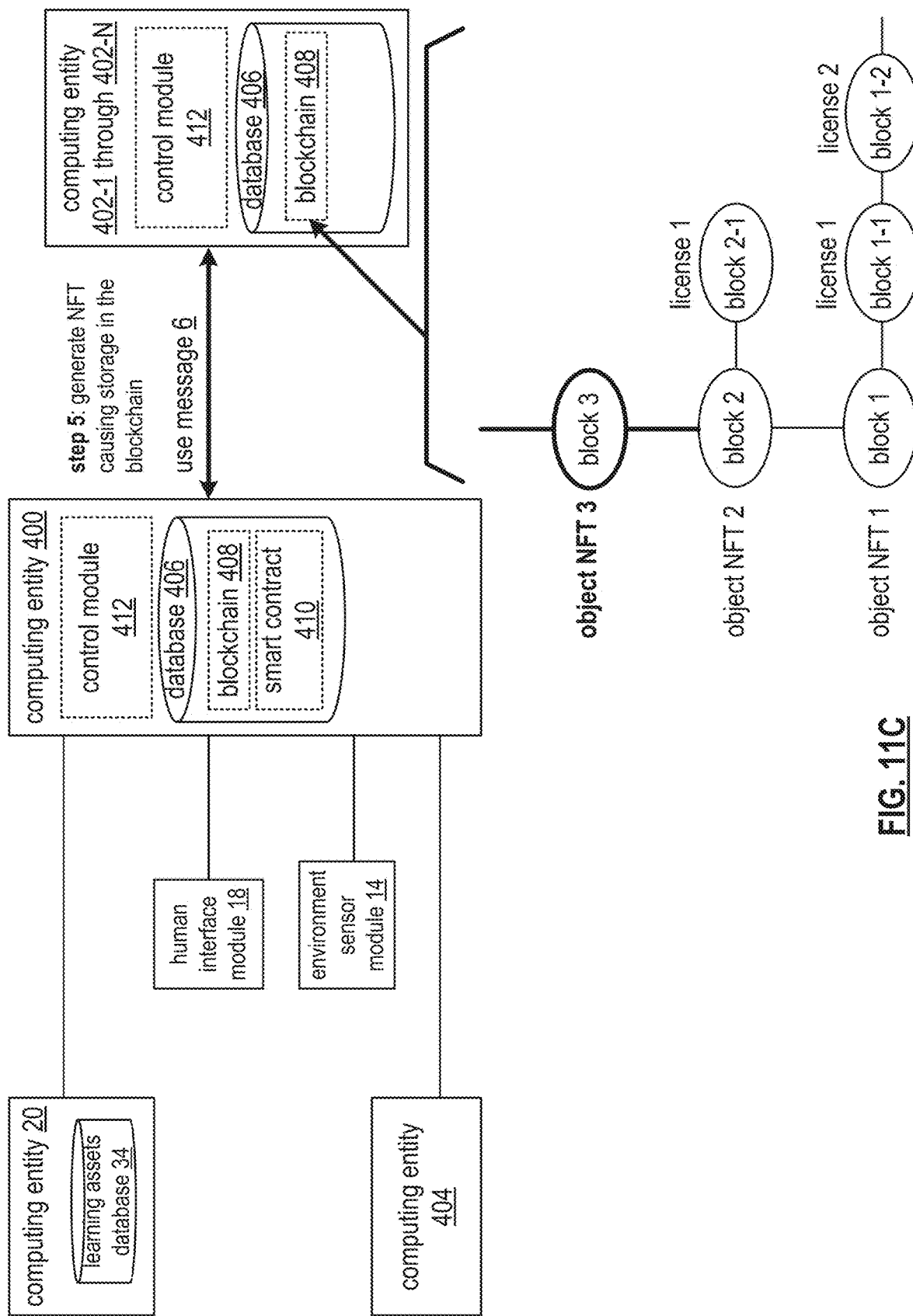
Figure 12A:
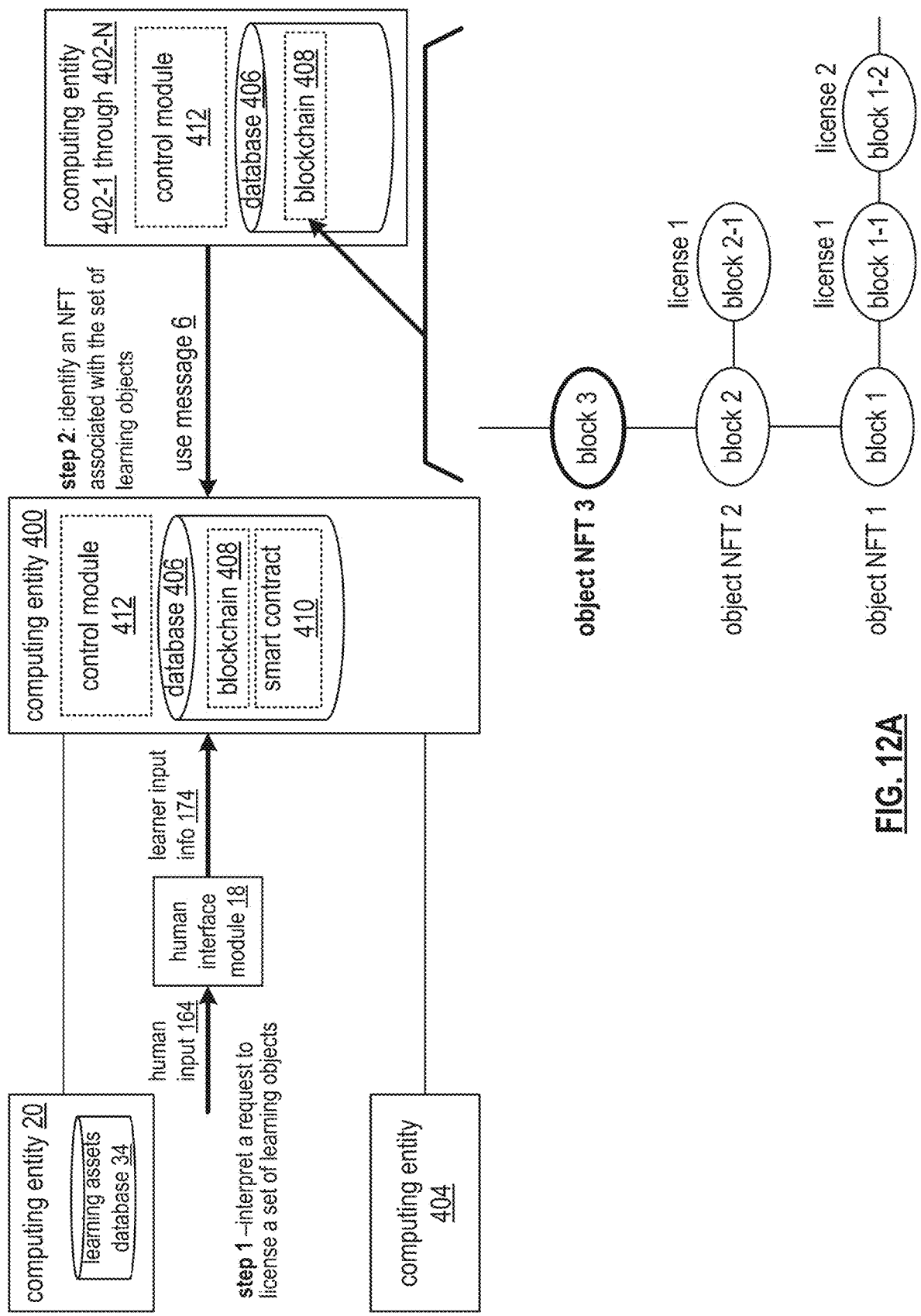
Figure 12B:
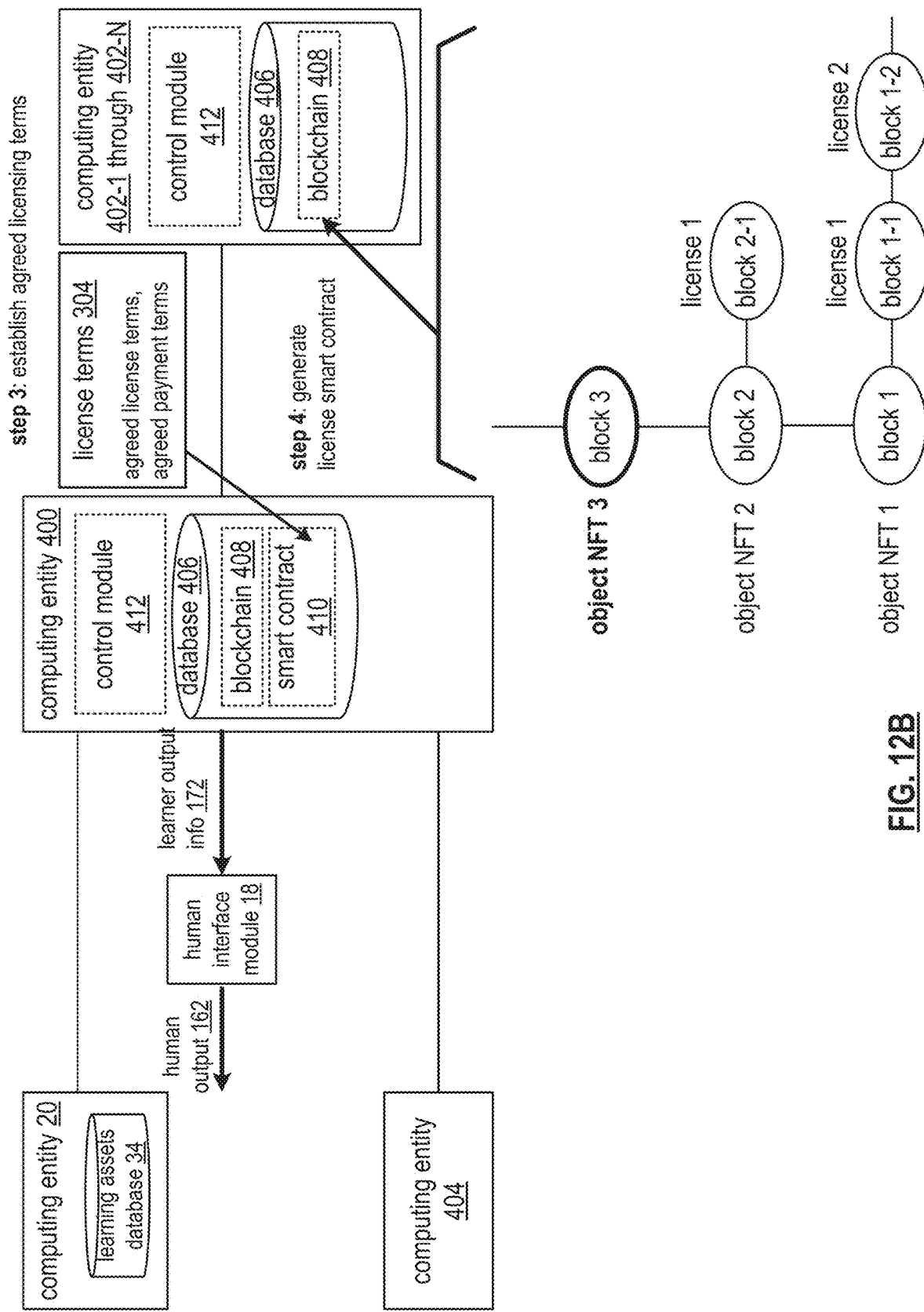
Figure 12C:
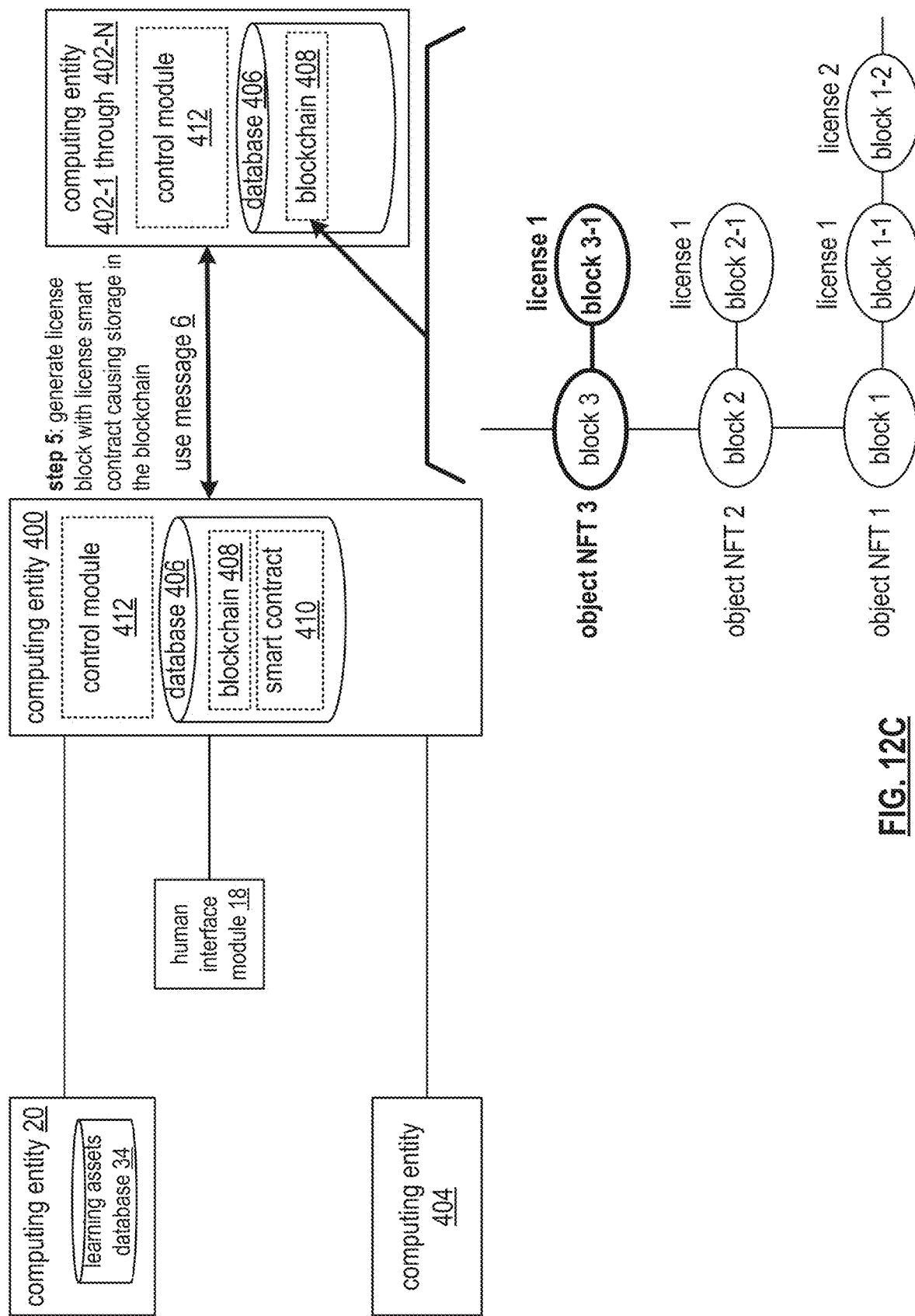
Figure 13A:
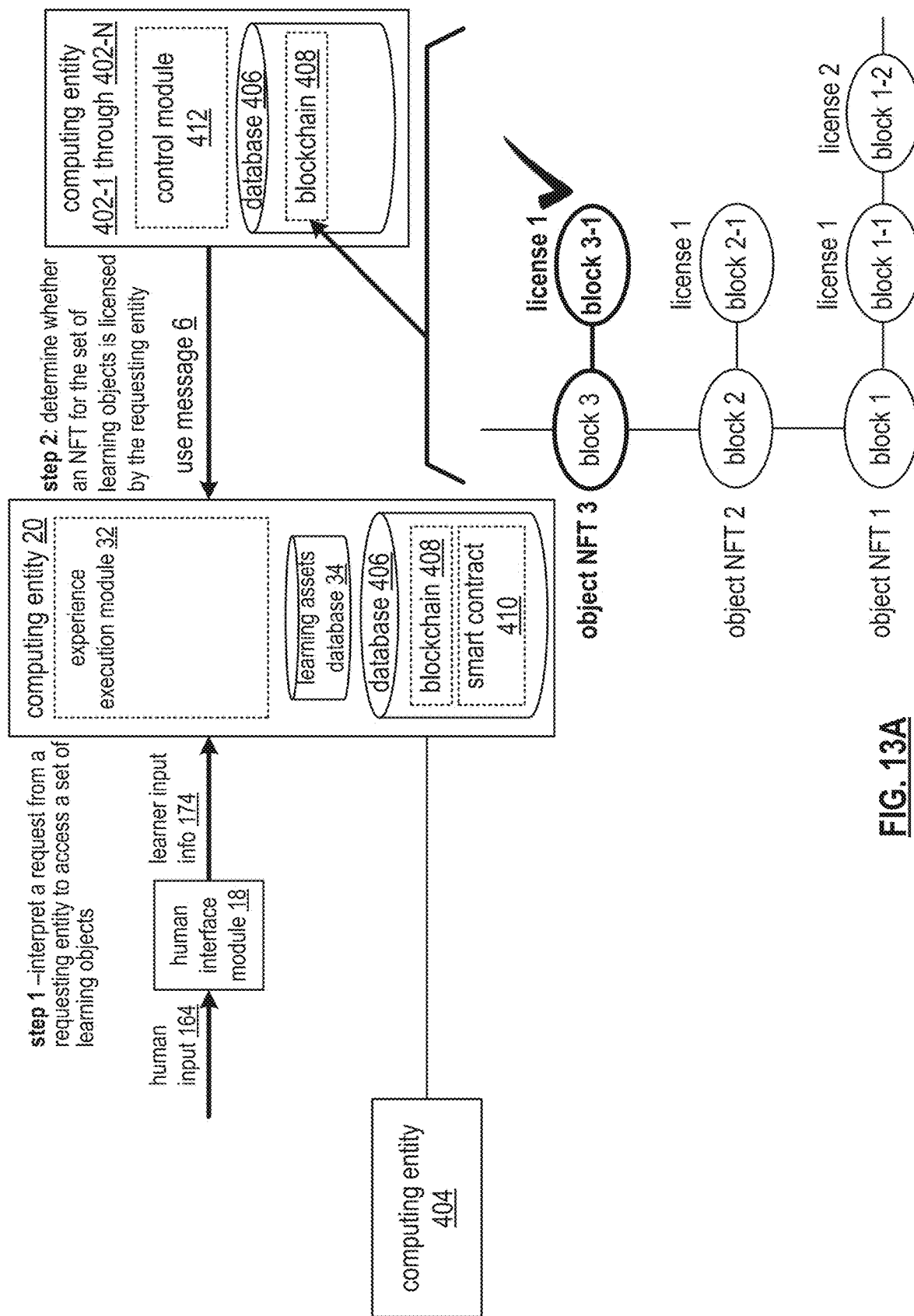
Figure 13B:
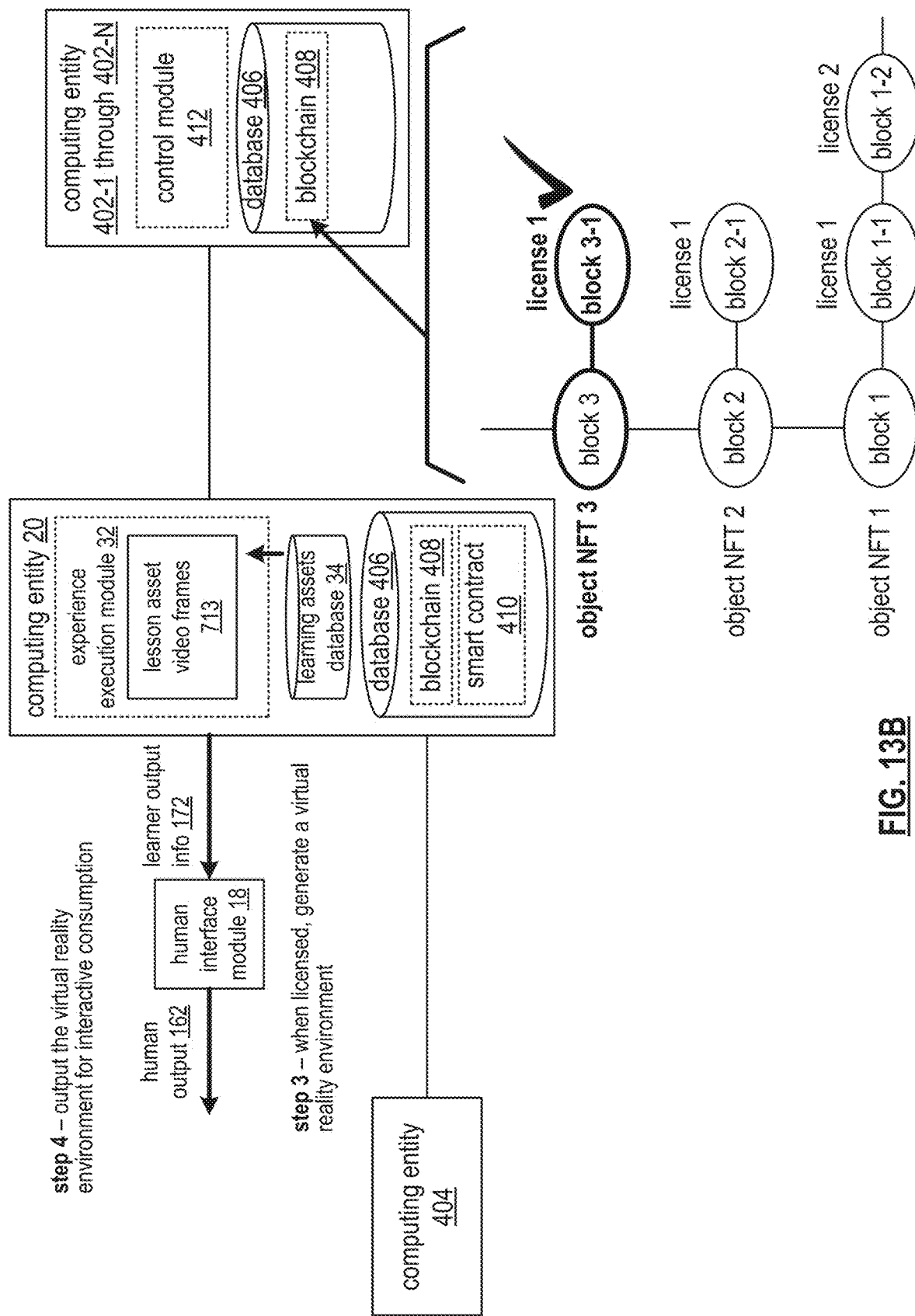
Figure 13C:
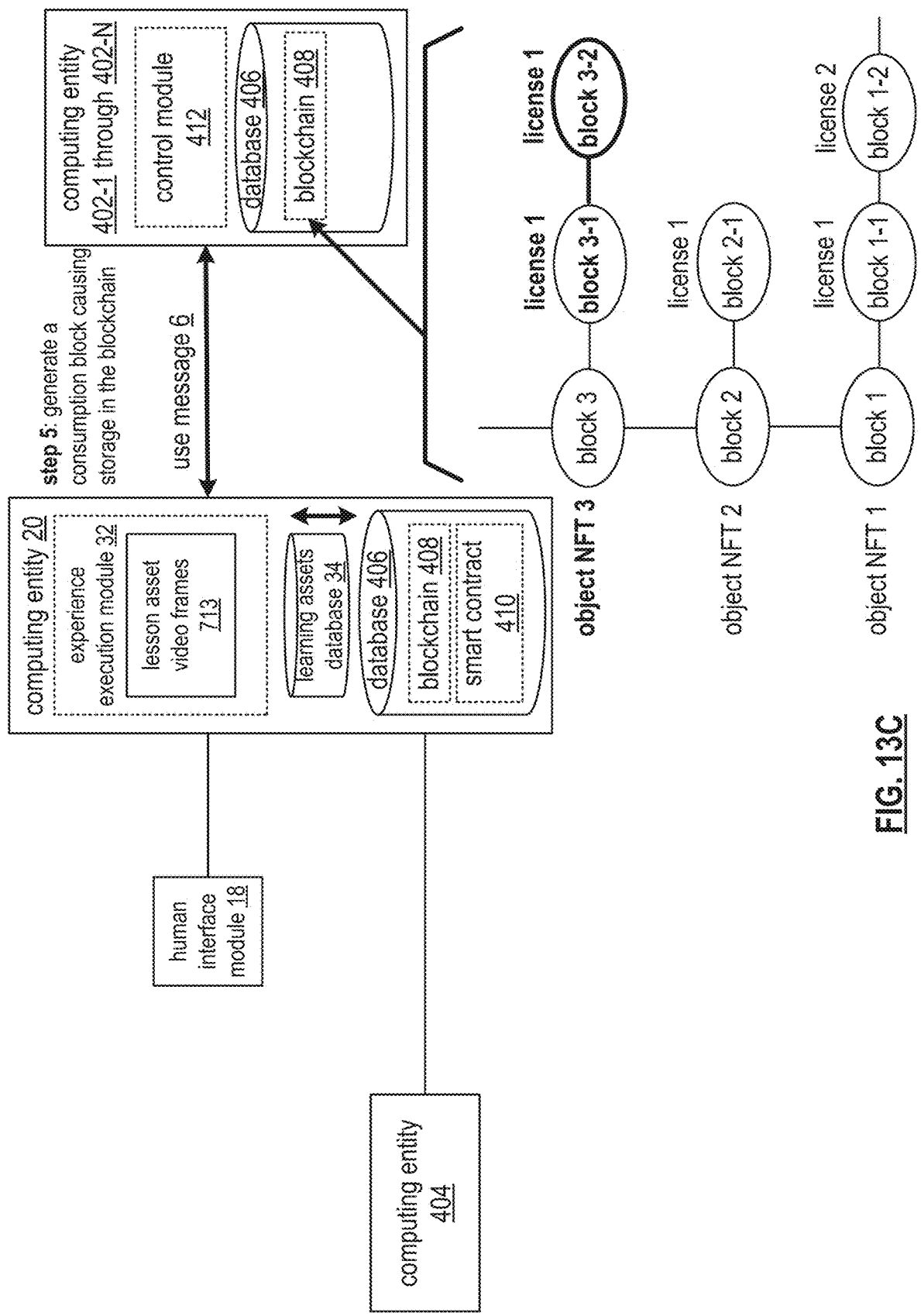
Figure 14A:
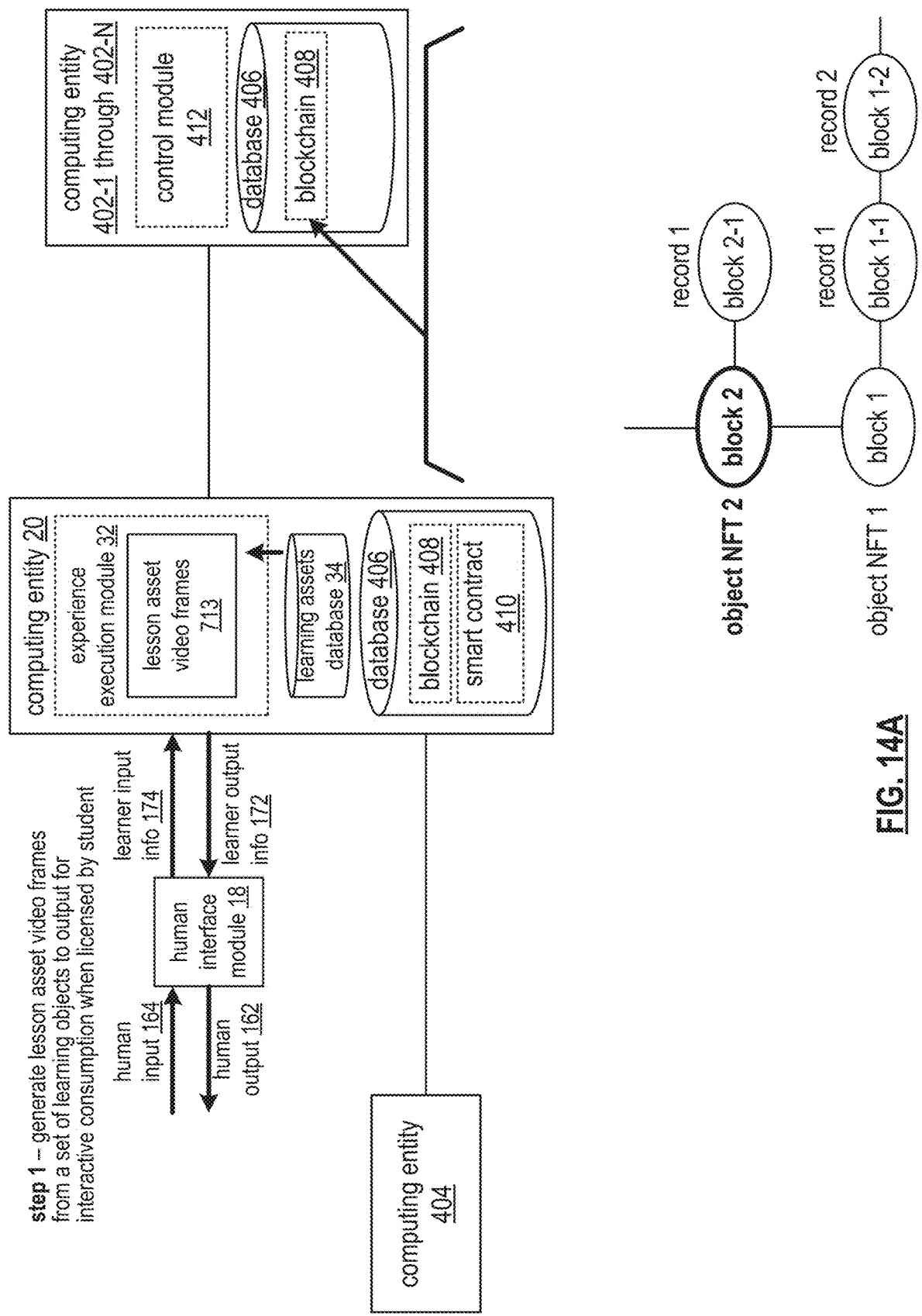
Figure 14B:
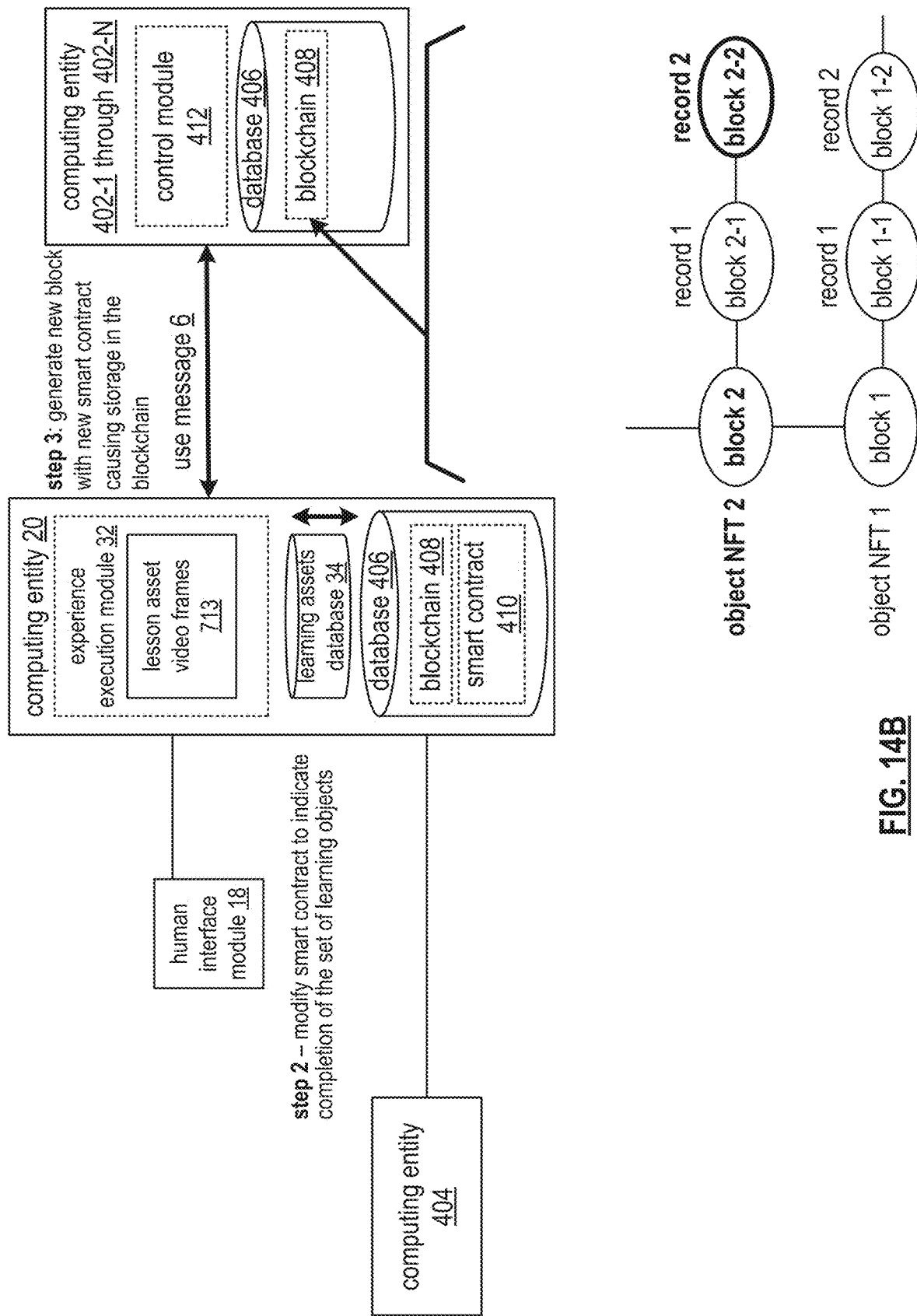
Figure 14C:
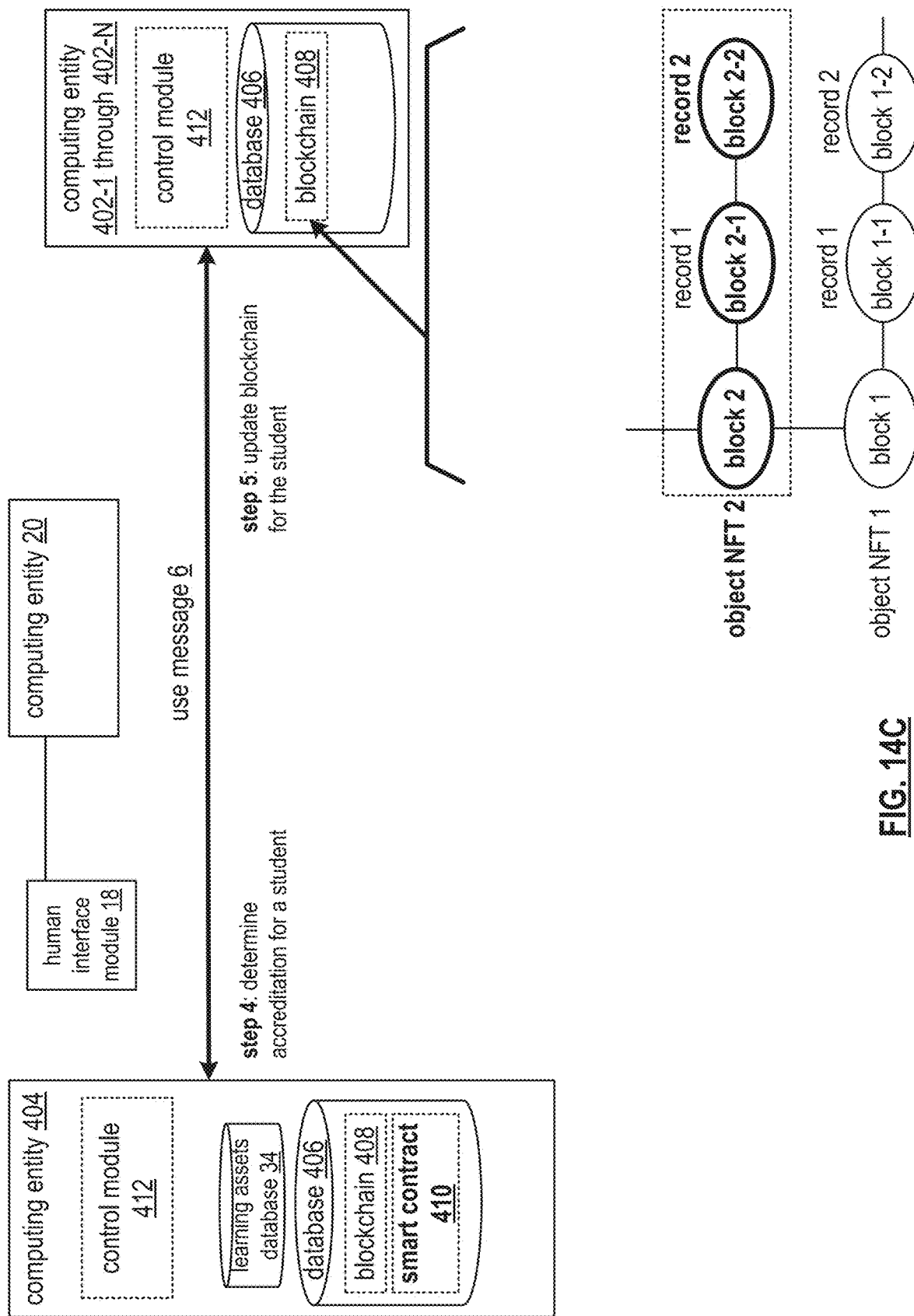

FIGS. 8E, 8F, 8G, 8H, 8J, and 8K are schematic block diagrams of another embodiment of a computing system illustrating another example of creating a learning experience in accordance with the present invention;

FIG. 9A is a schematic block diagram of a data structure for a smart contract in accordance with the present invention;

FIGS. 9B and 9C are schematic block diagrams of organization of object distributed ledgers in accordance with the present invention;

FIG. 9D is a schematic block diagram of an embodiment of a blockchain associated with an object distributed ledger in accordance with the present invention;

FIGS. 10A, 10B, and 10C are schematic block diagrams of an embodiment of a computing system illustrating an example of tokenizing in a lesson package in accordance with the present invention;

FIGS. 11A, 11B, and 11C are schematic block diagrams of an embodiment of a computing system illustrating an example of creating a lesson package in accordance with the present invention;

FIGS. 12A, 12B, and 12C are schematic block diagrams of an embodiment of a computing system illustrating an example of accessing a lesson package in accordance with the present invention;

FIGS. 13A, 13B, and 13C are schematic block diagrams of an embodiment of a computing system illustrating another example of accessing a lesson package in accordance with the present invention; and FIGS. 14A, 14B, and 14C are schematic block diagrams of an embodiment of a computing system illustrating another example of accessing a lesson package in accordance with the present invention.

DETAILED DESCRIPTION OF THE INVENTION

Figure 1:
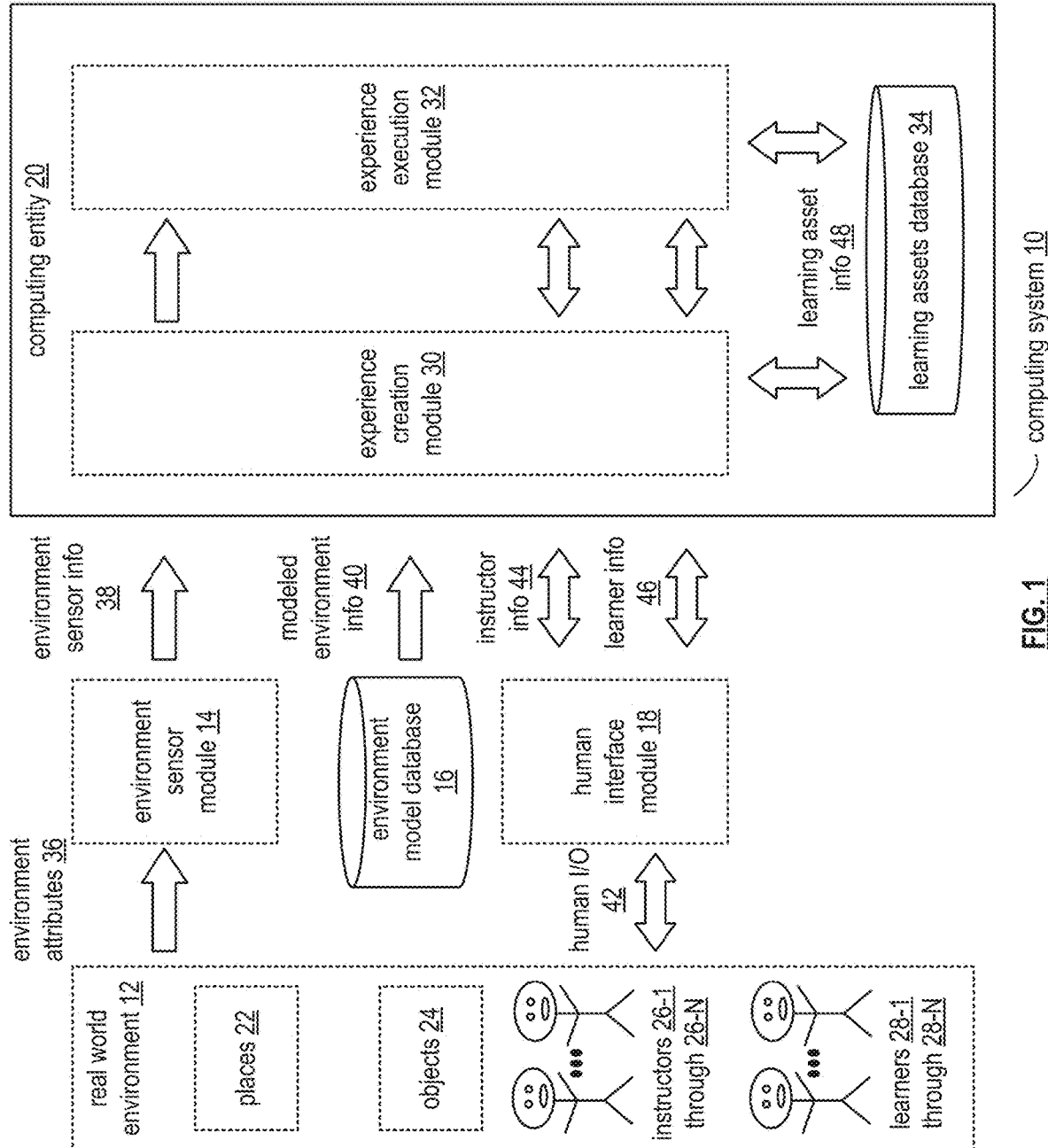
FIG. 1 is a schematic block diagram of an embodiment of a computing system in accordance with the present invention.

FIG. 1 is a schematic block diagram of an embodiment of a computing system 10 that includes a real world environment 12, an environment sensor module 14, and environment model database 16, a human interface module 18, and a computing entity 20. The real-world environment 12 includes places 22, objects 24, instructors 26-1 through 26-N, and learners 28-1 through 28-N. The computing entity 20 includes an experience creation module 30, an experience execution module 32, and a learning assets database 34.

The places 22 includes any area. Examples of places 22 includes a room, an outdoor space, a neighborhood, a city, etc. The objects 24 includes things within the places. Examples of objects 24 includes people, equipment, furniture, personal items, tools, and representations of information (i.e., video recordings, audio recordings, captured text, etc.). The instructors includes any entity (e.g., human or human proxy) imparting knowledge. The learners includes entities trying to gain knowledge and may temporarily serve as an instructor.

In an example of operation of the computing system 10, the experience creation module 30 receives environment sensor information 38 from the environment sensor module 14 based on environment attributes 36 from the real world environment 12. The environment sensor information 38 includes time-based information (e.g., static snapshot, continuous streaming) from environment attributes 36 including XYZ position information, place information, and object information (i.e., background, foreground, instructor, learner, etc.). The XYZ position information includes portrayal in a world space industry standard format (e.g., with reference to an absolute position).

The environment attributes 36 includes detectable measures of the real-world environment 12 to facilitate generation of a multi-dimensional (e.g., including time) representation of the real-world environment 12 in a virtual reality and/or augmented reality environment. For example, the environment sensor module 14 produces environment sensor information 38 associated with a medical examination room and a subject human patient (e.g., an MRI). The environment sensor module 14 is discussed in greater detail with reference to FIG. 4.

Having received the environment sensor information 38, the experience creation module 30 accesses the environment model database 16 to recover modeled environment information 40. The modeled environment information 40 includes a synthetic representation of numerous environments (e.g., model places and objects). For example, the modeled environment information 40 includes a 3-D representation of a typical human circulatory system. The models include those that are associated with certain licensing requirements (e.g., copyrights, etc.).

Having received the modeled environment information 40, the experience creation module 30 receives instructor information 44 from the human interface module 18, where the human interface module 18 receives human input/output (I/O) 42 from instructor 26-1. The instructor information 44 includes a representation of an essence of communication with a participant instructor. The human I/O 42 includes detectable fundamental forms of communication with humans or human proxies. The human interface module 18 is discussed in greater detail with reference to FIG. 3.

Having received the instructor information 44, the experience creation module 30 interprets the instructor information 44 to identify aspects of a learning experience. A learning experience includes numerous aspects of an encounter between one or more learners and an imparting of knowledge within a representation of a learning environment that includes a place, multiple objects, and one or more instructors. The learning experience further includes an instruction portion (e.g., acts to impart knowledge) and an assessment portion (e.g., further acts and/or receiving of learner input) to determine a level of comprehension of the knowledge by the one or more learners. The learning experience still further includes scoring of the level of comprehension and tallying multiple learning experiences to facilitate higher-level competency accreditations (e.g., certificates, degrees, licenses, training credits, experiences completed successfully, etc.).

As an example of the interpreting of the instructor information 44, the experience creation module 30 identifies a set of concepts that the instructor desires to impart upon a learner and a set of comprehension verifying questions and associated correct answers. The experience creation module 30 further identifies step-by-step instructor annotations associated with the various objects within the environment of the learning experience for the instruction portion and the assessment portion. For example, the experience creation module 30 identifies positions held by the instructor 26-1 as the instructor narrates a set of concepts associated with the subject patient circulatory system. As a further example, the experience creation module 30 identifies circulatory system questions and correct answers posed by the instructor associated with the narrative.

Having interpreted the instructor information 44, the experience creation module 30 renders the environment sensor information 38, the modeled environment information 40, and the instructor information 44 to produce learning assets information 48 for storage in the learning assets database 34. The learning assets information 48 includes all things associated with the learning experience to facilitate subsequent recreation. Examples includes the environment, places, objects, instructors, learners, assets, recorded instruction information, learning evaluation information, etc.

Execution of a learning experience for the one or more learners includes a variety of approaches. A first approach includes the experience execution module 32 recovering the learning assets information 48 from the learning assets database 34, rendering the learning experience as learner information 46, and outputting the learner information 46 via the human interface module 18 as further human I/O 42 to one or more of the learners 28-1 through 28-N. The learner information 46 includes information to be sent to the one or more learners and information received from the one or more learners. For example, the experience execution module 32 outputs learner information 46 associated with the instruction portion for the learner 28-1 and collects learner information 46 from the learner 28-1 that includes submitted assessment answers in response to assessment questions of the assessment portion communicated as further learner information 46 for the learner 28-1.

A second approach includes the experience execution module 32 rendering the learner information 46 as a combination of live streaming of environment sensor information 38 from the real-world environment 12 along with an augmented reality overlay based on recovered learning asset information 48. For example, a real world subject human patient in a medical examination room is live streamed as the environment sensor information 38 in combination with a prerecorded instruction portion from the instructor 26-1.

Figure 2A:
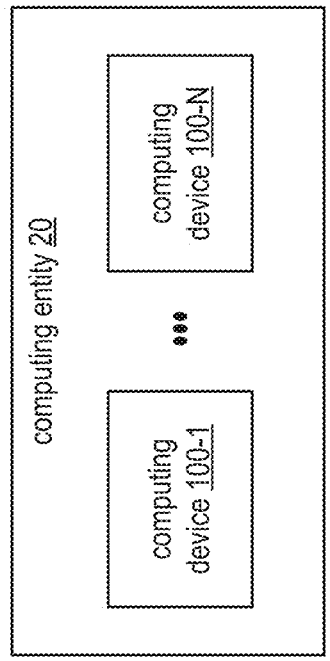
FIG. 2A is a schematic block diagram of an embodiment of a computing entity of a computing system in accordance with the present invention.

FIG. 2A is a schematic block diagram of an embodiment of the computing entity 20 of the computing system 10. The computing entity 20 includes one or more computing devices 100-1 through 100-N. A computing device is any electronic device that communicates data, processes data, represents data (e.g., user interface) and/or stores data.

Computing devices include portable computing devices and fixed computing devices. Examples of portable computing devices include an embedded controller, a smart sensor, a social networking device, a gaming device, a smart phone, a laptop computer, a tablet computer, a video game controller, and/or any other portable device that includes a computing core. Examples of fixed computing devices includes a personal computer, a computer server, a cable set-top box, a fixed display device, an appliance, and industrial controller, a video game counsel, a home entertainment controller, a critical infrastructure controller, and/or any type of home, office or cloud computing equipment that includes a computing core.

Figure 2B:
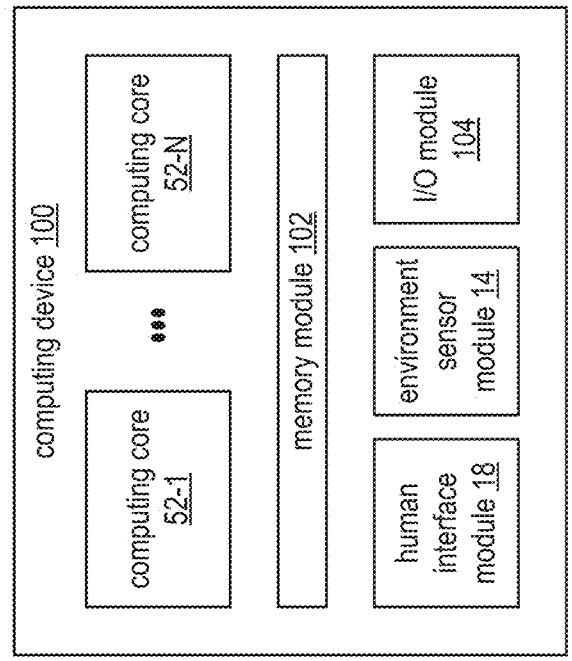
FIG. 2B is a schematic block diagram of an embodiment of a computing device of a computing system in accordance with the present invention.

FIG. 2B is a schematic block diagram of an embodiment of a computing device 100 of the computing system 10 that includes one or more computing cores 52-1 through 52-N, a memory module 102, the human interface module 18, the environment sensor module 14, and an I/O module 104. In alternative embodiments, the human interface module 18, the environment sensor module 14, the I/O module 104, and the memory module 102 may be standalone (e.g., external to the computing device). An embodiment of the computing device 100 will be discussed in greater detail with reference to FIG. 3.

Figure 3:
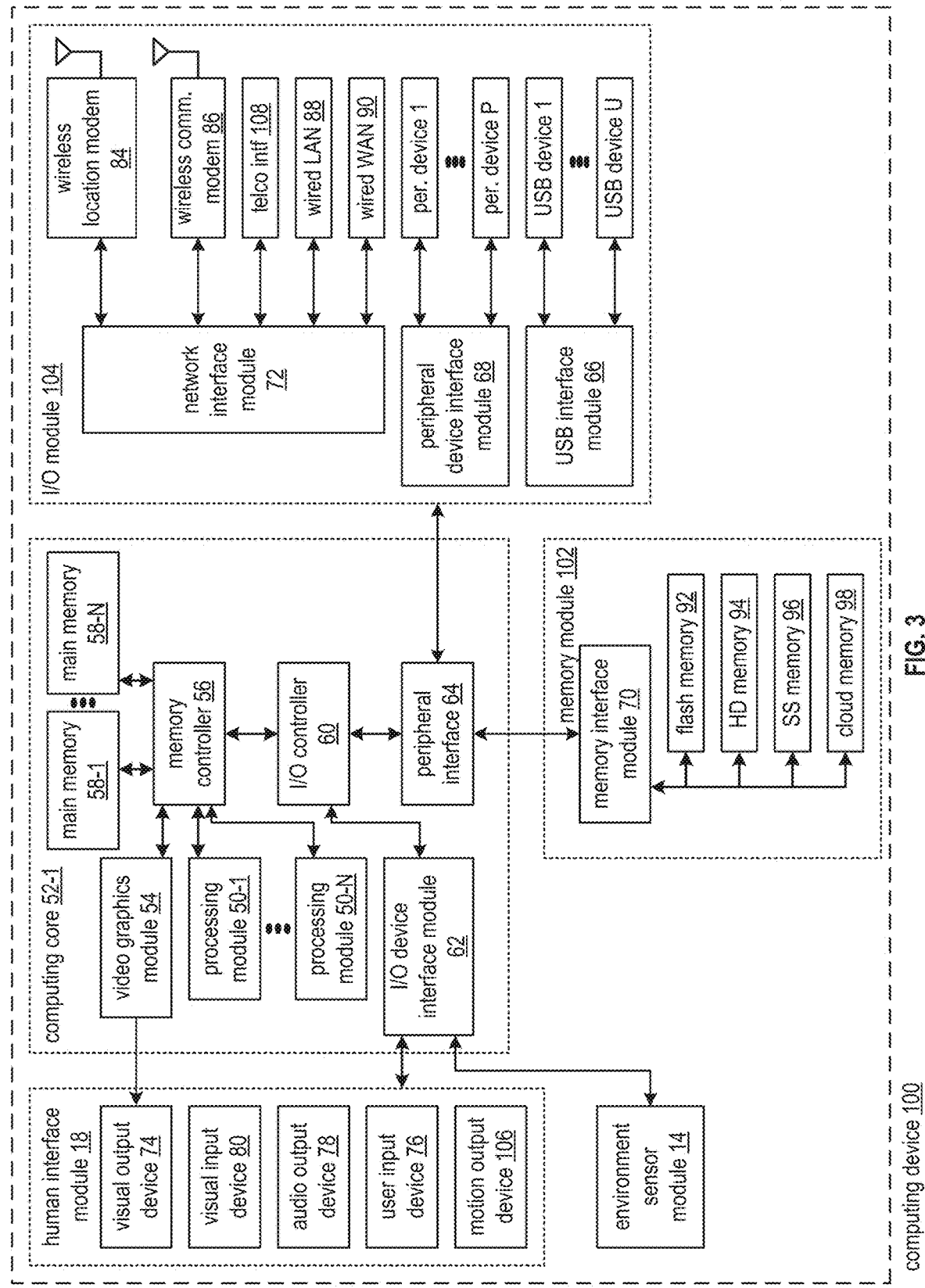
FIG. 3 is a schematic block diagram of another embodiment of a computing device of a computing system in accordance with the present invention.

FIG. 3 is a schematic block diagram of another embodiment of the computing device 100 of the computing system 10 that includes the human interface module 18, the environment sensor module 14, the computing core 52-1, the memory module 102, and the I/O module 104. The human interface module 18 includes one or more visual output devices 74 (e.g., video graphics display, 3-D viewer, touchscreen, LED, etc.), one or more visual input devices 80 (e.g., a still image camera, a video camera, a 3-D video camera, photocell, etc.), and one or more audio output devices 78 (e.g., speaker(s), headphone jack, a motor, etc.). The human interface module 18 further includes one or more user input devices 76 (e.g., keypad, keyboard, touchscreen, voice to text, a push button, a microphone, a card reader, a door position switch, a biometric input device, etc.) and one or more motion output devices 106 (e.g., servos, motors, lifts, pumps, actuators, anything to get real-world objects to move).

The computing core 52-1 includes a video graphics module 54, one or more processing modules 50-1 through 50-N, a memory controller 56, one or more main memories 58-1 through 58-N (e.g., RAM), one or more input/output (I/O) device interface modules 62, an input/output (I/O) controller 60, and a peripheral interface 64. A processing module is as defined at the end of the detailed description.

The memory module 102 includes a memory interface module 70 and one or more memory devices, including flash memory devices 92, hard drive (HD) memory 94, solid state (SS) memory 96, and cloud memory 98. The cloud memory 98 includes an on-line storage system and an on-line backup system.

The I/O module 104 includes a network interface module 72, a peripheral device interface module 68, and a universal serial bus (USB) interface module 66. Each of the I/O device interface module 62, the peripheral interface 64, the memory interface module 70, the network interface module 72, the peripheral device interface module 68, and the USB interface modules 66 includes a combination of hardware (e.g., connectors, wiring, etc.) and operational instructions stored on memory (e.g., driver software) that are executed by one or more of the processing modules 50-1 through 50-N and/or a processing circuit within the particular module.

The I/O module 104 further includes one or more wireless location modems 84 (e.g., global positioning satellite (GPS), Wi-Fi, angle of arrival, time difference of arrival, signal strength, dedicated wireless location, etc.) and one or more wireless communication modems 86 (e.g., a cellular network transceiver, a wireless data network transceiver, a Wi-Fi transceiver, a Bluetooth transceiver, a 315 MHz transceiver, a zig bee transceiver, a 60 GHz transceiver, etc.). The I/O module 104 further includes a telco interface 108 (e.g., to interface to a public switched telephone network), a wired local area network (LAN) 88 (e.g., optical, electrical), and a wired wide area network (WAN) 90 (e.g., optical, electrical). The I/O module 104 further includes one or more peripheral devices (e.g., peripheral devices 1-P) and one or more universal serial bus (USB) devices (USB devices 1-U). In other embodiments, the computing device 100 may include more or less devices and modules than shown in this example embodiment.

Figure 4:
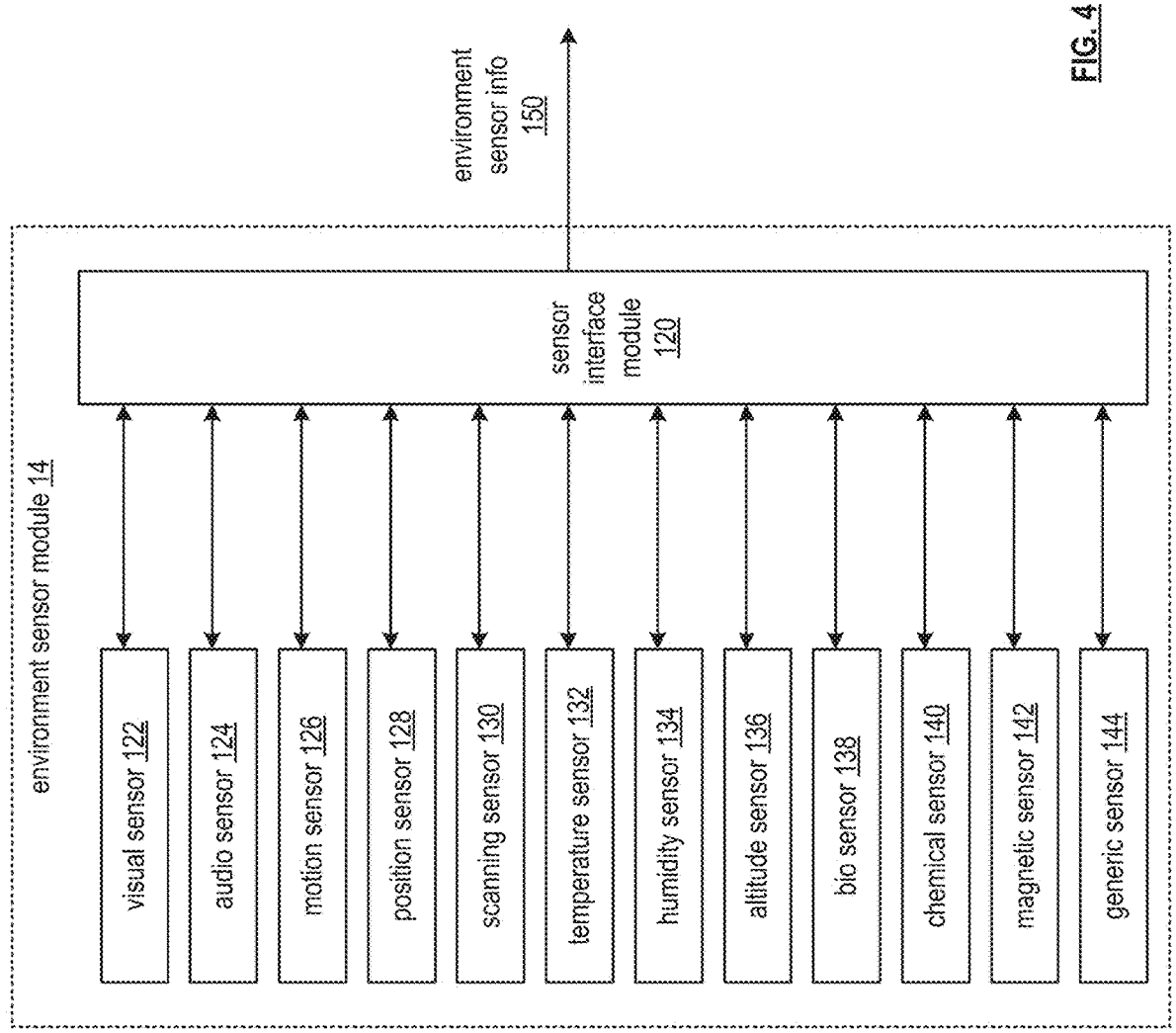
FIG. 4 is a schematic block diagram of an embodiment of an environment sensor module of a computing system in accordance with the present invention.

FIG. 4 is a schematic block diagram of an embodiment of the environment sensor module 14 of the computing system 10 that includes a sensor interface module 120 to output environment sensor information 150 based on information communicated with a set of sensors. The set of sensors includes a visual sensor 122 (e.g., 2-D camera, 3-D camera, 360° view camera, a camera array, an optical spectrometer, etc.) and an audio sensor 124 (e.g., a microphone, a microphone array). The set of sensors further includes a motion sensor 126 (e.g., a solid-state Gyro, a vibration detector, a laser motion detector) and a position sensor 128 (e.g., a Hall effect sensor, an image detector, a GPS receiver, a radar system).

The set of sensors further includes a scanning sensor 130 (e.g., CAT scan, Mill, x-ray, ultrasound, radio scatter, particle detector, laser measure, further radar) and a temperature sensor 132 (e.g., thermometer, thermal coupler). The set of sensors further includes a humidity sensor 134 (resistance based, capacitance based) and an altitude sensor 136 (e.g., pressure based, GPS-based, laser-based).

The set of sensors further includes a biosensor 138 (e.g., enzyme, immuno, microbial) and a chemical sensor 140 (e.g., mass spectrometer, gas, polymer). The set of sensors further includes a magnetic sensor 142 (e.g., Hall effect, piezo electric, coil, magnetic tunnel junction) and any generic sensor 144 (e.g., including a hybrid combination of two or more of the other sensors).

Figure 5A:
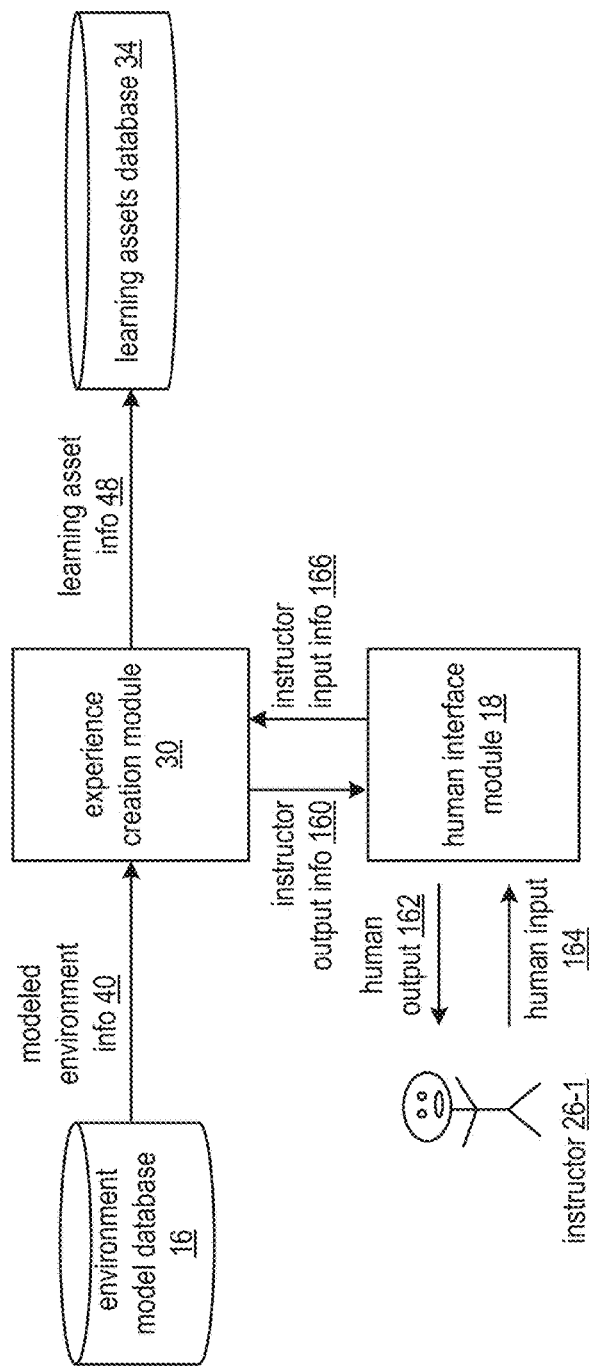
FIG. 5A is a schematic block diagram of another embodiment of a computing system in accordance with the present invention.

FIG. 5A is a schematic block diagram of another embodiment of a computing system that includes the environment model database 16, the human interface module 18, the instructor 26-1, the experience creation module 30, and the learning assets database 34 of FIG. 1. In an example of operation, the experience creation module 30 obtains modeled environment information 40 from the environment model database 16 and renders a representation of an environment and objects of the modeled environment information 40 to output as instructor output information 160. The human interface module 18 transforms the instructor output information 160 into human output 162 for presentation to the instructor 26-1. For example, the human output 162 includes a 3-D visualization and stereo audio output.

In response to the human output 162, the human interface module 18 receives human input 164 from the instructor 26-1. For example, the human input 164 includes pointer movement information and human speech associated with a lesson. The human interface module 18 transforms the human input 164 into instructor input information 166. The instructor input information 166 includes one or more of representations of instructor interactions with objects within the environment and explicit evaluation information (e.g., questions to test for comprehension level, and correct answers to the questions).

Having received the instructor input information 166, the experience creation module 30 renders a representation of the instructor input information 166 within the environment utilizing the objects of the modeled environment information 40 to produce learning asset information 48 for storage in the learnings assets database 34. Subsequent access of the learning assets information 48 facilitates a learning experience.

Figure 5B:
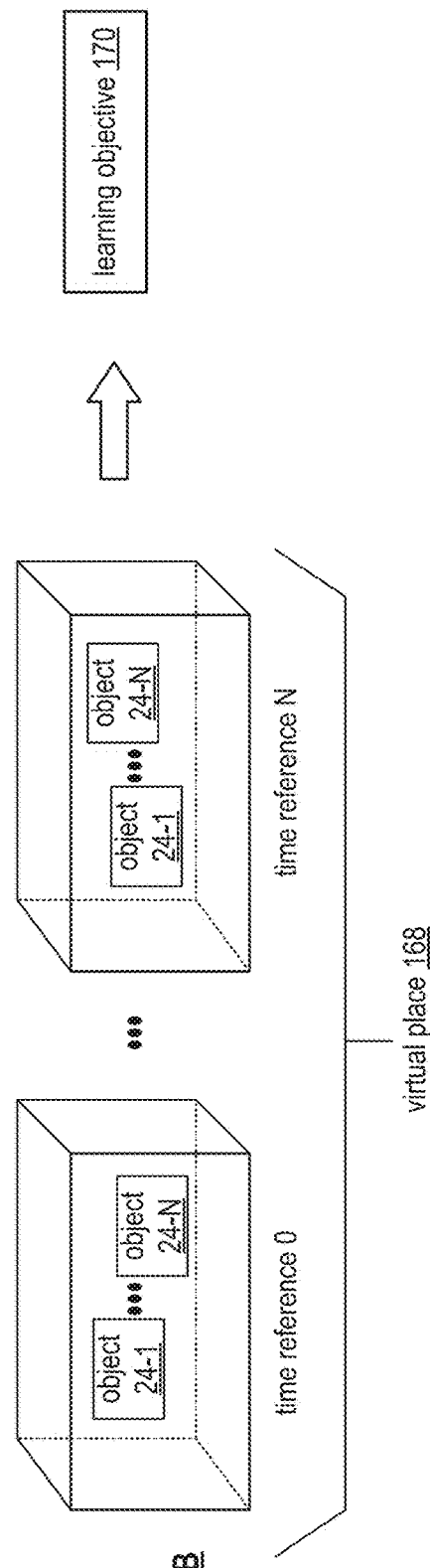
FIG. 5B is a schematic block diagram of an embodiment of a representation of a learning experience in accordance with the present invention.

FIG. 5B is a schematic block diagram of an embodiment of a representation of a learning experience that includes a virtual place 168 and a resulting learning objective 170. A learning objective represents a portion of an overall learning experience, where the learning objective is associated with at least one major concept of knowledge to be imparted to a learner. The major concept may include several sub-concepts. The makeup of the learning objective is discussed in greater detail with reference to FIG. 6.

The virtual place 168 includes a representation of an environment (e.g., a place) over a series of time intervals (e.g., time 0-N). The environment includes a plurality of objects 24-1 through 24-N. At each time reference, the positions of the objects can change in accordance with the learning experience. For example, the instructor 26-1 of FIG. 5A interacts with the objects to convey a concept. The sum of the positions of the environment and objects within the virtual place 168 is wrapped into the learning objective 170 for storage and subsequent utilization when executing the learning experience.

Figure 6:
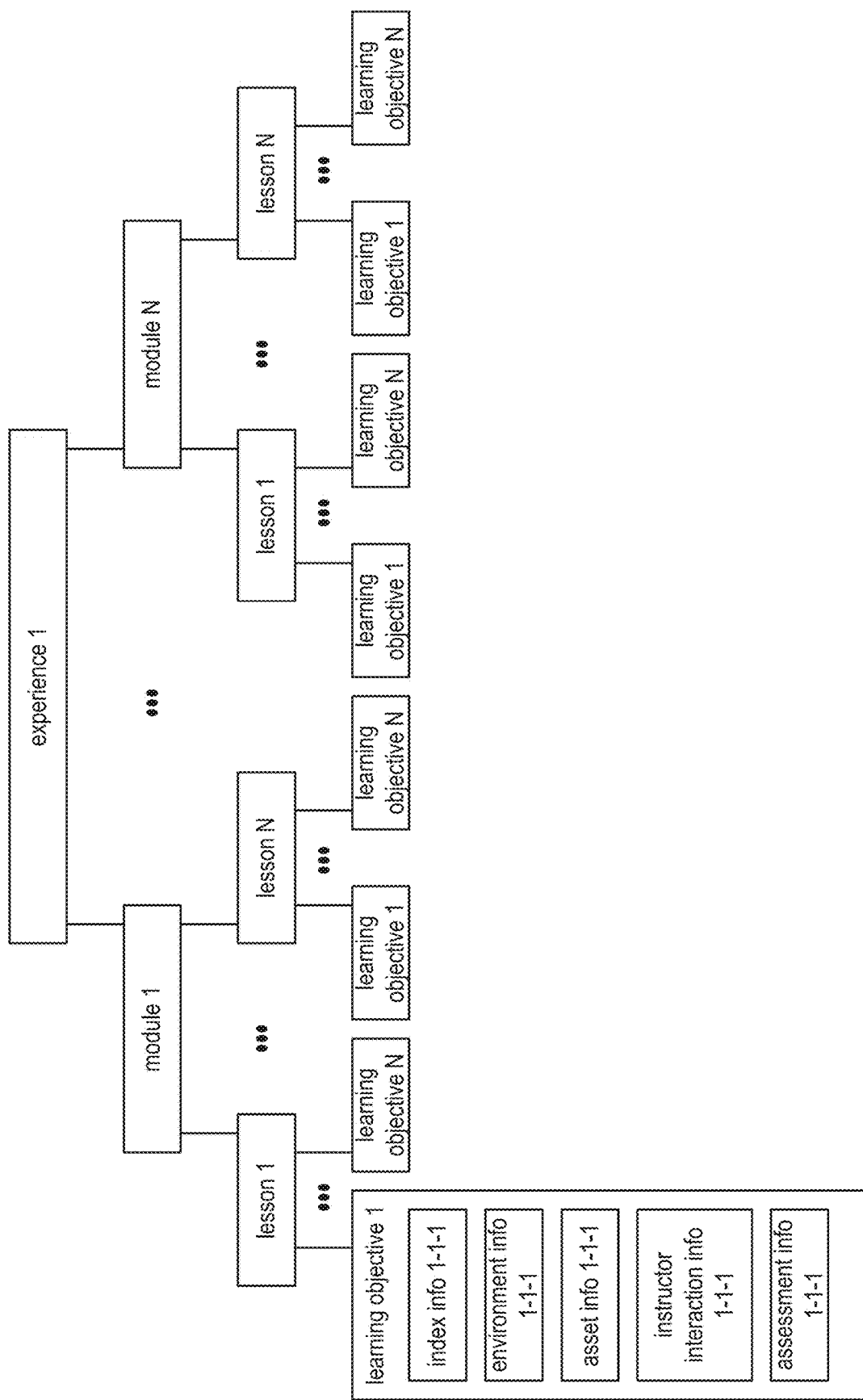
FIG. 6 is a schematic block diagram of another embodiment of a representation of a learning experience in accordance with the present invention.

FIG. 6 is a schematic block diagram of another embodiment of a representation of a learning experience that includes a plurality of modules 1-N. Each module includes a set of lessons 1-N. Each lesson includes a plurality of learning objectives 1-N. The learning experience typically is played from left to right where learning objectives are sequentially executed in lesson 1 of module 1 followed by learning objectives of lesson 2 of module 1 etc.

As learners access the learning experience during execution, the ordering may be accessed in different ways to suit the needs of the unique learner based on one or more of preferences, experience, previously demonstrated comprehension levels, etc. For example, a particular learner may skip over lesson 1 of module 1 and go right to lesson 2 of module 1 when having previously demonstrated competency of the concepts associated with lesson 1.

Each learning objective includes indexing information, environment information, asset information, instructor interaction information, and assessment information. The index information includes one or more of categorization information, topics list, instructor identification, author identification, identification of copyrighted materials, keywords, concept titles, prerequisites for access, and links to related learning objectives.

The environment information includes one or more of structure information, environment model information, background information, identifiers of places, and categories of environments. The asset information includes one or more of object identifiers, object information (e.g., modeling information), asset ownership information, asset type descriptors (e.g., 2-D, 3-D).

Examples include models of physical objects, stored media such as videos, scans, images, digital representations of text, digital audio, and graphics.

The instructor interaction information includes representations of instructor annotations, actions, motions, gestures, expressions, eye movement information, facial expression information, speech, and speech inflections. The content associated with the instructor interaction information includes overview information, speaker notes, actions associated with assessment information, (e.g., pointing to questions, revealing answers to the questions, motioning related to posing questions) and conditional learning objective execution ordering information (e.g., if the learner does this then take this path, otherwise take another path).

The assessment information includes a summary of desired knowledge to impart, specific questions for a learner, correct answers to the specific questions, multiple-choice question sets, and scoring information associated with writing answers. The assessment information further includes historical interactions by other learners with the learning objective (e.g., where did previous learners look most often within the environment of the learning objective, etc.), historical responses to previous comprehension evaluations, and actions to facilitate when a learner responds with a correct or incorrect answer (e.g., motion stimulus to activate upon an incorrect answer to increase a human stress level).

Figure 7A:
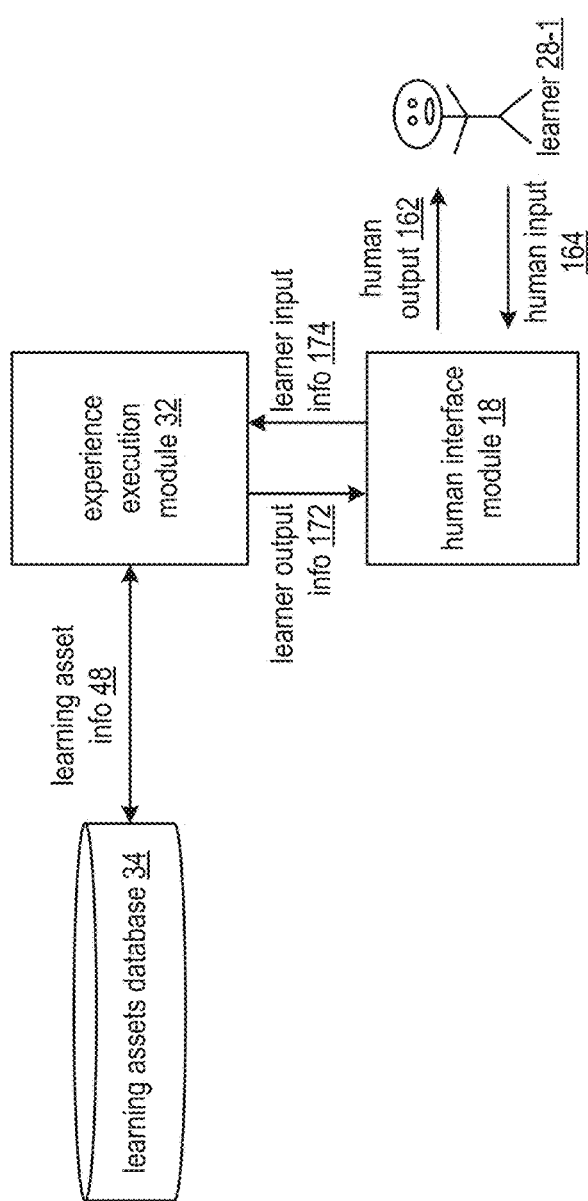
FIG. 7A is a schematic block diagram of another embodiment of a computing system in accordance with the present invention.

FIG. 7A is a schematic block diagram of another embodiment of a computing system that includes the learning assets database 34, the experience execution module 32, the human interface module 18, and the learner 28-1 of FIG. 1. In an example of operation, the experience execution module 32 recovers learning asset information 48 from the learning assets database 34 (e.g., in accordance with a selection by the learner 28-1). The experience execution module 32 renders a group of learning objectives associated with a common lesson within an environment utilizing objects associated with the lesson to produce learner output information 172. The learner output information 172 includes a representation of a virtual place and objects that includes instructor interactions and learner interactions from a perspective of the learner.

The human interface module 18 transforms the learner output information 172 into human output 162 for conveyance of the learner output information 172 to the learner 28-1. For example, the human interface module 18 facilitates displaying a 3-D image of the virtual environment to the learner 28-1.

The human interface module 18 transforms human input 164 from the learner 28-1 to produce learner input information 174. The learner input information 174 includes representations of learner interactions with objects within the virtual place (e.g., answering comprehension level evaluation questions).

The experience execution module 32 updates the representation of the virtual place by modifying the learner output information 172 based on the learner input information 174 so that the learner 28-1 enjoys representations of interactions caused by the learner within the virtual environment. The experience execution module 32 evaluates the learner input information 174 with regards to evaluation information of the learning objectives to evaluate a comprehension level by the learner 28-1 with regards to the set of learning objectives of the lesson.

Figure 7B:
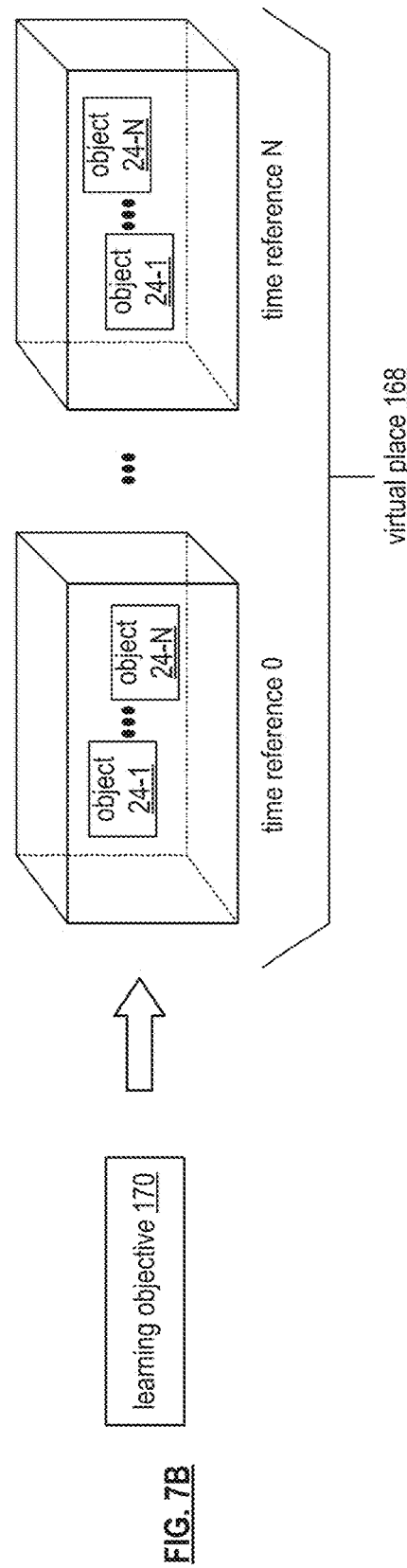
FIG. 7B is a schematic block diagram of another embodiment of a representation of a learning experience in accordance with the present invention.

FIG. 7B is a schematic block diagram of another embodiment of a representation of a learning experience that includes the learning objective 170 and the virtual place 168. In an example of operation, the learning objective 170 is recovered from the learning assets database 34 of FIG. 7A and rendered to create the virtual place 168 representations of objects 24-1 through 24-N in the environment from time references zero through N. For example, a first object is the instructor 26-1 of FIG. 5A, a second object is the learner 28-1 of FIG. 7A, and the remaining objects are associated with the learning objectives of the lesson, where the objects are manipulated in accordance with annotations of instructions provided by the instructor 26-1.

The learner 28-1 experiences a unique viewpoint of the environment and gains knowledge from accessing (e.g., playing) the learning experience. The learner 28-1 further manipulates objects within the environment to support learning and assessment of comprehension of objectives of the learning experience.

Figure 8A:
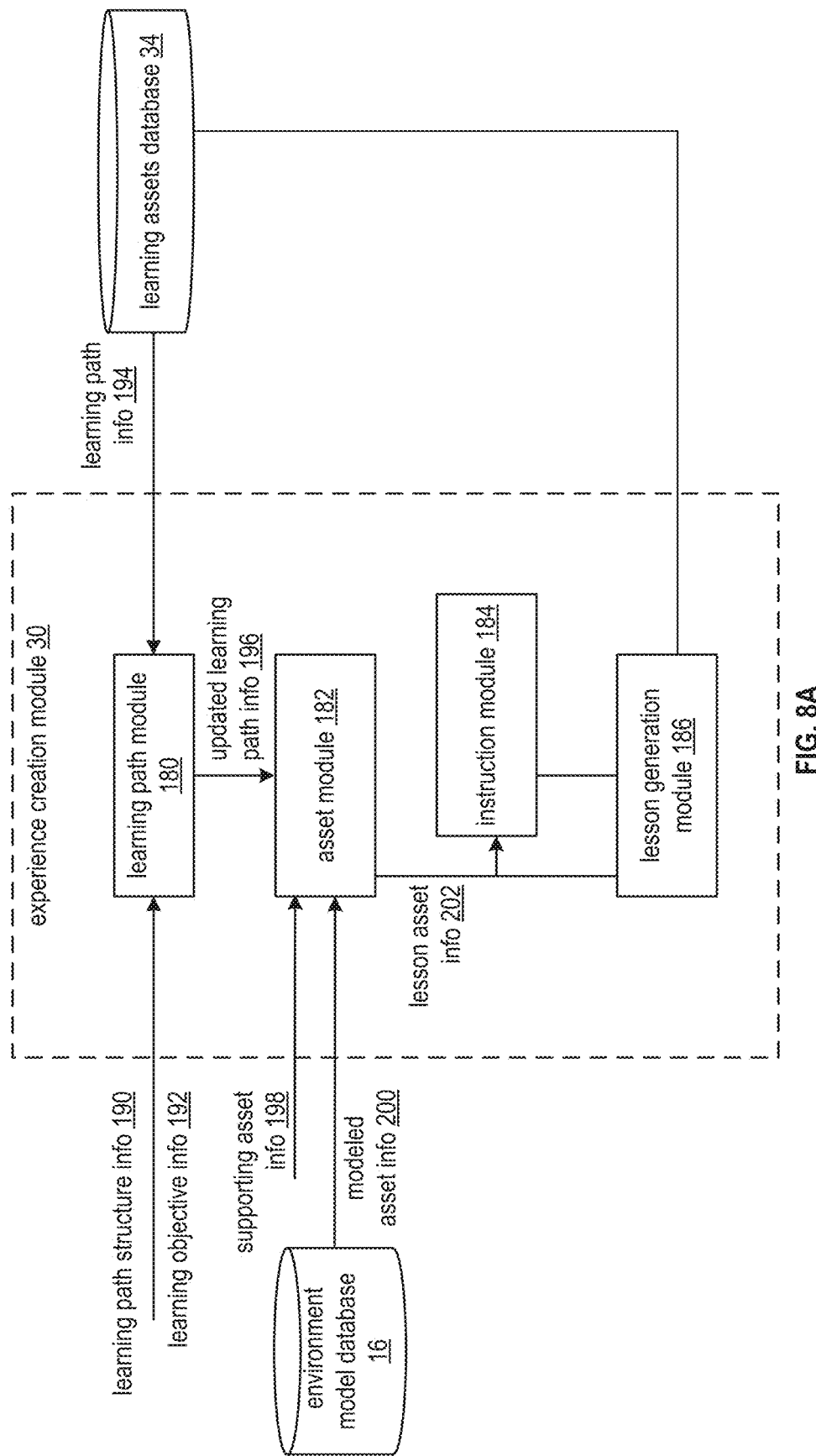
FIGS. 8A-8C are schematic block diagrams of another embodiment of a computing system illustrating an example of creating a learning experience in accordance with the present invention.
Figure 8B:
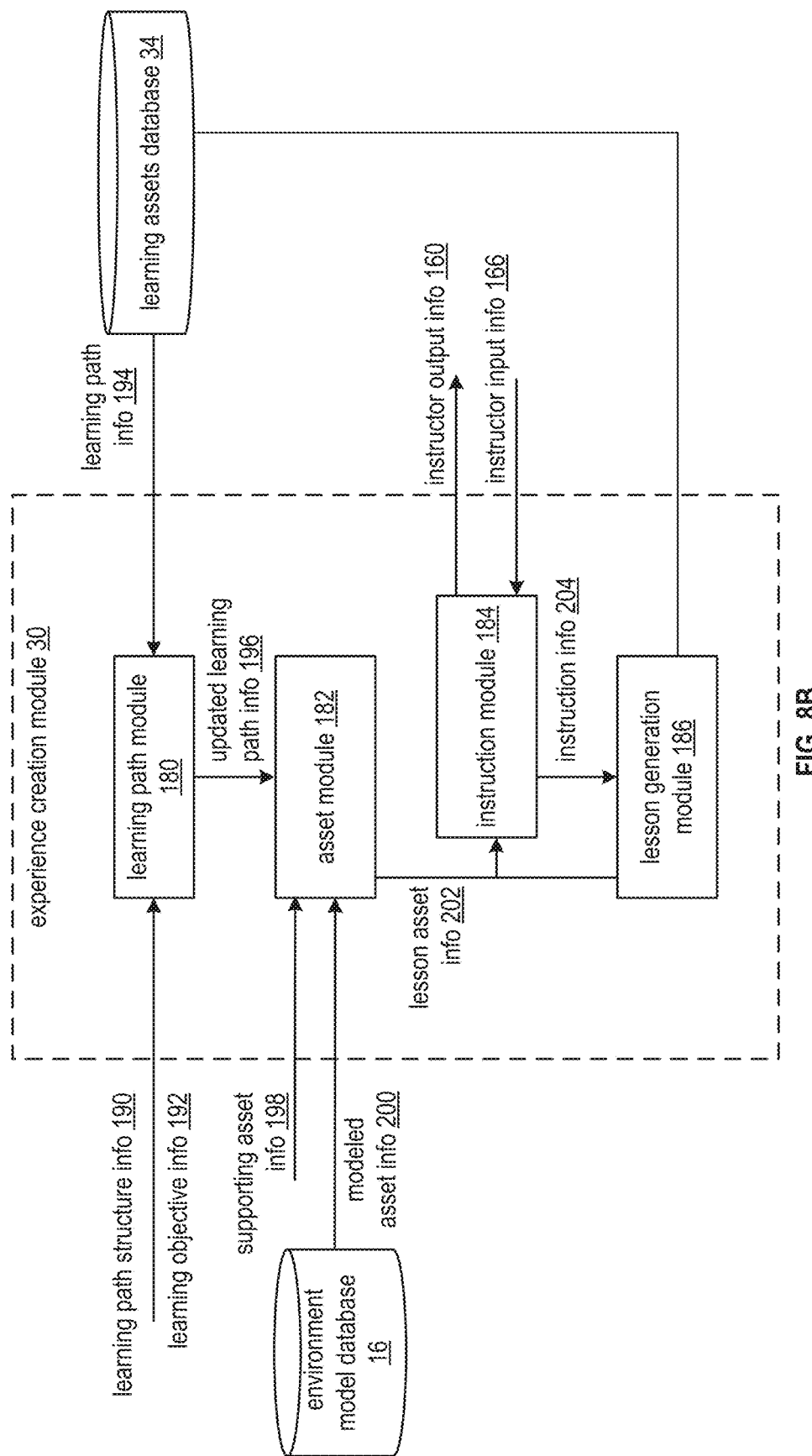
Figure 8C:
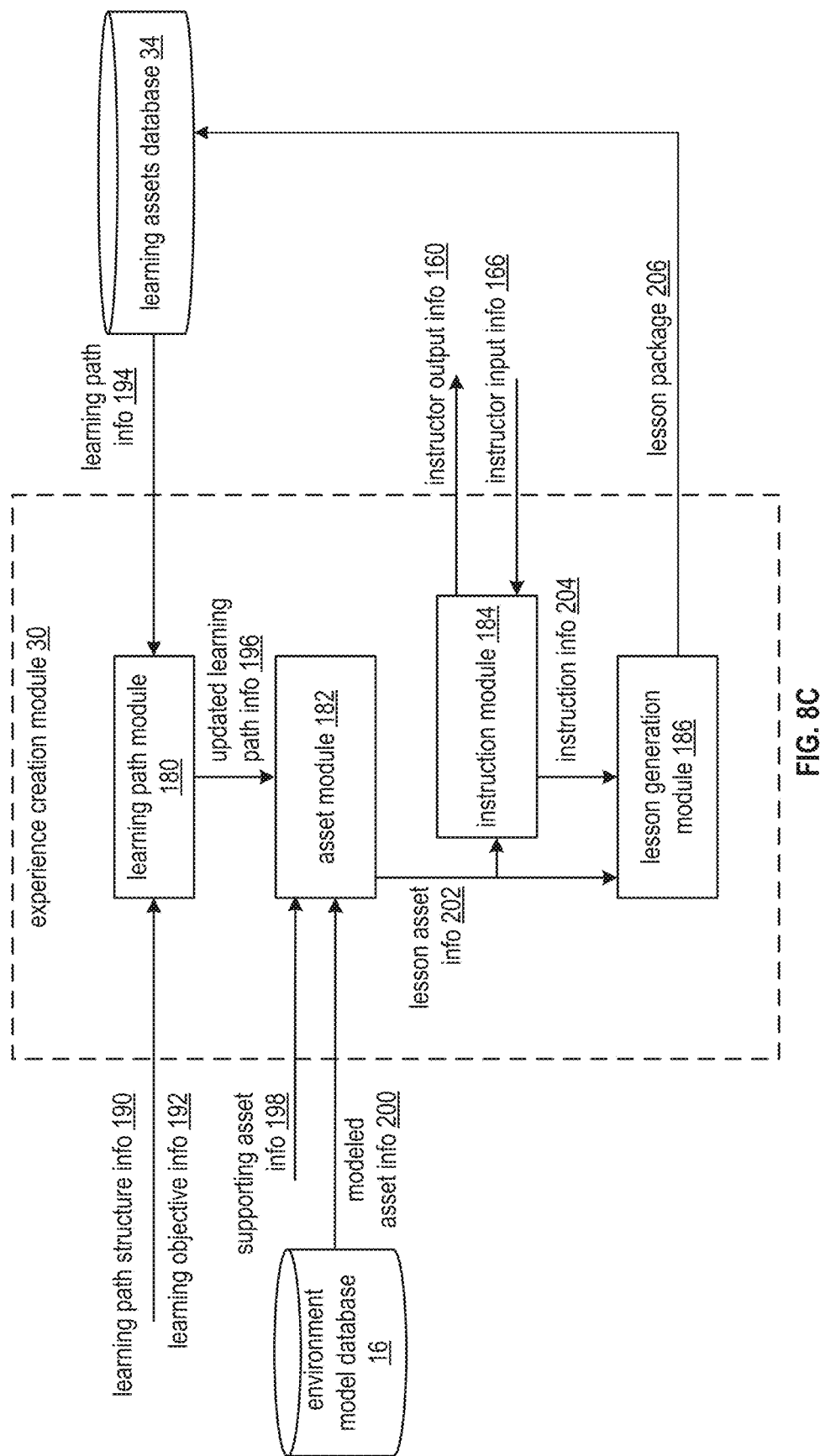

FIGS. 8A-8C are schematic block diagrams of another embodiment of a computing system illustrating an example of creating a learning experience. The computing system includes the environment model database 16, the experience creation module 30, and the learning assets database 34 of FIG. 1. The experience creation module 30 includes a learning path module 180, an asset module 182, an instruction module 184, and a lesson generation module 186.

In an example of operation, FIG. 8A illustrates the learning path module 180 determining a learning path (e.g., structure and ordering of learning objectives to complete towards a goal such as a certificate or degree) to include multiple modules and/or lessons. For example, the learning path module 180 obtains learning path information 194 from the learning assets database 34 and receives learning path structure information 190 and learning objective information 192 (e.g., from an instructor) to generate updated learning path information 196.

The learning path structure information 190 includes attributes of the learning path and the learning objective information 192 includes a summary of desired knowledge to impart. The updated learning path information 196 is generated to include modifications to the learning path information 194 in accordance with the learning path structure information 190 in the learning objective information 192.

The asset module 182 determines a collection of common assets for each lesson of the learning path. For example, the asset module 182 receives supporting asset information 198 (e.g., representation information of objects in the virtual space) and modeled asset information 200 from the environment model database 16 to produce lesson asset information 202. The modeled asset information 200 includes representations of an environment to support the updated learning path information 196 (e.g., modeled places and modeled objects) and the lesson asset information 202 includes a representation of the environment, learning path, the objectives, and the desired knowledge to impart.

FIG. 8B further illustrates the example of operation where the instruction module 184 outputs a representation of the lesson asset information 202 as instructor output information 160. The instructor output information 160 includes a representation of the environment and the asset so far to be experienced by an instructor who is about to input interactions with the environment to impart the desired knowledge.

The instruction module 184 receives instructor input information 166 from the instructor in response to the instructor output information 160. The instructor input information 166 includes interactions from the instructor to facilitate imparting of the knowledge (e.g., instructor annotations, pointer movements, highlighting, text notes, and speech) and testing of comprehension of the knowledge (e.g., valuation information such as questions and correct answers). The instruction module 184 obtains assessment information (e.g., comprehension test points, questions, correct answers to the questions) for each learning objective based on the lesson asset information 202 and produces instruction information 204 (e.g., representation of instructor interactions with objects within the virtual place, evaluation information).

FIG. 8C further illustrates the example of operation where the lesson generation module 186 renders (e.g., as a multi-dimensional representation) the objects associated with each lesson (e.g., assets of the environment) within the environment in accordance with the instructor interactions for the instruction portion and the assessment portion of the learning experience. Each object is assigned a relative position in XYZ world space within the environment to produce the lesson rendering.

The lesson generation module 186 outputs the rendering as a lesson package 206 for storage in the learning assets database 34. The lesson package 206 includes everything required to replay the lesson for a subsequent learner (e.g., representation of the environment, the objects, the interactions of the instructor during both the instruction and evaluation portions, questions to test comprehension, correct answers to the questions, a scoring approach for evaluating comprehension, all of the learning objective information associated with each learning objective of the lesson).

Figure 8D:
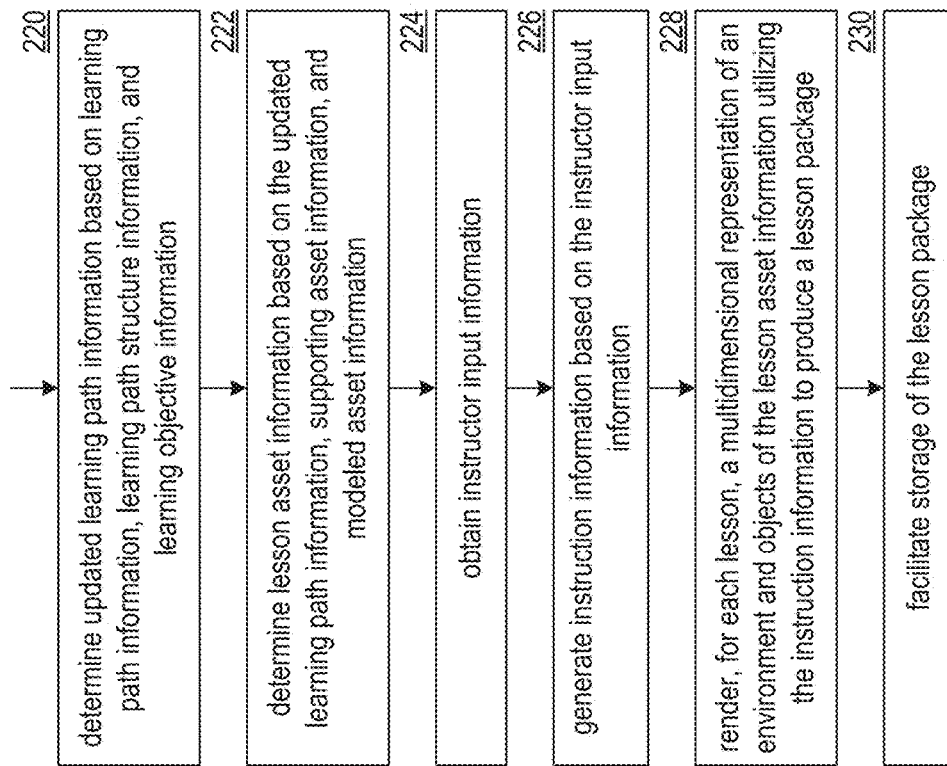
FIG. 8D is a logic diagram of an embodiment of a method for creating a learning experience within a computing system in accordance with the present invention.

FIG. 8D is a logic diagram of an embodiment of a method for creating a learning experience within a computing system (e.g., the computing system 10 of FIG. 1). In particular, a method is presented in conjunction with one or more functions and features described in conjunction with FIGS. 1-7B, and also FIGS. 8A-8C. The method includes step 220 where a processing module of one or more processing modules of one or more computing devices within the computing system determines updated learning path information based on learning path information, learning path structure information, and learning objective information. For example, the processing module combines a previous learning path with obtained learning path structure information in accordance with learning objective information to produce the updated learning path information (i.e., specifics for a series of learning objectives of a lesson).

The method continues at step 222 where the processing module determines lesson asset information based on the updated learning path information, supporting asset information, and modeled asset information. For example, the processing module combines assets of the supporting asset information (e.g., received from an instructor) with assets and a place of the modeled asset information in accordance with the updated learning path information to produce the lesson asset information. The processing module selects assets as appropriate for each learning objective (e.g., to facilitate the imparting of knowledge based on a predetermination and/or historical results).

The method continues at step 224 where the processing module obtains instructor input information. For example, the processing module outputs a representation of the lesson asset information as instructor output information and captures instructor input information for each lesson in response to the instructor output information. The processing module further obtain asset information for each learning objective (e.g., extract from the instructor input information).

The method continues at step 226 where the processing module generates instruction information based on the instructor input information. For example, the processing module combines instructor gestures and further environment manipulations based on the assessment information to produce the instruction information.

The method continues at step 228 where the processing module renders, for each lesson, a multidimensional representation of environment and objects of the lesson asset information utilizing the instruction information to produce a lesson package. For example, the processing module generates the multidimensional representation of the environment that includes the objects and the instructor interactions of the instruction information to produce the lesson package. For instance, the processing module includes a 3-D rendering of a place, background objects, recorded objects, and the instructor in a relative position XYZ world space over time.

The method continues at step 230 where the processing module facilitates storage of the lesson package. For example, the processing module indexes the one or more lesson packages of the one or more lessons of the learning path to produce indexing information (e.g., title, author, instructor identifier, topic area, etc.). The processing module stores the indexed lesson package as learning asset information in a learning assets database.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing devices of the computing system 10, cause the one or more computing devices to perform any or all of the method steps described above.

FIGS. 8E, 8F, 8G, 8H, 8J, and 8K are schematic block diagrams of another embodiment of a computing system illustrating another example of a method to create a learning experience. The embodiment includes creating a multi-disciplined learning tool regarding a topic. The multi-disciplined aspect of the learning tool includes both disciplines of learning and any form/format of presentation of content regarding the topic. For example, a first discipline includes mechanical systems, a second discipline includes electrical systems, and a third discipline includes fluid systems when the topic includes operation of a combustion based engine. The computing system includes the environment model database 16 of FIG. 1, the learning assets database 34 of FIG. 1, and the experience creation module 30 of FIG. 1.

Figure 8E:
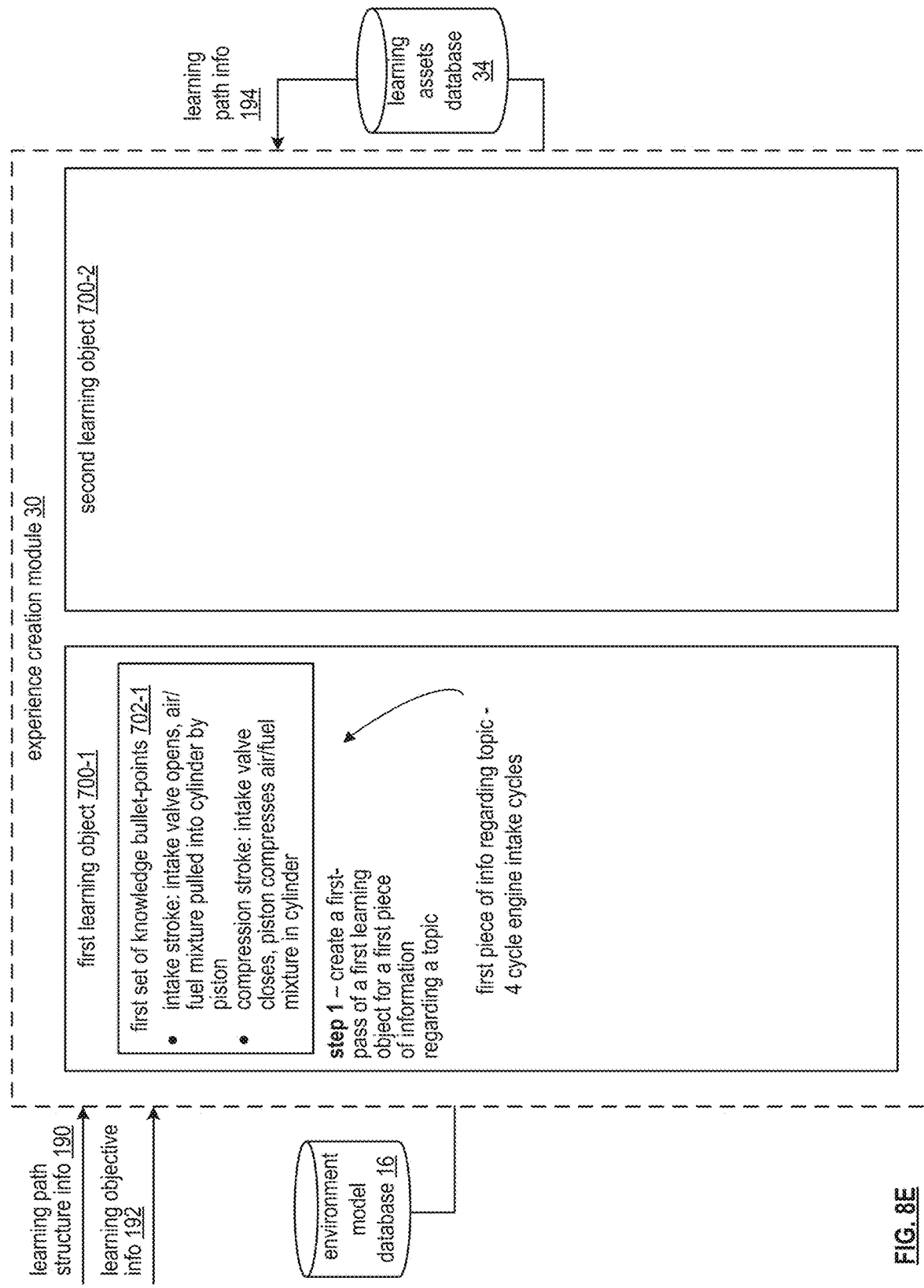

FIG. 8E illustrates the example of operation where the experience creation module 30 creates a first-pass of a first learning object 700-1 for a first piece of information regarding the topic to include a first set of knowledge bullet-points 702-1 regarding the first piece of information. The creating includes utilizing guidance from an instructor and/or reusing previous knowledge bullet-points for a related topic. For example, the experience creation module 30 extracts the bullet-points from one or more of learning path structure information 190 and learning objective information 192 when utilizing the guidance from the instructor. As another example, the experience creation module 30 extracts the bullet-points from learning path information 194 retrieved from the learning assets database 34 when utilizing previous knowledge bullet-points for the related topic.

Each piece of information is to impart additional knowledge related to the topic. The additional knowledge of the piece of information includes a characterization of learnable material by most learners in just a few minutes. As a specific example, the first piece of information includes "4 cycle engine intake cycles" when the topic includes "how a 4 cycle engine works."

Each of the knowledge bullet-points are to impart knowledge associated with the associated piece of information in a logical (e.g., sequential) and knowledge building fashion. As a specific example, the experience creation module 30 creates the first set of knowledge bullet-points 702-1 based on instructor input to include a first bullet-point "intake stroke: intake valve opens, air/fuel mixture pulled into cylinder by piston" and a second bullet-point "compression stroke: intake valve closes, piston compresses air/fuel mixture in cylinder" when the first piece of information includes the "4 cycle engine intake cycles."

Figure 8F:
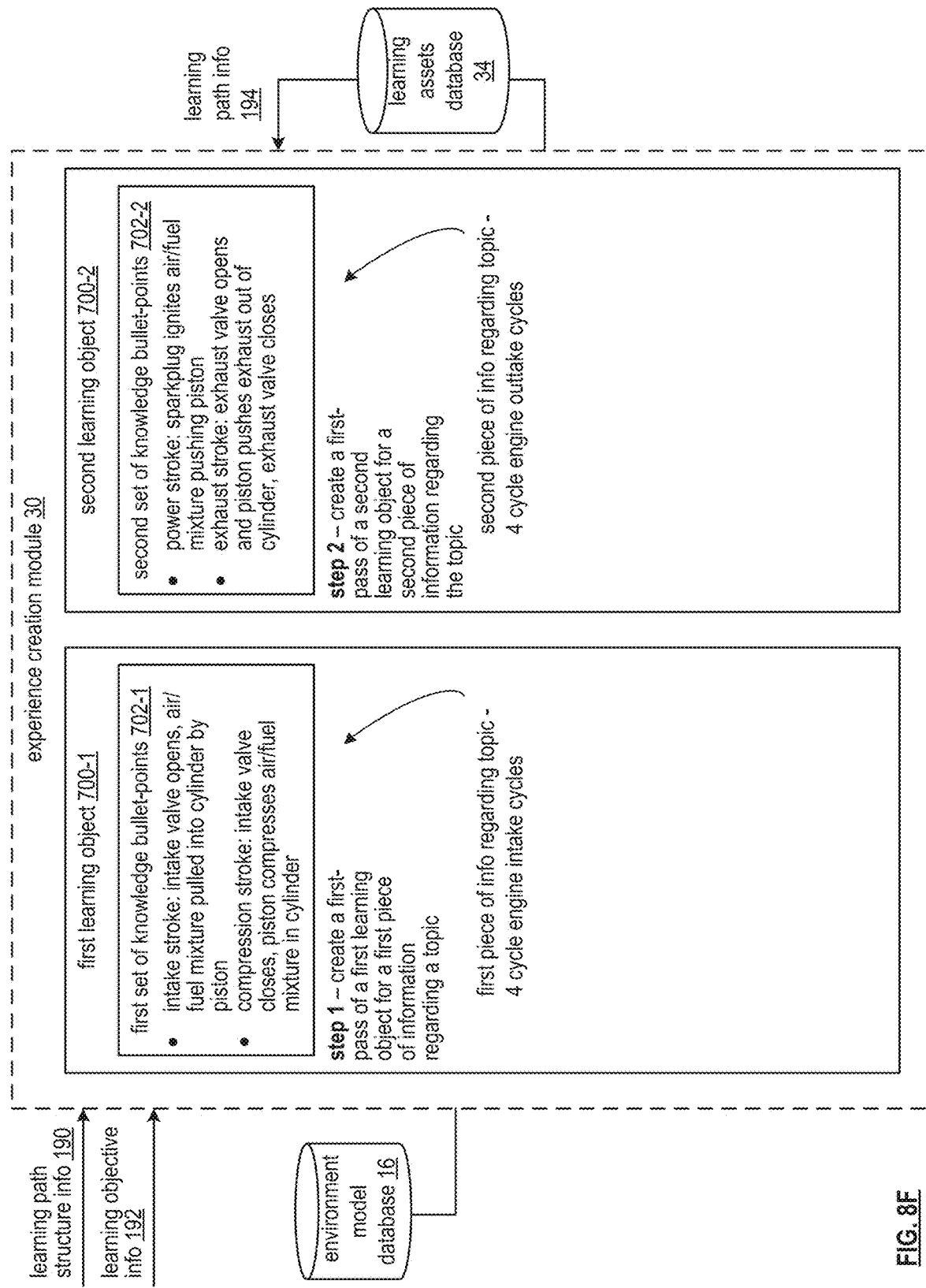

FIG. 8F further illustrates the example of operation where the experience creation module 30 creates a first-pass of a second learning object 700-2 for a second piece of information regarding the topic to include a second set of knowledge bullet-points 702-2 regarding the second piece of information. As a specific example, the experience creation module 30 creates the second set of knowledge bullet-points 702-2 based on the instructor input to include a first bullet-point "power stroke: spark plug ignites air/fuel mixture pushing piston" and a second bullet-point "exhaust stroke: exhaust valve opens and piston pushes exhaust out of cylinder, exhaust valve closes" when the second piece of information includes "4 cycle engine outtake cycles."

Figure 8G:
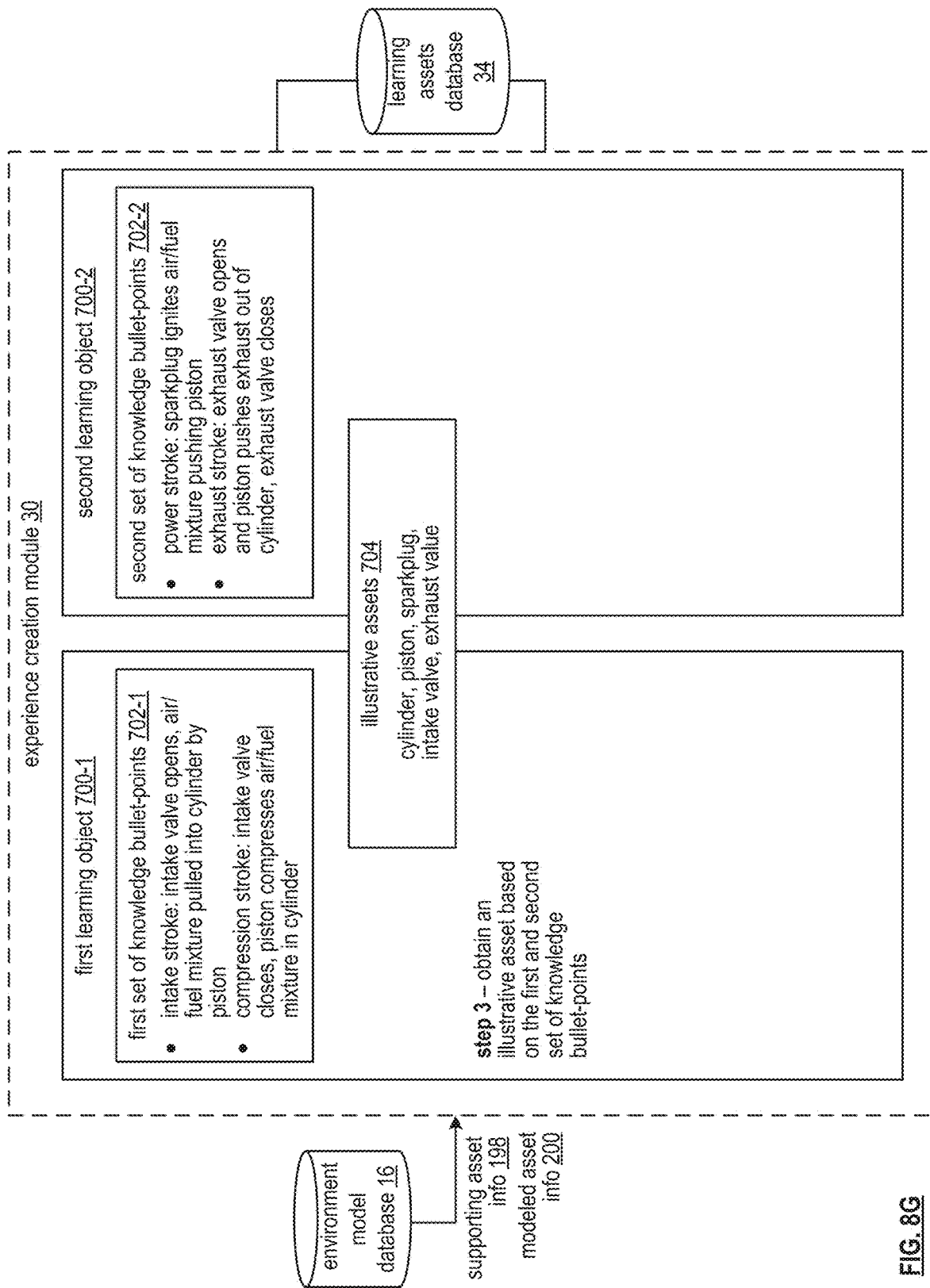

FIG. 8G further illustrates the example of operation where the experience creation module 30 obtains illustrative assets 704 based on the first and second set of knowledge bullet-points 702-1 and 702-2. The illustrative assets 704 depicts one or more aspects regarding the topic pertaining to the first and second pieces of information. Examples of illustrative assets includes background environments, objects within the environment (e.g., things, tools), where the objects and the environment are represented by multidimensional models (e.g., 3-D model) utilizing a variety of representation formats including video, scans, images, text, audio, graphics etc.

The obtaining of the illustrative assets 704 includes a variety of approaches. A first approach includes interpreting instructor input information to identify the illustrative asset. For example, the experience creation module 30 interprets instructor input information to identify a cylinder asset.

A second approach includes identifying a first object of the first and second set of knowledge bullet-points as an illustrative asset. For example, the experience creation module 30 identifies the piston object from both the first and second set of knowledge bullet-points.

A third approach includes determining the illustrative assets 704 based on the first object of the first and second set of knowledge bullet-points. For example, the experience creation module 30 accesses the environment model database 16 to extract information about an asset from one or more of supporting asset information 198 and modeled asset information 200 for a sparkplug when interpreting the first and second set of knowledge bullet-points.

Figure 8H:
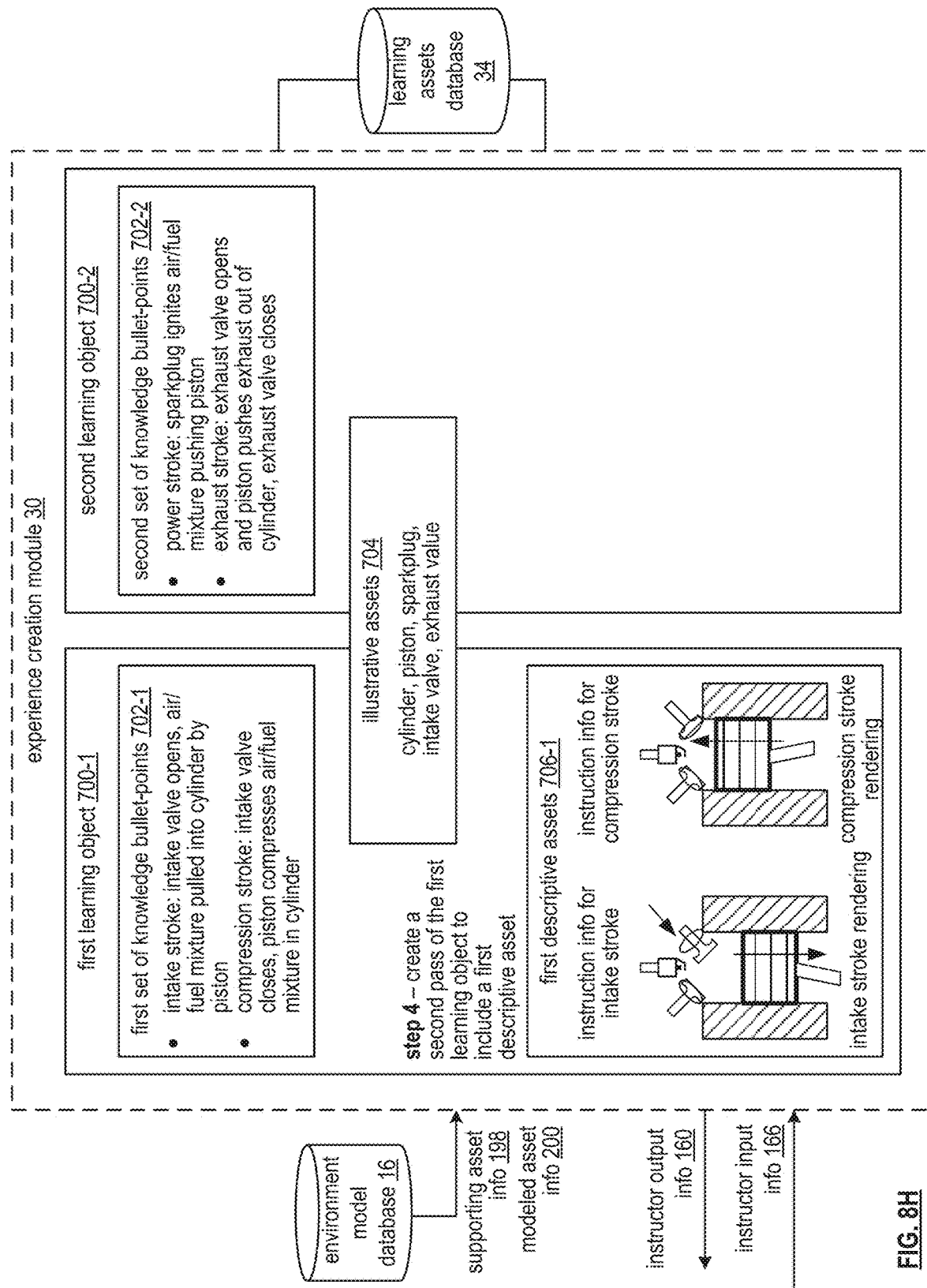

FIG. 8H further illustrates the example of operation where the experience creation module 30 creates a second-pass of the first learning object 700-1 to further include first descriptive assets 706-1 regarding the first piece of information based on the first set of knowledge bullet-points 702-1 and the illustrative assets 704. Descriptive assets include instruction information that utilizes the illustrative asset 704 to impart knowledge and subsequently test for knowledge retention. The embodiments of the descriptive assets includes multiple disciplines and multiple dimensions to provide improved learning by utilizing multiple senses of a learner. Examples of the instruction information includes annotations, actions, motions, gestures, expressions, recorded speech, speech inflection information, review information, speaker notes, and assessment information.

The creating the second-pass of the first learning object 700-1 includes generating a representation of the illustrative assets 704 based on a first knowledge bullet-point of the first set of knowledge bullet-points 702-1. For example, the experience creation module 30 renders 3-D frames of a 3-D model of the cylinder, the piston, the spark plug, the intake valve, and the exhaust valve in motion when performing the intake stroke where the intake valve opens and the air/fuel mixture is pulled into the cylinder by the piston.

The creating of the second-pass of the first learning object 700-1 further includes generating the first descriptive assets 706-1 utilizing the representation of the illustrative assets 704. For example, the experience creation module 30 renders 3-D frames of the 3-D models of the various engine parts without necessarily illustrating the first set of knowledge bullet-points 702-1.

In an embodiment where the experience creation module 30 generates the representation of the illustrative assets 704, the experience creation module 30 outputs the representation of the illustrative asset 704 as instructor output information 160 to an instructor. For example, the 3-D model of the cylinder and associated parts.

The experience creation module 30 receives instructor input information 166 in response to the instructor output information 160. For example, the instructor input information 166 includes instructor annotations to help explain the intake stroke (e.g., instructor speech, instructor pointer motions). The experience creation module 30 interprets the instructor input information 166 to produce the first descriptive assets 706-1. For example, the renderings of the engine parts include the intake stroke as annotated by the instructor.

Figure 8J:
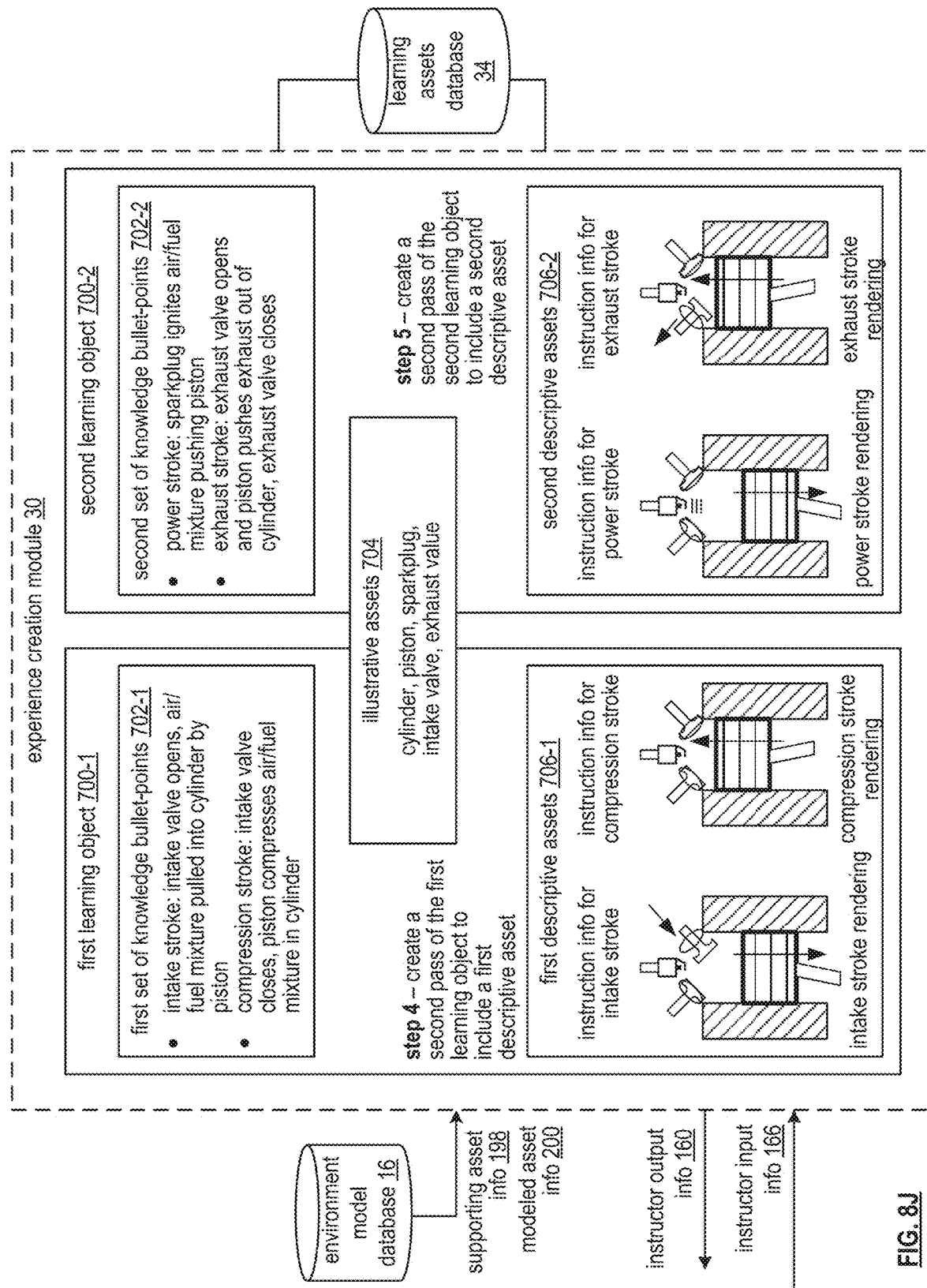

FIG. 8J further illustrates the example of operation where the experience creation module 30 creates a second-pass of the second learning object 700-2 to further include second descriptive assets 706-2 regarding the second piece of information based on the second set of knowledge bullet-points 702-2 and the illustrative assets 704. For example, the experience creation module 30 creates 3-D renderings of the power stroke and the exhaust stroke as annotated by the instructor based on further instructor input information 166.

Figure 8K:
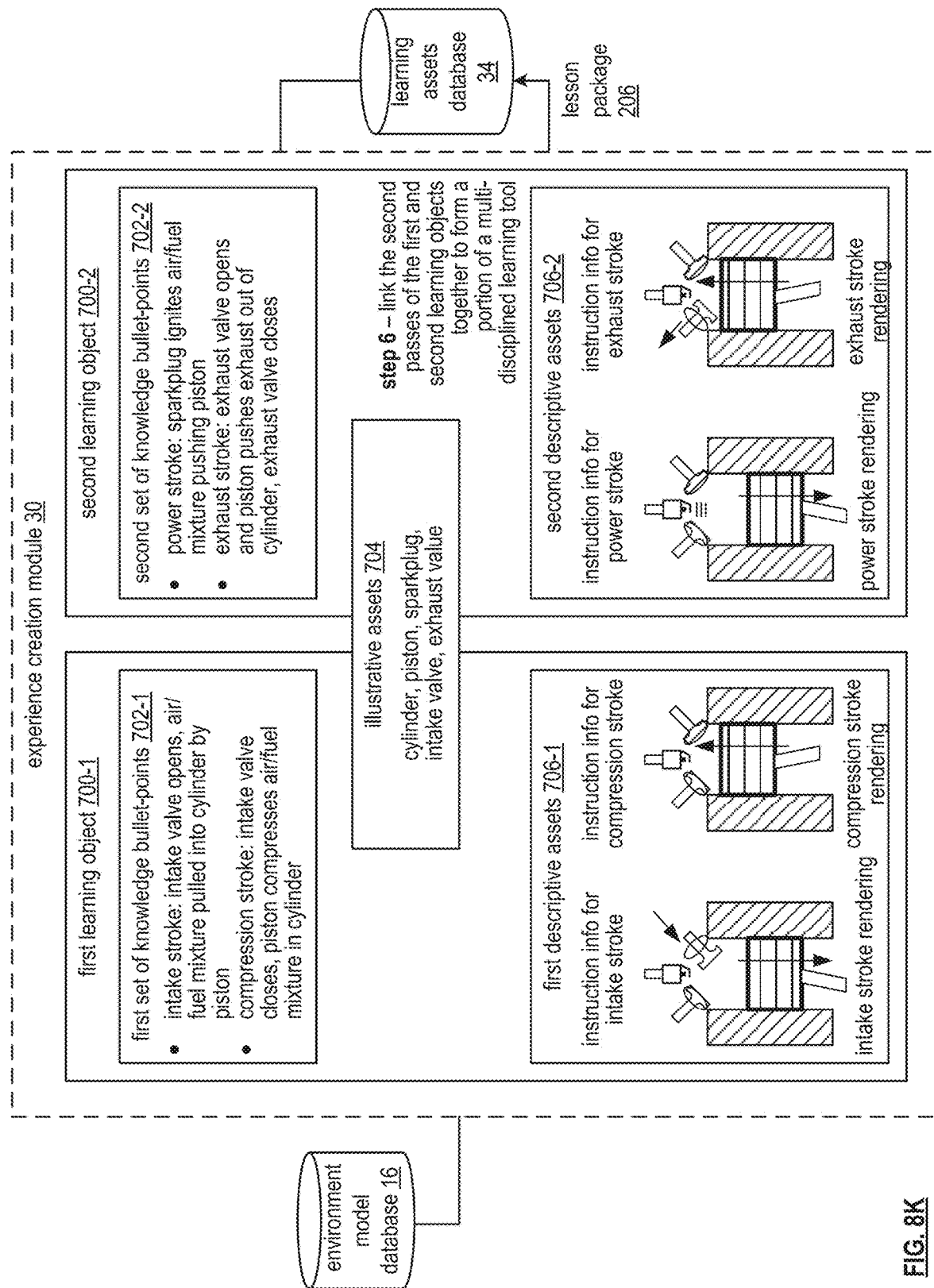

FIG. 8K further illustrates the example of operation where the experience creation module 30 links the second-passes of the first and second learning objects 700-1 and 700-2 together to form at least a portion of the multi-disciplined learning tool. For example, the experience creation module 30 aggregates the first learning object 700-1 and the second learning object 700-2 to produce a lesson package 206 for storage in the learning assets database 34.

In an embodiment, the linking of the second-passes of the first and second learning objects 700-1 and 700-2 together to form the at least the portion of the multi-disciplined learning tool includes generating index information for the second-passes of first and second learning objects to indicate sharing of the illustrative asset 704. For example, the experience creation module 30 generates the index information to identify the first learning object 700-1 and the second learning object 700-2 as related to the same topic.

The linking further includes facilitating storage of the index information and the first and second learning objects 700-1 and 700-2 in the learning assets database 34 to enable subsequent utilization of the multi-disciplined learning tool. For example, the experience creation module 30 aggregates the first learning object 700-1, the second learning object 700-2, and the index information to produce the lesson package 206 for storage in the learning assets database 34.

The method described above with reference to FIGS. 8E-8K in conjunction with the experience creation module 30 can alternatively be performed by other modules of the computing system 10 of FIG. 1 or by other devices including various embodiments of the computing entity 20 of FIG. 2A. In addition, at least one memory section (e.g., a computer readable memory, a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing entities of the computing system 10, cause the one or more computing devices to perform any or all of the method steps described above.

FIG. 9A is a schematic block diagram of a data structure for a smart contract 300 that includes object information 302 and license terms 304. The object information 302 includes object basics (e.g., including links to blockchains and electronic assets), available license terms, and available payment terms. FIG. 9A illustrates examples of each category of the object information 302. Examples of an object of the object information 302 that are associated with training and education offerings include a university course, an education curriculum, an education degree, a training program, a training session, a lesson, a lesson package, and a learning object. Examples of the object of the object information 302 that are associated with a student include a person, a group of students, a class, people that work for a common employer, etc.

The license terms 304 includes licensee information, agreed license terms, and agreed payment terms. FIG. 9A further illustrates examples of each of the categories of the license terms 304.

FIGS. 9B and 9C are schematic block diagrams of organization of object distributed ledgers. FIG. 9B illustrates an example where a single blockchain serves as the object distributed ledger linking a series of blocks of the blockchain, where each block is associated with a different license (e.g., use of training) for a training object associated with a non-fungible token. FIG. 9C illustrates another example where a first blockchain links a series of blocks of different non-fungible tokens for different sets of training object licenses. Each block forms a blockchain of its own where each further block of its own is associated with a different license for the set of training objects of the non-fungible token.

FIG. 9D is a schematic block diagram of an embodiment of content blockchain of an object distributed ledger, where the content includes the smart contract as previously discussed. The content blockchain includes a plurality of blocks 2-4. Each block includes a header section and a transaction section. The header section includes one or more of a nonce, a hash of a preceding block of the blockchain, where the preceding block was under control of a preceding device (e.g., a broker computing device, a user computing device, a blockchain node computing device, etc.) in a chain of control of the blockchain, and a hash of a current block (e.g., a current transaction section), where the current block is under control of a current device in the chain of control of the blockchain.

The transaction section includes one or more of a public key of the current device, a signature of the preceding device, smart contract content, change of control from the preceding device to the current device, and content information from the previous block as received by the previous device plus content added by the previous device when transferring the current block to the current device.

FIG. 9D further includes devices 2-3 to facilitate illustration of generation of the blockchain. Each device includes a hash function, a signature function, and storage for a public/private key pair generated by the device.

An example of operation of the generating of the blockchain, when the device 2 has control of the blockchain and is passing control of the blockchain to the device 3 (e.g., the device 3 is transacting a transfer of content from device 2), the device 2 obtains the device 3 public key from device 3, performs a hash function 2 over the device 3 public key and the transaction 2 to produce a hashing resultant (e.g., preceding transaction to device 2) and performs a signature function 2 over the hashing resultant utilizing a device 2 private key to produce a device 2 signature.

Having produced the device 2 signature, the device 2 generates the transaction 3 to include the device 3 public key, the device 2 signature, device 3 content request to 2 information, and the previous content plus content from device 2. The device 3 content request to device 2 information includes one or more of a detailed content request, a query request, background content, and specific instructions from device 3 to device 2 for access to an object license. The previous content plus content from device 2 includes one or more of content from an original source, content from any subsequent source after the original source, an identifier of a source of content, a serial number of the content, an expiration date of the content, content utilization rules, and results of previous blockchain validations.

Having produced the transaction 3 section of the block 3 a processing module (e.g., of the device 2, of the device 3, of a transaction mining server, of another server), generates the header section by performing a hashing function over the transaction section 3 to produce a transaction 3 hash, performing the hashing function over the preceding block (e.g., block 2) to produce a block 2 hash. The performing of the hashing function may include generating a nonce such that when performing the hashing function to include the nonce of the header section, a desired characteristic of the resulting hash is achieved (e.g., a desired number of preceding zeros is produced in the resulting hash).

Having produced the block 3, the device 2 sends the block 3 to the device 3, where the device 3 initiates control of the blockchain. Having received the block 3, the device 3 validates the received block 3. The validating includes one or more of verifying the device 2 signature over the preceding transaction section (e.g., transaction 2) and the device 3 public key utilizing the device 2 public key (e.g., a re-created signature function result compares favorably to device 2 signature) and verifying that an extracted device 3 public key of the transaction 3 compares favorably to the device 3 public key held by the device 3. The device 3 considers the received block 3 validated when the verifications are favorable (e.g., the authenticity of the associated content is trusted).

FIGS. 10A, 10B, and 10C are schematic block diagrams of an embodiment of a computing system illustrating an example of tokenizing in a lesson package. The computing system includes the computing entity 20 of FIG. 1, a computing entity 400, computing entities 402-1 through 402-N, and a computing entity 404. In an embodiment, the computing entity 20 is associated with one or more learning object owners providing lesson packages as previously discussed, the computing entity 400 is associated with a marketplace for the lesson packages, the computing entities 402-1 through 402-N serve as blockchain nodes for an object distributed ledger associated with the lesson packages, and the computing entity 404 is associated with an accreditation authority (e.g., one that verifies accreditation of a portion of a lesson package and/or a group of lesson packages, verifies standing of trainers and educators that create the lesson packages, and verifies aspects of students that participate in a learning session utilizing a lesson package).

The computing entity 400 and computing entities 402-1 through 402-N includes a database 406 and a control module 412. In an embodiment the database 406 is implemented utilizing the memory module 102 of FIG. 2B and the control module 412 is implemented utilizing a processing module. A portion of the object distributed ledger is illustrated to include a plurality of object nonfungible tokens (NFT) and associated license blocks.

FIG. 10A illustrates an example method of operation of the tokenizing of the lesson package that includes a first step where the computing entity 400 interprets a request from a learning object owner computing device (e.g., the computing entity 20) of the computing infrastructure to make available for licensing a set of learning objects to produce an object basics record of a smart contract for the set of learning objects. The learning object owner computing device is distinct from the marketplace computing device.

The object basics record includes a learning object set identifier of the set of learning objects, a course number associated with the set of learning objects, and at least one learning object owner identifier associated with the set of learning objects. In another embodiment, the object basics record further includes, an identifier of a lesson package, a description of the lesson package, an identifier of a trainer that participated in the creation of the lesson package, prerequisites for the lesson package, a link to the lesson package, a security credential for subsequent access of the lesson package, degrees or certifications associated with the lesson package, historical utilization of the lesson package, effectiveness results for the historical utilization of the lesson package, and a lesson package owner identifier.

As an example of producing the object basics record, the control module 412 of the computing entity 400 interprets a set up message 4 from the computing entity 20 to produce the object basics record. The set up message 4 includes a request to make available the set of learning objects of the lesson package associated with the computing entity 20.

The interpreting the request to make available for licensing the set of learning objects to produce the object basics record of the smart contract includes one or more approaches of a variety of approaches. A first approach includes identifying a set of learning object identifiers for the set of learning objects. For example, the control module 412 interprets the set up message 4 to extract the set of learning object identifiers.

A second approach includes generating the learning object set identifier of the set of learning objects based on the set of learning object identifiers. For example, the control module 412 performs a mathematical function on the set of learning object identifiers to produce the learning object set identifier.

A third approach includes identifying a set of learning object owner identifiers associated with the set of learning objects. For example, the control module 412 interprets the set up message 4 to extract the set of learning object owner identifiers.

A fourth approach includes determining a set of training areas for the set of learning objects. Each training area is associated with one or more learning objects of the set of learning objects. For example, the control module 412 extracts training area identifiers for each learning object and aggregates the training area identifiers to produce the set of training areas.

A fifth approach includes identifying, for each learning object of the set of learning objects, a corresponding accreditation authority computing device. For example, the control module 412 extracts an identifier of the corresponding accreditation authority computing device for the learning object from the set up message 4.

A sixth approach includes identifying, for each learning object of the set of learning objects, a valid timeframe of the learning object. For example, the control module 412 extracts the valid timeframe of each learning object from the set up message 4. The valid timeframe is associated with when the learning object, lesson package, course is valid for utilization by one or more learning entities.

Having produced the object basics record for the set of learning objects, a second step of the example method of operation includes the computing entity 400 verifying with an accreditation authority computing device of the computing infrastructure, validity of the object basics record. The verifying the validity of the object basics record includes a series of sub-steps.

A first sub-step includes the control module 412 of the computing entity 400 identifying the accreditation authority computing device based on a first identified corresponding accreditation authority of the object basics record for a learning object of the set of learning objects. For example, the control module 412 of the computing entity 400 extracts an Internet protocol address for the first identified corresponding accreditation authority for a first learning object of the set of learning objects from the set up message 4.

A second sub-step includes obtaining accreditation information from the accreditation authority computing device for the first learning object of the set of learning objects. For example, the control module 412 of the computing entity 400 exchanges further set up messages 4 with the computing entity 404 to produce the accreditation information for the first learning object. The accreditation information verifies accreditation of one or more of the learning objects of the set of learning objects, a portion of a lesson package and/or a group of lesson packages, verifies standing of trainers and educators that create the lesson packages, and verifies aspects of students that participate in a learning session utilizing just one learning object or a complete lesson package that includes a set of learning objects. For instance, the first learning object is accepted as a 201 level course for an Associate's degree of science.

A third sub-step includes indicating that the object basics record is valid for the first learning object when the accreditation information is substantially the same as the object basics record for the first learning object. For example, the control module 412 compares the accreditation information 2 portions of the object basics record and indicates that the object basics record is valid when the comparison is favorable (e.g., substantially the same).

FIG. 10B further illustrates the example method of operation for the tokenizing of the lesson package, where having obtained validated the object basics record for the set of learning objects, a third step includes the computing entity 400 establishing available license terms for utilization of the set of learning objects via a smart contract on the object distributed ledger. The establishing the available license terms of the smart contract for the set of learning objects includes a series of sub-steps.

A first sub-step includes establishing baseline available license terms from a terms template. For example, the computing entity 400 recovers the terms template from the database 406 of the computing entity 400. As another example, the computing entity 400 interprets a set up message 4 from the computing entity 20 that includes the terms template (e.g., from a lesson package owner).

A second sub-step includes modifying the baseline available license terms based on the object basics to produce proposed available license terms. For example, the computing entity 400 changes one or more items of the baseline available license terms based on facts of the object basics to produce the proposed available license terms. For instance, a license timeframe is filled in based on a train-by expiration date.

A third sub-step includes determining whether the proposed available license terms are acceptable to a set of owners associated with the set of learning objects. For example, the computing entity 400 compares the proposed available license terms to a maximum acceptable set of license terms recovered from the database 406 of the computing entity 400. As another example, the computing entity 400 interprets a further set up message 4 from the computing entity 20 in response to presenting the proposed available license terms to the set of owners (e.g., in an authorization request sent to the computing entity 20).

A fourth sub-step includes establishing the proposed available license terms as the available license terms for the smart contract 410 when the proposed available license terms are acceptable to the set of owners. For example, the computing entity 400 indicates that the proposed available license terms are the available license terms when determining that the proposed available license terms are acceptable to the set of owners.

Having established the available license terms for the smart contract 410, a fourth step of the example method of operation includes the computing entity 400 establishing available payment terms of the smart contract for the set of learning objects. The establishing the available payment terms of the smart contract for the set of learning objects includes a series of sub-steps.

A first sub-step includes establishing baseline available payment terms from the terms template. For example, the computing entity 400 recovers the terms template from the database 406 of the computing entity 400 and extracts the available payment terms from the terms template. As another example, the computing entity 400 interprets another set up message number 4 from the computing entity 20 that includes the baseline available payment terms (e.g., from one or more lesson package owners).

A second sub-step includes modifying the baseline available payment terms based on the object basics to produce proposed available payment terms. For example, the computing entity 400 changes one or more items of the baseline available payment terms based on facts of the object basics to produce the proposed available payment terms. For instance, a payment timeframe is filled in based on a particular training expiration date.

A third sub-step includes determining whether the proposed available payment terms are acceptable to a set of owners associated with the set of learning objects. For example, the computing entity 400 compares the proposed available payment terms to a minimum acceptable set of payment terms recovered from the database 406 of the computing entity 400. As another example, the computing entity 400 interprets yet another set up message 4 from the computing entity 20 in response to presenting the proposed available payment terms to the set of owners (e.g., in a payment approval request sent to the computing entity 20).

A fourth sub-step includes establishing the proposed available payment terms as the available payment terms for the smart contract 410 when the proposed available payment terms are acceptable to the set of owners. For example, the computing entity 400 indicates that the proposed available payment terms are the available payment terms when determining that the proposed available payment terms are acceptable to the set of owners (e.g., by prestored minimum requirements, by instant approval).

FIG. 10C further illustrates the example method of operation, where having produced the smart contract, a fifth step includes the computing entity 400 causing generation of a non-fungible token (NFT) associated with the smart contract for storage in the object distributed ledger. The causing the generation of the non-fungible token associated with the smart contract in the object distributed ledger includes determining whether to indirectly or directly update the object distributed ledger. For example, the computing entity 400 determines to indirectly update the object distributed ledger when the computing entity 400 does not have a satisfactory direct access to the object distributed ledger (e.g., the computing entity 400 does not serve as a blockchain node). As another example, the computing entity 400 determines to directly update the object distributed ledger when a predetermination stored in the database 406 indicates to directly access the object distributed ledger when possible (e.g., a copy of the blockchain 408 is stored in the database 406 of the computing entity 400).

When indirectly updating the object distributed ledger, the causing the generation includes the computing entity 400 issuing a non-fungible token generation request to an object ledger computing device serving as a blockchain node of the object distributed ledger. The non-fungible token generation request includes the smart contract. For example, the computing entity 400 issues a use message 6 to the computing entity 402-1, where the use message 6 includes the request and the smart contract 410. In response, the computing entity 402-1 adds a new non-fungible token listing to the object distributed ledger (e.g., as illustrated by object NFT 3 block 3 in the example of FIG. 10C).

When directly updating the object distributed ledger, the causing the generation includes the computing entity 400 performing a series of sub-steps illustrated in FIG. 9D. A first sub-step includes obtaining a copy of the object distributed ledger. For example, the computing entity 400 extracts the object distributed ledger from a use message 6 from the computing entity 402-1. As another example, the computing entity 400 recovers the object distributed ledger from the blockchain 408 of the database 406 of the computing entity 400.

A second sub-step includes hashing the smart contract utilizing a receiving public key of the object distributed ledger to produce a next transaction hash value. For example, the computing entity 400 obtains a suitable receiving public key (e.g., from a current version of the blockchain, from a blockchain node, from the computing entity 20) and performs the hashing function to produce the next transaction hash value.

A third sub-step includes encrypting the next transaction hash value utilizing a private key of the marketplace computing entity to produce a next transaction signature. For example, the computing entity 400 recovers a private key associated with the computing entity 400 and utilizes the recovered private key to encrypt the next transaction hash value to produce the next transaction signature.

A fourth sub-step includes generating a next block of a blockchain of the object distributed ledger to include the smart contract and the next transaction signature. For example, the computing entity 400 generates the next block as previously discussed with regards to FIG. 9D to include the smart contract and the next transaction signature.

A fifth sub-step includes causing inclusion of the next block as the non-fungible token in the object distributed ledger. For example, the computing entity 400 appends the next block of the blockchain in the object distributed ledger as previously discussed with reference to FIG. 9D to update the object distributed ledger as illustrated in FIG. 10C, where the non-fungible token object NFT 3 is represented by the next block 3.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing devices of the computing system 10, cause the one or more computing devices to perform any or all of the method steps described above.

FIGS. 11A, 11B, and 11C are schematic block diagrams of an embodiment of a computing system illustrating an example of creating a lesson package. The computing system includes the computing entity 20 of FIG. 1, a computing entity 400, the human interface module 18 of FIG. 1, the environment sensor module 14 of FIG. 1, computing entities 402-1 through 402-N, and a computing entity 404. In an embodiment, the computing entity 20 is associated with providing lesson packages as previously discussed, the computing entity 400 is associated with a marketplace for the lesson packages, the computing entities 402-1 through 402-N serve as blockchain nodes for an object distributed ledger associated with the lesson packages, and the computing entity 404 is associated with an accreditation authority (e.g., one that verifies accreditation of a portion of a lesson package and/or a group of lesson packages, verifies standing of trainers and educators that create the lesson packages, and verifies aspects of students that participate in a learning session utilizing a lesson package).

The computing entity 400 and computing entities 402-1 through 402-N includes a database 406 and a control module 412. In an embodiment the database 406 is implemented utilizing the memory module 102 of FIG. 2B and the control module 412 is implemented utilizing a processing module. A portion of the object distributed ledger is illustrated to include a plurality of object nonfungible tokens (NFT) and associated license blocks.

FIG. 11A illustrates an example method of operation of the creating of the lesson package where a first step includes the computing entity 400 selecting a set of learning objects for a new lesson package. The selecting includes the computing entity 400 (e.g., a marketplace computing device) determining a plurality of effectiveness metrics for a plurality of learning objects associated with a common topic. Generally the effectiveness metrics indicate a quality level associated with each learning object in terms of effectiveness in providing knowledge to a learner. Each learning object includes a unique set of descriptive asset digital video frames that portray an aspect of a corresponding set of knowledge bullet-points of the common topic for the learning object as previously discussed.

The determining the plurality of effectiveness metrics for the plurality of learning objects associated with the common topic includes one or more approaches. A first approach includes the control module 412 of the computing entity 400 identifying a retention test score associated with a first learning object of the plurality of learning objects to produce a retention metric for the first learning object. For example, the control module 412 precedes a set up message 4 from the computing entity 20 that includes retention test scores recovered from the learning assets database 34 for at least some of the learning objects.

A second approach includes the control module 412 identifying a first learning entity rating of the first learning object to produce a first user rating metric for the first learning object. For example, the control module 412 interprets learner input information 174 from the human interface module 18, where the human interface module 18 receives human input 164 that includes the first user rating metric (e.g., student feedback such as a preference indication, preferred instructors and/or designers of learning objects, favorable learning results versus expectations).

A third approach includes the control module 412 generating a group rating metric for the first learning object based on the first learning entity rating of the first learning object and a second learning entity rating of the first learning object. For example, the control module 412 interprets further learning input information 174 that further includes the second user rating metric and generates the group rating metric utilizing the first learning entity rating and the second learning entity rating. As another example, the control module 412 interprets environment sensor information 38 from the environment sensor module 14 to extract a multitude of other learning entity ratings of the first learning object (e.g., crowdsourcing) and generates the group rating metric utilizing the multitude of other learning entity ratings.

A fourth approach includes the control module 412 comparing a learning objective of a third learning object of the plurality of learning objects to a learning objective of the lesson package to produce a fit metric for the third learning object. For example, the control module 412 interprets further set up message 4 from the computing entity 20 that includes the learning objective of the third learning object as recovered from the learning assets database 34 and compares the learning objective of the third learning object to the learning objective of the lesson package (e.g., recovered from the database 406, extracted from further learning input information 174) to produce the fit metric for the third learning object.

Having determined the plurality of effectiveness metrics, the selecting of the set of learning objects further includes the computing entity 400 selecting the set of learning objects of the plurality of learning objects based on the plurality of effectiveness metrics to produce the lesson package (e.g., a new lesson package, an updated lesson package. The selecting of the set of objects of the plurality of learning objects based on the plurality of effectiveness metrics to produce the lesson package includes one or more of a variety of approaches.

A first approach to select the set of objects includes selecting the first learning object when the retention metric for the first learning object is greater than a retention metric minimum threshold level. For example, the control module 412 of the computing entity 400 determines that the retention metric for the first learning object is greater than the retention metric minimum threshold level and selects the first learning object.

A second approach includes selecting the first learning object when the first user rating metric for the first learning object is greater than a user rating metric minimum threshold level. For example, the control module 412 determines that the first user rating metric is greater than the user rating metric minimum threshold level and selects the first learning object.

A third approach includes selecting the first learning object when the group rating metric for the first learning object is greater than a group rating metric minimum threshold level. For example, the control module 412 determines that the group rating metric is greater than the group rating metric minimum threshold level and selects the first learning object.

A fourth approach includes selecting the third learning object when the fit metric for the third learning object is greater than a fit metric minimum threshold level. For example, the control module 412 determines that the fit metric for the third learning object is greater than the fit metric minimum threshold level and selects the third learning object.

Having identified the set of learning packages, a second step of the example method of operation to create the lesson package includes the computing entity 400 soliciting a licensing request to produce object basics. For example, the control module 412 of the computing entity 400 issues a set up message 4 to the computing entity 20, where the set up message 4 includes identifiers for the identified set of learning objects. The computing entity 400 receives another set up message 4 in response, where the other set up message 4 includes the object basics for the set of learning objects.

The soliciting of the licensing request includes interpreting a request from a learning object owner computing device (e.g., computing entity 20) to make available for licensing a set of learning objects of the lesson package to produce an object basics record of a smart contract 410 for the set of learning objects. The object basics record includes a learning object set identifier of the set of learning objects, an identifier of the lesson package, the effectiveness metrics for the set of learning objects, and at least one learning object owner identifier associated with the set of learning objects.

The interpreting the request from the learning object owner computing device to make available for licensing the set of learning objects of the lesson package to produce the object basics record of the smart contract 410 for the set of learning objects includes one or more approaches. A first approach includes identifying a set of learning object identifiers for the set of learning objects. For example, the control module 412 interprets a further set up message 4 from the computing entity 20 and extracts the set of learning object identifiers.

A second approach includes generating the learning object set identifier of the set of learning objects based on the set of learning object identifiers. For example, the control module 412 generates a hash of the set of learning object identifiers and truncates the hash to produce the learning object set identifier.

A third approach includes identifying a set of learning object owner identifiers associated with the set of learning objects. The set of learning object owner identifiers includes the at least one learning object owner identifier. For example, the control module 412 interprets the further set up message 4 from the computing entity 20 and extracts the set of learning object owner identifiers.

A fourth approach includes determining a set of training areas for the set of learning objects. Each training area is associated with one or more learning objects of the set of learning objects. For example, the control module 412 interprets further learning input information 174 to identify the set of training areas (e.g., as specified by a learner via the human input 164 from the human interface module 18).

A fifth approach includes identifying, for each learning object of the set of learning objects, a corresponding accreditation authority computing device. For example, the control module 412 extracts an identifier of the corresponding accreditation authority computing device from the database 406 based on the identifier of the learning object.

A sixth approach includes identifying, for each learning object of the set of learning objects, a valid timeframe of the learning object. For example, the control module 412 interprets the set up message 4 to extract the valid timeframe for the learning object.

FIG. 11B further illustrates the example method of operation where a third step includes the computing entity 400 establishing, with an accreditation authority computing device, accreditation of the lesson package based on the object basics record. The establishing the accreditation of the lesson package based on the object basics record includes a series of sub-steps.

A first sub-step includes the control module 412 identifying the accreditation authority computing device based on a first identified corresponding accreditation authority of the object basics record for a first learning object of the set of learning objects. For example, the control module 412 extracts an Internet protocol address of the corresponding accreditation authority computing device from the database 406.

A second sub-step includes the control module 412 exchanging accreditation information with the accreditation authority computing device for the first learning object. For example, the control module 412 exchanges a set up message 4 with the computing entity 404 (e.g., the accreditation authority computing device) where the set up message 4 includes the object basics record.

A third sub-step includes the control module 412 indicating that the object basics record is accredited for the first learning object when the accreditation information is substantially the same as the object basics record for the first learning object. For example, the control module 412 indicates that the accreditation has been completed when the set up message 4 from the computing entity 404 includes verification of the object basics record.

Having established the accreditation of the new lesson package, a fourth step of the example method of operation includes the computing entity 400 establishing available terms (e.g., available license terms, available payment terms) of license terms 304 as previously discussed. The computing entity 400 establishes the smart contract 410 for the new lesson package to include the license terms 304.

FIG. 11C further illustrates the example method of operation, where having established the smart contract, a fifth step includes the computing entity 400 causing generation of a non-fungible token associated with the smart contract for storage in the object distributed ledger. The causing the generation of the non-fungible token associated with the smart contract in the object distributed ledger includes determining whether to indirectly or directly update the object distributed ledger. For example, the computing entity 400 determines to indirectly update the object distributed ledger when the computing entity 400 does not have a satisfactory direct access to the object distributed ledger (e.g., the computing entity 400 does not serve as a blockchain node). As another example, the computing entity 400 determines to directly update the object distributed ledger when a predetermination stored in the database 406 indicates to directly access the object distributed ledger when possible (e.g., a copy of the blockchain 408 is stored in the database 406 of the computing entity 400).

When indirectly updating the object distributed ledger, the causing the generation includes the computing entity 400 issuing a non-fungible token generation request to an object ledger computing device serving as a blockchain node of the object distributed ledger. The non-fungible token generation request includes the smart contract. For example, the computing entity 400 issues a use message 6 to the computing entity 402-1, where the use message 6 includes the request and smart contract 410. In response, the computing entity 402-1 adds a new non-fungible token listing to the object distributed ledger (e.g., as illustrated by object NFT 3 block 3 in the example of FIG. 11C).

When directly updating the object distributed ledger, the causing the generation includes the computing entity 400 performing a series of sub-steps illustrated in FIG. 9D. A first sub-step includes obtaining a copy of the object distributed ledger. For example, the computing entity 400 extracts the object distributed ledger from a use message 6 from the computing entity 402-1. As another example, the computing entity 400 recovers the object distributed ledger from the blockchain 408 of the database 406 of the computing entity 400.

A second sub-step includes hashing the smart contract utilizing a receiving public key of the object distributed ledger to produce a next transaction hash value. For example, the computing entity 400 obtains a suitable receiving public key (e.g., from a current version of the blockchain, from a blockchain node, from the computing entity 20) and performs the hashing function to produce the next transaction hash value.

A third sub-step includes encrypting the next transaction hash value utilizing a private key of the marketplace computing entity to produce a next transaction signature. For example, the computing entity 400 recovers a private key associated with the computing entity 400 and utilizes the recovered private key to encrypt the next transaction hash value to produce the next transaction signature.

A fourth sub-step includes generating a next block of a blockchain of the object distributed ledger to include the smart contract and the next transaction signature. For example, the computing entity 400 generates the next block as previously discussed with regards to FIG. 9D to include the smart contract and the next transaction signature.

A fifth sub-step includes causing inclusion of the next block as the non-fungible token in the object distributed ledger. For example, the computing entity 400 appends the next block of the blockchain in the object distributed ledger as previously discussed with reference to FIG. 9D to update the object distributed ledger as illustrated in FIG. 11C, where the non-fungible token object NFT 3 is represented by the next block 3.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing devices of the computing system 10, cause the one or more computing devices to perform any or all of the method steps described above.

FIGS. 12A, 12B, and 12C are schematic block diagrams of an embodiment of a computing system illustrating an example of accessing a lesson package to establish a tokenized license of a virtual environment learning object. The computing system includes the computing entity 20 of FIG. 1, a computing entity 400, the human interface module 18 of FIG. 1, computing entities 402-1 through 402-N, and a computing entity 404. In an embodiment, the computing entity 20 is associated with providing lesson packages as previously discussed, the computing entity 400 is associated with a marketplace computing device for the lesson packages, the computing entities 402-1 through 402-N serve as blockchain nodes for an object distributed ledger associated with the lesson packages, and the computing entity 404 is associated with an accreditation authority (e.g., one that verifies accreditation of a portion of a lesson package and/or a group of lesson packages, verifies standing of trainers and educators that create the lesson packages, and verifies aspects of students that participate in a learning session utilizing a lesson package).

In an embodiment the human interface module 18 is affiliated with a user computing entity to receive human input 164 (e.g., from an input device of the user computing entity from a learning entity) and provide learner input information 174 to the computing entity 400. In another embodiment, the human interface module 18 is affiliated with the user computing entity to receive learner output information 172 from the computing entity 400 and provide human output 162 to a user (e.g., display for a learning entity).

The computing entity 400 and computing entities 402-1 through 402-N includes a database 406 and a control module 412. In an embodiment, the database 406 is implemented utilizing the memory module 102 of FIG. 2B and the control module 412 is implemented utilizing a processing module. A portion of the object distributed ledger is illustrated to include a plurality of object nonfungible tokens (NFT) and associated license blocks.

FIG. 12A illustrates an example method of operation of the accessing the lesson package where a first step includes the computing entity 400 (e.g., marketplace computing device) interpreting a request from a user computing device (e.g., the human interface module 18) to cause a license of a set of learning objects pertaining to a common topic for use by the user computing device to produce licensee information for the set of learning objects. Each learning object of the set of learning objects includes a unique set of descriptive asset digital video frames that portray an aspect of a corresponding set of knowledge bullet-points of the common topic for the learning object. The licensee information includes a licensee identifier (e.g., of a student) and an identifier of the set of learning objects. In an embodiment, the user computing device is distinct from the marketplace computing device.

For example, the control module 412 of the computing entity 400 interprets learner input information 174 from the human interface module 18 that includes the request is interpreted by the human interface module 18 from human input 164 from a student (e.g., learning entity). In an instance, the request includes identifiers of the set of learning objects obtained by accessing a training marketplace (e.g., the computing entity 400) and selecting the set of learning objects from available learning objects of the marketplace (e.g., as represented by the object distributed ledger)

Having interpreted the request, a second step of the example method of operation includes the computing entity 400 identifying a non-fungible token (NFT) associated with the set of learning objects (e.g., to make sure it is available). The object distributed ledger includes the NFT and at this point the user computing device is not already affiliated with a license connected to the NFT. The NFT includes a smart contract for the set of learning objects. The smart contract includes one or more of a learning object set identifier of the set of learning objects, an identifier of an affiliated lesson package, available license terms, available payment terms, an effectiveness metric for the set of learning objects, an accreditation indicator for the set of learning objects, and at least one learning object owner identifier associated with the set of learning objects as previously discussed.

The identifying the NFT associated with the set of learning objects includes determining whether to indirectly or directly access the object distributed ledger. For example, the computing entity 400 determines to indirectly access the object distributed ledger when the computing entity 400 does not have a satisfactory direct access to the object distributed ledger (e.g., the computing entity 400 does not serve as a blockchain node). As another example, the computing entity 400 determines to directly access the object distributed ledger when a predetermination stored in the database 406 indicates to directly access the object distributed ledger when possible (e.g., a copy of the blockchain 408 is stored in the database 406 of the computing entity 400).

When indirectly accessing the object distributed ledger, the identifying the NFT includes the control module 412 of the computing entity 400 issuing a non-fungible token access request (e.g., use message 6) to an object ledger computing device (e.g., computing entity 402-1) of the computing infrastructure serving as a blockchain node of the object distributed ledger. The non-fungible token access request includes the identifier of the set of learning objects.

Having issued the NFT access request, the indirect accessing of the object distributed ledger further includes the control module 412 of the computing entity 400 indicating availability of the license of the set of learning objects when a non-fungible token access response (e.g., a further use message 6 received from the computing entity 402-1) indicates that the NFT resides on the object distributed ledger and the user computing device is not already affiliated with any type of license connected to the NFT associated with the set of learning objects.

When directly accessing the object distributed ledger, the accessing includes the control module 412 of the computing entity 400 obtaining a copy of the object distributed ledger (e.g., recovering blockchain 408 from the database 406 of the computing entity 400) and indicating availability of the license of the set of learning objects when two conditions are met. A first condition includes the control module 412 detecting a block of the copy of object distributed ledger that includes the smart contract for the set of learning objects. For instance, the control module 412 identifies block 3 of object NFT 3 on the blockchain (e.g., as illustrated in FIG. 12A) to include the smart contract for the set of learning objects based on the identifier of the set of learning objects.

A second condition includes the control module 412 detecting that the user computing device is not already affiliated with any type of license connected to the NFT associated with the set of learning objects. For instance, the control module 412 detects that a license block for the user computing device is not linked to the object NFT 3 block of the blockchain.

FIG. 12B further illustrates the example method of operation where, having determined that the NFT is available, a third step includes the computing entity 400 establishing, with the user computing device, agreed licensing terms utilizing the licensee information and based on available licensing terms of the smart contract for the set of learning objects. The establishing the agreed licensing terms utilizing the licensee information and based on the available licensing terms of the smart contract for the set of learning objects includes a series of steps.

A first step includes obtaining the available license terms from the smart contract. For example, the control module 412 of the computing entity 400 extracts the available license terms from the smart contract 410 from the database 406.

A second step includes generating proposed agreed license terms based on the available license terms and the request from the user computing device. For example, the control module 412 includes terms from the request when they are compatible with the available license terms and fills in remaining terms from the available license terms to produce the proposed agreed license terms.

A third step include determining whether the proposed agreed license terms are acceptable to a set of owners associated with the set of learning objects. For example, the control module 412 exchanges messages with the computing entity 20 to verify the proposed agreed license terms with the set of owners.

A fourth step includes establishing the proposed agreed license terms as the agreed licensing terms when the proposed agreed license terms are acceptable to the set of owners. For example, the control module 412 interprets a response from the computing entity 20 and indicates that the proposed agreed license terms are now the agreed license terms when the response indicates that the proposed agreed license terms are acceptable.

Having established the agreed licensing terms, a fourth step of the example method of operation includes generating a license smart contract for the set of learning objects to include the licensee information and the agreed licensing terms. For example, the control module 412 fills out a template license smart contract for the set of learning objects by including licensee information and the agreed licensing terms to produce the license smart contract.

FIG. 12C further illustrates the example method of operation where, having produced the license smart contract a fifth step includes causing generation of a license block affiliated with the NFT via the blockchain of the object distributed ledger. The license block includes the license smart contract. The causing the generation of the license block affiliated with the NFT via the blockchain of the object distributed ledger includes determining whether to indirectly or directly update the object distributed ledger. For example, the computing entity 400 determines to indirectly update the object distributed ledger when the computing entity 400 does not have a satisfactory direct access to the object distributed ledger (e.g., the computing entity 400 does not serve as a blockchain node). As another example, the computing entity 400 determines to directly update the object distributed ledger when a predetermination stored in the database 406 indicates to directly access the object distributed ledger when possible (e.g., a copy of the blockchain 408 is stored in the database 406 of the computing entity 400).

When indirectly updating the object distributed ledger, the causing the generation of the license block affiliated with the NFT includes the control module 412 of the computing entity 400 issuing a non-fungible token generation request to an object ledger computing device of the computing infrastructure serving as a blockchain node of the object distributed ledger. The non-fungible token generation request includes the license smart contract. For example, the control module 412 issues a use message 6 to the computing entity 402-1, where the use message 6 includes the request and the license smart contract. In response, the computing entity 402-1 adds a new block 3-1 (e.g., that includes the license smart contract) to the object distributed ledger (as illustrated by block 3-1 linked to block 3 of the blockchain in the example of FIG. 12C).

When directly updating the object distributed ledger, the causing the generation of the license block affiliated with the NFT includes a series of sub-steps as discussed in FIG. 9D. A first sub-step includes obtaining a copy of the object distributed ledger. For example, the control module 412 of the computing entity 400 extracts the object distributed ledger from another use message 6 from the computing entity 402-1. As another example, the control module 412 of the computing entity 400 recovers the object distributed ledger from the blockchain 408 of the database 406 of the computing entity 400.

A second sub-step includes hashing the license smart contract utilizing a receiving public key of the object distributed ledger to produce a next transaction hash value. For example, the control module 412 of the computing entity 400 obtains a suitable receiving public the (e.g., from a current version of the blockchain, from a blockchain node, from the computing entity 20) and performs the hashing function to produce the next transaction hash value.

A third sub-step includes encrypting the next transaction hash value utilizing a private key of the marketplace computing device to produce a next transaction signature. For example, the control module 412 of the computing entity 400 recovers a private key associated with the computing entity 400 and utilizes the recovered private key to encrypt the next transaction hash value to produce the next transaction signature.

A fourth sub-step includes generating a next block of the blockchain of the object distributed ledger to include the license smart contract and the next transaction signature. For example, the control module 412 of the computing entity 400 generates the next block as previously discussed with regards to FIG. 9D to include the license smart contract and the next transaction signature.

A fifth sub-step includes causing inclusion of the next block as the license block in the object distributed ledger. For example, the control module 412 of the computing entity 400 appends the license block to the blockchain of the object distributed ledger as previously discussed with reference to FIG. 9D to update the object distributed ledger as illustrated in FIG. 12C, where the license block is represented by the block 3-1.

Having updated the blockchain to include the license block, the example method of operation further includes notifying a learning object owner computing device of the computing infrastructure that the license block has been added to the blockchain of the object distributed ledger. For example, the control module 412 of the computing entity 400 issues a message to the computing entity 20 with regards to the license block (e.g., an identifier of the license block, a link to the license block).

Having notified the learning object owner, the example method of operation further includes the user computing device (e.g., on behalf of the learning entity student) accessing the knowledge license set of learning objects. The accessing of the set of learning objects includes a series of steps. A first step includes accessing the license block on the blockchain of the object distributed ledger to recover the license smart contract. For example, the user computing device utilizes the direct link to access the license block in the blockchain to gain access to the license smart contract.

A second step includes accessing the set of learning objects utilizing linking information extracted from the license smart contract. Linking information includes one or more of a URL to access a storage location of the set of learning objects, an identifier of the set of learning objects, and security information (e.g., a key, a password) to gain access to a storage location of the set of learning objects. For example, the user computing device extracts the linking information from the license smart contract and accesses the set of learning objects by utilizing the linking information. For instance, the user computing device utilizes the security information once access is gained to the learning assets database 34 the computing entity 20 (e.g., storage location of the set of learning objects) by utilizing the linking information and accesses digital video frames stored in the learning assets database 34 the of the computing entity 20.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element, a sixth memory element, a seventh memory element etc.) that stores operational instructions can, when executed by one or more processing modules of the one or more computing devices of the computing system 10, cause the one or more computing devices to perform any or all of the method steps described above.

FIGS. 13A, 13B, and 13C are schematic block diagrams of an embodiment of a computing system illustrating another example of accessing a lesson package. The computing system includes the computing entity 20 of FIG. 1, the human interface module 18 of FIG. 1, computing entities 402-1 through 402-N of FIG. 9A, and a computing entity 404. In an embodiment, the computing entity 20 is associated with providing lesson packages as previously discussed, the computing entities 402-1 through 402-N serve as blockchain nodes for an object distributed ledger associated with the lesson packages, and the computing entity 404 is associated with an accreditation authority (e.g., one that verifies accreditation of a portion of a lesson package and/or a group of lesson packages, verifies standing of trainers and educators that create the lesson packages, and verifies aspects of students that participate in a learning session utilizing a lesson package).

The computing entities 402-1 through 402-N includes a database 406 and a control module 412. The computing entity 20 includes experience execution module 32 of FIG. 1, the learning assets database 34 of FIG. 1 and the database 406 of FIG. 10A. A portion of the object distributed ledger is illustrated to include a plurality of object nonfungible tokens (NFT) and associated license blocks.

FIG. 13A illustrates an example method of operation of the accessing the lesson package that includes the computing entity 20 interpreting a request, received via a user interface (e.g., via the human interface module), for a requesting entity to access a set of learning objects pertaining to a common topic represented in a virtual reality environment to produce a set of requested learning object identifiers. A multitude of license blocks of a blockchain of the object distributed ledger identifies valid licensees of an inventory of learning objects. Each learning object of the inventory of learning objects is associated with a unique learning object identifier. For example, the experience execution module 32 receives learner input information 174 from the human interface module 18 with regards to human input 164 and extracts the set of requested learning object identifiers.

Having produced the set of learning object identifiers, a second step of the example method of operation includes the computing entity 20 determining whether a license smart contract 410 for the set of learning objects associated with a non-fungible token (NFT) of the object distributed ledger affirms access by the requesting entity to the set of learning objects. The license smart contract includes one or more of a learning object set identifier of the set of learning objects, an identifier of an affiliated lesson package, license terms, an effectiveness metric for the set of learning objects, an accreditation indicator for the set of learning objects, and at least one learning object owner identifier associated with the set of learning objects.

The determining whether the license smart contract for the set of learning objects associated with the NFT of the object distributed ledger affirms the access by the requesting entity to the set of learning objects includes a series of sub-steps. A first sub-step includes the experience execution module 32 identifying the NFT associated with the set of learning objects based on the set of requested learning object identifiers. The identifying is discussed in greater detail below.

A second sub-step of determining whether the license smart contract affirms the access by the requesting entity includes the experience execution module 32 indicating that the license smart contract affirms the access by the requesting entity to the set of learning objects when the experience execution module 32 detects a block of a copy of the object distributed ledger associated with the NFT that includes the license smart contract for the set of learning objects and the experience execution module 32 interprets the license smart contract to include a valid license by the requesting entity for the set of learning objects.

The identifying the NFT associated with the set of learning objects includes determining whether to indirectly or directly access the object distributed ledger. For example, the experience execution module 32 determines to directly access the object distributor ledger when the will blockchain 408 of the database 406 includes the object distributed ledger.

When indirectly accessing the object distributed ledger, the experience execution module 32 issues a non-fungible token (NFT) access request (e.g., use message 6) to an object ledger computing device (e.g., computing entity 402-1) serving as a blockchain node of the object distributed ledger. The non-fungible token access request includes at least some of the set of requested learning object identifiers. The experience execution module 32 receives the NFT in response to the NFT access request. (E.g., the computing entity 402-1 accesses the blockchain 408 in its database 406 to recover the NFT and any associated license blocks (e.g., license 1 including block 3-1).

When directly accessing the object distributed ledger, the experience execution module 32 obtains a copy of the object distributed ledger (e.g., from the database 406 of the computing entity 20) and extracts the NFT from the copy of the object distributed ledger (e.g., from the blockchain 408). The NFT includes the at least some of the set of requested learning object identifiers. When matching the identifiers of the set of learning objects from the blockchain 408 to the identifiers of the identified set of learning objects, the experience execution module 32 indicates that the NFT does exist on the blockchain. For example, the computing entity 20 indicates that the NFT associated with the set of learning objects is available when block 3 of object NFT 3 on the blockchain is identified to match the identifiers of the identified set of learning objects. The computing entity 20 indicates that the requesting entity (e.g., a student) has taken a license (e.g., affirming access) when identifying block 3-1 as a license 1 for the student associated with the object NFT 3 block 3 for the set of learning objects.

FIG. 13B further illustrates the example method of operation, where when the access is affirmed, a third step includes the computing entity 20 generating the virtual reality environment utilizing a group of object representations in accordance with interaction information for at least some of the object representations of the group of object representations. At least some of the object representations are associated with corresponding three dimensional (3-D) physical objects. The interaction information includes 3-D models and position information for the at least some of the object representations of the group of object representations. A first set of object representations of the group of object representations is associated with a first piece of information regarding the common topic. A second set of object representations of the group of object representations is associated with a second piece of information regarding the common topic.

The generating the virtual reality environment includes a series of sub-steps. A first sub-step includes the experience execution module 32 identifying a common illustrative asset based on the first and second set of object representations. The common illustrative asset belongs to the first and second sets of object representations and depicts an aspect regarding the common topic pertaining to the first and second pieces of information.

A second sub-step includes the experience execution module 32 rendering a portion of the common illustrative asset to produce a set of illustrative asset video frames. For example, the experience execution module 32, having obtained the common illustrative asset from the learning assets database 34 for at least some of the set of learning objects, renders the common illustrative asset to produce the set of illustrative asset video frames as a portion of lesson asset video frames 713 for eventual portrayal of the set of learning objects.

A third sub-step includes the experience execution module 32 selecting a subset of the set of common illustrative asset video frames to produce a common portion of video frames for the virtual reality environment with regards to the first and second sets of object representations to reduce duplicative rendering. For example, the experience execution module 32 identifies the common portion of video frames that are included in portrayals of the first and second set of object representations.

A fourth sub-step includes the experience execution module 32 rendering another representation of the first set of object representations to produce a first remaining portion of the video frames for the virtual reality environment with regards to the first set of object representations. For example, the experience execution module 32 identifies other portions of the first set of object representations that are unique without regard to the common illustrative asset for rendering to produce the first remaining portion of the video frames of the lesson asset video frames 713.

A fifth sub-step includes the experience execution module 32 rendering another representation of the second set of object representations to produce a second remaining portion of the video frames for the virtual reality environment with regards to the second set of object representations. For example, the expense execution module 32 identifies other portions of the second set of object representations that are unique without regard to the common illustrative asset for rendering to produce the first remaining portion of the video frames of the lesson asset video frames 713.

A sixth sub-step includes the experience execution module linking the common portion, the first remaining portion, and the second remaining portion of the video frames to produce the virtual reality environment. For example, the experience execution module 32 integrates the video frames in order of the first and second learning objects to produce the lesson asset video frames 713.

Having generated the virtual reality environment, a fourth step of the example method of operation includes the computing entity 20 outputting the virtual reality environment to the requesting entity for interactive consumption. For example, the experience execution module 32 issues learner output information 172 2 the human interface module 18, where the learner output information 172 includes the lesson asset video frames 713. The human interface module 18 outputs human output 162 to the requesting entity based on the learner output information 172 to portray visual and/or audio representations of the lesson asset video frames 713.

During the outputting of the virtual reality environment, the experience execution module 32 receives further learner input information 174 from the requesting entity with regards to the interactive consumption of the virtual reality environment. For example, the experience execution module 32 interprets the learner input information 174 to identify answers to questions portrayed during the execution of the virtual reality environment.

FIG. 13C further illustrates the example method of operation, where having output the virtual reality environment to the requesting entity for interactive consumption, a fifth step includes the computing entity 20 generating a consumption block to indicate performance aspects of the interactive consumption. The performance aspects for the interactive consumption includes one or more of course credits earned, an indication of test results, a completion time frame, a list of completed learning objects, student feedback, a student identifier, an effectiveness measure for learning objects, etc. For example, the experience execution module 32 assesses given answers from the requesting entity (e.g., student) with regards to actual answers for questions portrayed during the outputting of the virtual reality environment.

Having generated the consumption block, the computing entity 20 causes affiliation of the consumption block with the blockchain of the object distributed ledger associated with the NFT. The causing of the affiliation of the consumption block with the blockchain of the object distributed ledger associated with the NFT includes a series of sub-steps.

A first sub-step includes the experience execution module 32 determining whether to indirectly or directly update the object distributed ledger. For example, the experience execution module 32 indicates to indirectly update the object distribute the ledger when the object distributed ledger is not contained within the blockchain 408 of the database 406 of the computing entity 20.

When indirectly updating the object distributed ledger, a second sub-step includes the experience execution module 32 issuing a blockchain update request to an object ledger computing device of the computing infrastructure serving as a blockchain node of the object distributed ledger. The blockchain update request includes the consumption block. For example, the experience execution module 32 issues a use message 6 to the computing entity 402-1, where the use message 6 includes the consumption block.

When directly updating the object distributed ledger, the second sub-step includes the experience execution module 32 obtaining a copy of the object distributed ledger. For example, the experience execution module 32 recovers the object distributed ledger from the blockchain 408 of the database 406 of the computing entity 20.

A third sub-step includes the experience execution module 32 hashing the consumption block utilizing a receiving public key of the object distributed ledger to produce a next transaction hash value. A fourth sub-step includes the experience execution module 32 encrypting the next transaction hash value utilizing a private key of the computing device to produce a next transaction signature.

A fifth sub-step includes the experience execution module 32 generating a next block of the blockchain of the object distributed ledger to include the consumption block and the next transaction signature. A sixth sub-step includes expense execution module 32 causing inclusion of the next block in the object distributed ledger. For example, the experience execution module 32 issues another use message 6 to the computing entity 402-1 where the use message 6 includes a license 1 representing the successful completion of the set of learning objects is added to the blockchain connecting to object NFT 3 block 3 for the set of learning objects.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth memory element, a fifth memory element, a sixth memory element, etc.) that stores operational instructions can, when executed by one or more processing modules of the one or more computing devices of the computing system 10, cause the one or more computing devices to perform any or all of the method steps described above.

FIGS. 14A, 14B, and 14C are schematic block diagrams of an embodiment of a computing system illustrating another example of accessing a lesson package. The computing system includes the computing entity 20 of FIG. 1, the human interface module 18 of FIG. 1, computing entities 402-1 through 402-N, and a computing entity 404. In an embodiment, the computing entity 20 is associated with providing lesson packages as previously discussed, the computing entities 402-1 through 402-N serve as blockchain nodes for an object distributed ledger associated with the lesson packages, and the computing entity 404 is associated with an accreditation authority (e.g., one that verifies accreditation of a portion of a lesson package and/or a group of lesson packages, verifies standing of trainers and educators that create the lesson packages, and verifies aspects of students that participate in a learning session utilizing a lesson package).

The computing entities 402-1 through 402-N includes a database 406 and a control module 412. The computing entity 20 includes experience execution module 32 of FIG. 1, the learning assets database 34 of FIG. 1 and the database 406 of FIG. 10A. A portion of the object distributed ledger is illustrated to include a plurality of object nonfungible tokens (NFT) and associated license blocks.

FIG. 14A illustrates an example method of operation for the accessing of the lesson package, where when a student has taken the license for a set of learning objects, a first step includes the computing entity 20 generating lesson asset video frames from the set of learning objects to output to the student for interactive consumption. For example, the experience execution module 32 accesses the learning assets database 34 to recover the learning objects and the lesson asset video frames 713. The experience execution module 32 issues learner output information 172 to the human interface module 18 that includes the lesson asset video frames 713. The human interface module 18 portrays the lesson asset video frames as human output 162 to the student.

The experience execution module 32 further obtains learner input information 174 to interpret human input 164 from the student with regards to the interactive consumption of the set of learning objects. For instance, the experience execution module 32 identifies right and wrong answers from the human input 164 for comparison to correct answers of the learning objects to produce evaluation results for the set of learning objects for the student.

FIG. 14B further illustrates the example method of operation, where having perform the interactive consumption of the set of learning objects, a second step includes the computing entity 20 modifying the smart contract to indicate completion of the set of learning objects by the student. The modifying includes aggregating all aspects and results of the interactive consumption (e.g., portions viewed, speed of participation, number of right answers, number of wrong answers, etc.). For example, the experience execution module 32 updates the smart contract 410 to include the evaluation results for the set of learning objects for the student.

Having updated the smart contract, a third step of the example method of operation includes the computing entity 20 generating a new block with a new smart contract causing storage in the blockchain to memorialize the interactive consumption. When indirectly causing the storage, the experience execution module 32 sends a use message 6 to the computing entity 402-1 that includes the new smart contract.

When directly causing the storage, the experience execution module 32 obtains the blockchain 408 from the database 406 of the computing entity 20, generates a new block to include the smart contract 410 and updates the blockchain 408 to include the smart contract 410 as previously discussed. The computing entity 20 facilitates sending the updated blockchain to the other blockchain nodes such a block 2-2 for a record 2 representing the successful completion of the set of learning objects is added to the blockchain connecting to object NFT 2 block 2 for the student. A series of records associated with the NFT for the student represent an aggregate of validated and immutable interactive consumption of sets of learning objects from time to time. Such records may also be utilized to include employment records such that a capability level for the student may be estimated from an aggregate of sets of learning objects successfully completed and work experience.

FIG. 14C further illustrates the example method of operation that includes a fourth step where the computing entity 404 determines accreditation for the student. The accreditation includes determining degrees, certificates, etc. earned as a result of a rollup of all successfully accomplished learning objects and work experiences. For example, the control module 412 of the computing entity 404 indicates that the student has completed an Associate's degree in science when meeting the requirements of the degree by way of work experience and/or a series of successfully completed learning objects. Having determined the accreditation, the control module 412 updates a smart contract 410 with any new titles, certificates, degrees etc. earned.

Having determined the accreditation for the student, a fifth step of the example method of operation includes the computing entity 404 updating the blockchain for the student. The control module 412 of the computing entity 404 determines a new block and causes adding of the new block to the blockchain for the student. For example, the computing entity 404 issues a use message 6 to the computing entity 402-1 such that record 2 of block 2-2 for the block 2 of the object NFT 2 for the student denotes the degree just earned.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing devices of the computing system 10, cause the one or more computing devices to perform any or all of the method steps described above.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

While particular combinations of various functions and features of the one or more embodiments have been expressly described herein, other combinations of these features and functions are likewise possible. The present disclosure is not limited by the particular examples.

What is claimed is:

1. A computer-implemented method of using a computing infrastructure to create a virtual reality environment regarding a common topic utilizing an object distributed ledger, the method comprises:

interpreting, by a computing device of the computing infrastructure, a request, received via a user interface of the computing infrastructure, for a requesting entity to access a set of learning objects pertaining to the common topic represented in the virtual reality environment to produce a set of requested learning object identifiers, wherein a multitude of license blocks of a blockchain of the object distributed ledger identifies valid licensees of an inventory of learning objects, wherein each learning object of the inventory of learning objects is associated with a unique learning object identifier;

determining, by the computing device, whether a license smart contract for the set of learning objects associated with a non-fungible token (NFT) of the object distributed ledger affirms access by the requesting entity to the set of learning objects, wherein the license smart contract includes one or more of a learning object set identifier of the set of learning objects, an identifier of an affiliated lesson package, license terms, an effectiveness metric for the set of learning objects, an accreditation indicator for the set of learning objects, and at least one learning object owner identifier associated with the set of learning objects; and when the access is affirmed:

generating, by the computing device, the virtual reality environment utilizing a group of object representations in accordance with interaction information for at least some of the object representations of the group of object representations, wherein at least some of the object representations are associated with corresponding three dimensional (3-D) physical objects, wherein the interaction information includes 3-D models and position information for the at least some of the object representations of the group of object representations, wherein a first set of object representations of the group of object representations is associated with a first piece of information regarding the common topic, wherein a second set of object representations of the group of object representations is associated with a second piece of information regarding the common topic;

outputting, by the computing device via the user interface, the virtual reality environment to the requesting entity for interactive consumption;

generating, by the computing device, a consumption block to indicate performance aspects of the interactive consumption; and causing, by the computing device, affiliation of the consumption block with the blockchain of the object distributed ledger associated with the NFT, wherein the causing affiliation of the consumption block with the blockchain of the object distributed ledger associated with the NFT includes:

determining whether to indirectly or directly update the object distributed ledger;

when indirectly updating the object distributed ledger:

issuing a blockchain update request to an object ledger computing device of the computing infrastructure serving as a blockchain node of the object distributed ledger, wherein the blockchain update request includes the consumption block; and when directly updating the object distributed ledger:

obtaining a copy of the object distributed ledger, hashing the consumption block utilizing a receiving public key of the object distributed ledger to produce a next transaction hash value, encrypting the next transaction hash value utilizing a private key of the computing device to produce a next transaction signature, generating a next block of the blockchain of the object distributed ledger to include the consumption block and the next transaction signature, and causing inclusion of the next block in the object distributed ledger.

2. The method of claim 1, wherein the determining whether the license smart contract for the set of learning objects associated with the NFT of the object distributed ledger affirms the access by the requesting entity to the set of learning objects comprises:

identifying the NFT associated with the set of learning objects based on the set of requested learning object identifiers; and indicating that the license smart contract affirms the access by the requesting entity to the set of learning objects when:

detecting a block of the copy of the object distributed ledger associated with the NFT that includes the license smart contract for the set of learning objects, and interpreting the license smart contract to include a valid license by the requesting entity for the set of learning objects.

3. The method of claim 2, wherein the identifying the NFT associated with the set of learning objects comprises:

determining whether to indirectly or directly access the object distributed ledger;

when indirectly accessing the object distributed ledger:

issuing a non-fungible token (NFT) access request to the object ledger computing device of the computing infrastructure serving as the blockchain node of the object distributed ledger, wherein the non-fungible token access request includes at least some of the set of requested learning object identifiers, and receiving the NFT in response to the NFT access request; and when directly accessing the object distributed ledger:

obtaining the copy of the object distributed ledger, and extracting the NFT from the copy of the object distributed ledger, wherein the NFT includes the at least some of the set of requested learning object identifiers.

4. The method of claim 1, wherein the generating the virtual reality environment comprises:

identifying a common illustrative asset based on the first and second sets of object representations, wherein the common illustrative asset belongs to the first and second sets of object representations and depicts an aspect regarding the common topic pertaining to the first and second pieces of information;

rendering a portion of the common illustrative asset to produce a set of common illustrative asset video frames;

selecting a subset of the set of common illustrative asset video frames to produce a common portion of video frames for the virtual reality environment with regards to the first and second sets of object representations to reduce duplicative rendering;

rendering another representation of the first set of object representations to produce a first remaining portion of the video frames for the virtual reality environment with regards to the first set of object representations;

rendering another representation of the second set of object representations to produce a second remaining portion of the video frames for the virtual reality environment with regards to the second set of object representations; and linking the common portion, the first remaining portion, and the second remaining portion of the video frames to produce the virtual reality environment.

5. A computing device of a computing infrastructure, the computing device comprises:

an interface;

a local memory; and a processor operably coupled to the interface and the local memory, wherein the processor performs functions to:

interpret a request received via the interface for a requesting entity to access a set of learning objects pertaining to a common topic represented in a virtual reality environment to produce a set of requested learning object identifiers, wherein a multitude of license blocks of a blockchain of an object distributed ledger identifies valid licensees of an inventory of learning objects, wherein each learning object of the inventory of learning objects is associated with a unique learning object identifier;

determine whether a license smart contract for the set of learning objects associated with a non-fungible token (NFT) of the object distributed ledger affirms access by the requesting entity to the set of learning objects, wherein the license smart contract includes one or more of a learning object set identifier of the set of learning objects, an identifier of an affiliated lesson package, license terms, an effectiveness metric for the set of learning objects, an accreditation indicator for the set of learning objects, and at least one learning object owner identifier associated with the set of learning objects; and when the access is affirmed:

generate the virtual reality environment utilizing a group of object representations in accordance with interaction information for at least some of the object representations of the group of object representations, wherein at least some of the object representations are associated with corresponding three dimensional (3-D) physical objects, wherein the interaction information includes 3-D models and position information for the at least some of the object representations of the group of object representations, wherein a first set of object representations of the group of object representations is associated with a first piece of information regarding the common topic, wherein a second set of object representations of the group of object representations is associated with a second piece of information regarding the common topic;

output, via the interface, the virtual reality environment to the requesting entity for interactive consumption;

generate a consumption block to indicate performance aspects of the interactive consumption; and cause affiliation of the consumption block with the blockchain of the object distributed ledger associated with the NFT, wherein the processor causes affiliation of the consumption block with the blockchain of the object distributed ledger associated with the NFT by:

determining whether to indirectly or directly update the object distributed ledger;

when indirectly updating the object distributed ledger:

issuing, via the interface, a blockchain update request to an object ledger computing device of the computing infrastructure serving as a blockchain node of the object distributed ledger, wherein the blockchain update request includes the consumption block; and when directly updating the object distributed ledger:

obtaining, via the interface, a copy of the object distributed ledger, hashing the consumption block utilizing a receiving public key of the object distributed ledger to produce a next transaction hash value, encrypting the next transaction hash value utilizing a private key of the computing device to produce a next transaction signature, generating a next block of the blockchain of the object distributed ledger to include the consumption block and the next transaction signature, and causing, via the interface, inclusion of the next block in the object distributed ledger.

6. The computing device of claim 5, wherein the processor performs functions to determine whether the license smart contract for the set of learning objects associated with the NFT of the object distributed ledger affirms the access by the requesting entity to the set of learning objects by:

identifying the NFT associated with the set of learning objects based on the set of requested learning object identifiers; and indicating that the license smart contract affirms the access by the requesting entity to the set of learning objects when:

detecting a block of the copy of the object distributed ledger associated with the NFT that includes the license smart contract for the set of learning objects, and interpreting the license smart contract to include a valid license by the requesting entity for the set of learning objects.

7. The computing device of claim 6, wherein the processor performs functions to identify the NFT associated with the set of learning objects by:

determining whether to indirectly or directly access the object distributed ledger;

when indirectly accessing the object distributed ledger:

issuing, via the interface, a non-fungible token (NFT) access request to the object ledger computing device of the computing infrastructure serving as the blockchain node of the object distributed ledger, wherein the non-fungible token access request includes at least some of the set of requested learning object identifiers, and receiving, via the interface, the NFT in response to the NFT access request; and when directly accessing the object distributed ledger:
obtaining, via the interface, the copy of the object distributed ledger, and
extracting the NFT from the copy of the object distributed ledger, wherein the NFT includes the at least some of the set of requested learning object identifiers.

8. The computing device of claim 5, wherein the processor performs functions to generate the virtual reality environment by:
identifying a common illustrative asset based on the first and second sets of object representations, wherein the common illustrative asset belongs to the first and second sets of object representations and depicts an aspect regarding the common topic pertaining to the first and second pieces of information;
rendering a portion of the common illustrative asset to produce a set of common illustrative asset video frames;
selecting a subset of the set of common illustrative asset video frames to produce a common portion of video frames for the virtual reality environment with regards to the first and second sets of object representations to reduce duplicative rendering;
rendering another representation of the first set of object representations to produce a first remaining portion of the video frames for the virtual reality environment with regards to the first set of object representations;
rendering another representation of the second set of object representations to produce a second remaining portion of the video frames for the virtual reality environment with regards to the second set of object representations; and
linking the common portion, the first remaining portion, and the second remaining portion of the video frames to produce the virtual reality environment.

9. A non-transitory computer readable memory comprises:
a first memory element that stores operational instructions that, when executed by a processing module, causes the processing module to:
interpret a request for a requesting entity to access a set of learning objects pertaining to a common topic represented in a virtual reality environment to produce a set of requested learning object identifiers, wherein a multitude of license blocks of a blockchain of an object distributed ledger identifies valid licensees of an inventory of learning objects,
wherein each learning object of the inventory of learning objects is associated with a unique learning object identifier;
a second memory element that stores operational instructions that, when executed by the processing module, causes the processing module to:
determine whether a license smart contract for the set of learning objects associated with a non-fungible token (NFT) of the object distributed ledger affirms access by the requesting entity to the set of learning objects, wherein the license smart contract includes one or more of a learning object set identifier of the set of learning objects, an identifier of an affiliated lesson package, license terms, an effectiveness metric for the set of learning objects, an accreditation indicator for the set of learning objects, and at least one learning object owner identifier associated with the set of learning objects; and
a third memory element that stores operational instructions that, when executed by the processing module, causes the processing module to:
when the access is affirmed:
generate the virtual reality environment utilizing a group of object representations in accordance with interaction information for at least some of the object representations of the group of object representations, wherein at least some of the object representations are associated with corresponding three dimensional (3-D) physical objects, wherein the interaction information includes 3-D models and position information for the at least some of the object representations of the group of object representations, wherein a first set of object representations of the group of object representations is associated with a first piece of information regarding the common topic, wherein a second set of object representations of the group of object representations is associated with a second piece of information regarding the common topic;
output the virtual reality environment to the requesting entity for interactive consumption;
generate a consumption block to indicate performance aspects of the interactive consumption; and
cause affiliation of the consumption block with the blockchain of the object distributed ledger associated with the NFT, wherein the processing module causes affiliation of the consumption block with the blockchain of the object distributed ledger associated with the NFT by:
determining whether to indirectly or directly update the object distributed ledger;
when indirectly updating the object distributed ledger:
issuing a blockchain update request to an object ledger computing device of the computing infrastructure serving as a blockchain node of the object distributed ledger, wherein the blockchain update request includes the consumption block; and
when directly updating the object distributed ledger:
obtaining a copy of the object distributed ledger,
hashing the consumption block utilizing a receiving public key of the object distributed ledger to produce a next transaction hash value,
encrypting the next transaction hash value utilizing a private key of the computing device to produce a next transaction signature,
generating a next block of the blockchain of the object distributed ledger to include the consumption block and the next transaction signature, and
causing inclusion of the next block in the object distributed ledger.

10. The non-transitory computer readable memory of claim 9, wherein the processing module functions to execute the operational instructions stored by the second memory element to cause the processing module to determine whether the license smart contract for the set of learning objects associated with the NFT of the object distributed ledger affirms the access by the requesting entity to the set of learning objects by:

identifying the NFT associated with the set of learning objects based on the set of requested learning object identifiers; and indicating that the license smart contract affirms the access by the requesting entity to the set of learning objects when:

detecting a block of the copy of the object distributed ledger associated with the NFT that includes the license smart contract for the set of learning objects, and interpreting the license smart contract to include a valid license by the requesting entity for the set of learning objects.

11. The non-transitory computer readable memory of claim 10, wherein the processing module functions to execute the operational instructions stored by the second memory element to cause the processing module to identify the NFT associated with the set of learning objects by:

determining whether to indirectly or directly access the object distributed ledger;

when indirectly accessing the object distributed ledger:

issuing a non-fungible token (NFT) access request to an object ledger computing device serving as a blockchain node of the object distributed ledger, wherein the non-fungible token access request includes at least some of the set of requested learning object identifiers, and receiving the NFT in response to the NFT access request; and when directly accessing the object distributed ledger:

obtaining the copy of the object distributed ledger, and extracting the NFT from the copy of the object distributed ledger, wherein the NFT includes the at least some of the set of requested learning object identifiers.

12. The non-transitory computer readable memory of claim 9, wherein the processing module functions to execute the operational instructions stored by the third memory element to cause the processing module to generate the virtual reality environment by:

identifying a common illustrative asset based on the first and second sets of object representations, wherein the common illustrative asset belongs to the first and second sets of object representations and depicts an aspect regarding the common topic pertaining to the first and second pieces of information;

rendering a portion of the common illustrative asset to produce a set of common illustrative asset video frames;

selecting a subset of the set of common illustrative asset video frames to produce a common portion of video frames for the virtual reality environment with regards to the first and second sets of object representations to reduce duplicative rendering;

rendering another representation of the first set of object representations to produce a first remaining portion of the video frames for the virtual reality environment with regards to the first set of object representations;

rendering another representation of the second set of object representations to produce a second remaining portion of the video frames for the virtual reality environment with regards to the second set of object representations; and linking the common portion, the first remaining portion, and the second remaining portion of the video frames to produce the virtual reality environment.

* * * * *